United States Patent
Mizutani

(10) Patent No.: US 6,230,176 B1
(45) Date of Patent: May 8, 2001

(54) FAST FOURIER TRANSFORM PROCESSING DEVICE, FAST FOURIER TRANSFORM PROCESSING SYSTEM, AND FAST FOURIER TRANSFORM PROCESSING METHOD

(76) Inventor: Hideo Mizutani, c/o Oki Electric Industry Co., Ltd., 7-12, Toranomon 1-chome, Minato-ku, Tokyo (JP)

(*) Notice: Subject to any disclaimer, the term of this patent is extended or adjusted under 35 U.S.C. 154(b) by 0 days.

(21) Appl. No.: 09/018,530

(22) Filed: Feb. 4, 1998

(30) Foreign Application Priority Data

Feb. 4, 1997 (JP) .................................................. 9-021799
Nov. 14, 1997 (JP) .................................................. 9-313659
Jan. 28, 1998 (JP) .................................................. 10-015971

(51) Int. Cl.[7] .................................................. G06F 15/00
(52) U.S. Cl. .................................................. 708/404
(58) Field of Search .................................. 708/403, 404, 708/405, 406, 407, 408, 409

(56) References Cited

U.S. PATENT DOCUMENTS

| | | | |
|---|---|---|---|
| 4,689,762 | * 8/1987 | Thibodeau, Jr. | 700/404 |
| 4,872,132 | * 10/1989 | Retter | 364/748.11 |
| 5,093,801 | * 3/1992 | White et al. | 708/404 |
| 5,293,330 | 3/1994 | Sayegh. | |
| 5,473,556 | 12/1995 | Aguilar et al. . | |
| 5,481,488 | 1/1996 | Luo et al. . | |
| 5,717,620 | * 2/1998 | Williams | 708/404 |
| 5,951,627 | * 9/1999 | Kiamilev et al. | 708/404 |

FOREIGN PATENT DOCUMENTS

95/04963   2/1995 (WO) .

OTHER PUBLICATIONS

"A Fast Single–Chip Implementation of 8192 Complex Point FFT", E. Bidet et al.; Brief Papers, 8107 IEEE Journal of Solid–State Circuits, vol. 30 (Mar. 1995) New York, USA.

ISSCC 89, Digest, pp. 166–167 and 327, "A 200 MIPS Single–Chip 1K FFT Processor" by J. O'Brien, J. Mather and B. Holland (1989).

* cited by examiner

Primary Examiner—Chuong Dinh Ngo
(74) Attorney, Agent, or Firm—Rabin & Champagne, P.C.

(57) ABSTRACT

An object of the invention is to perform fast Fourier transform processes of radix 4 and 2 at a high speed. In order to attain this object, the invention divides complex number data in which the number of sampling points is $4^n \times 2$ or $4^n$ into 4 groups A to D, and then repeats at n times a butterfly arithmetic operation of:

$$a_i = \{(A_i + C_i) + (B_i + D_i)\} \times W_{i1}$$

$$c_i = \{(A_i + C_i) - (B_i + D_i)\} \times W_{i3}$$

$$b_i = \{(A_i - C_i) - j(B_i - D_i)\} \times W_{i2}$$

$$d_i = \{(A_i - C_i) + j(B_i - D_i)\} \times W_{i4},$$

using the ith complex number data $A_i$, $B_i$, $C_i$ and $D_i$ belonging to the groups A to D and twiddle factors $W_{i1}$, $W_{i2}$, $W_{i3}$ and $W_{i4}$, and then in case that the number of sampling points is $4^n \times 2$, the invention further performs once a butterfly arithmetic operation:

$$a_i = A_i + B_i$$

$$b_i = A_i - B_i$$

$$c_i = C_i + D_i$$

$$d_i = C_i - D_i.$$

10 Claims, 27 Drawing Sheets

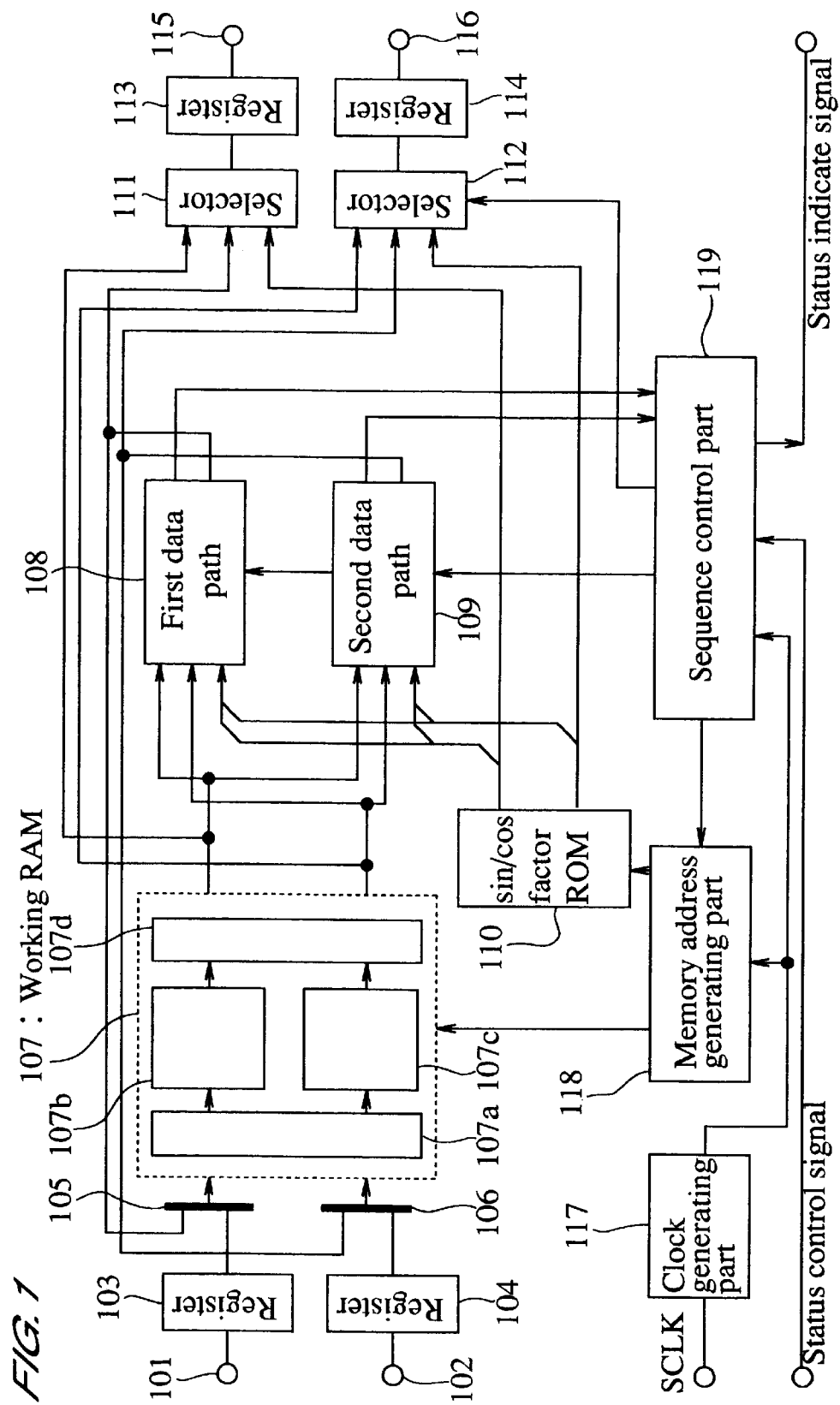

FIG.19

$$\begin{array}{cccc|cccc|cccc}
a_1 & a_2 & a_3 & a_4 & a_5 & a_6 & a_7 & a_8 & a_9 & \cdots \\
b_1 & b_2 & b_3 & b_4 & b_5 & b_6 & b_7 & b_8 & b_9 & \cdots \\
c_1 & c_2 & c_3 & c_4 & c_5 & c_6 & c_7 & c_8 & c_9 & \cdots \\
d_1 & d_2 & d_3 & d_4 & d_5 & d_6 & d_7 & d_8 & d_9 & \cdots
\end{array}$$

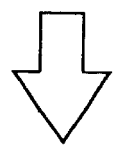 Transposition $$\begin{array}{cccc|cccc|cccc}
a_1 & b_1 & c_1 & d_1 & a_5 & b_5 & c_5 & d_5 & a_9 & b_9 & c_9 & d_9 \\
a_2 & b_2 & c_2 & d_2 & a_6 & b_6 & c_6 & d_6 & \cdot & \cdot & \cdot & \cdot \\
a_3 & b_3 & c_3 & d_3 & a_7 & b_7 & c_7 & d_7 & \cdot & \cdot & \cdot & \cdot \\
a_4 & b_4 & c_4 & d_4 & a_8 & b_8 & c_8 & d_8 & \cdot & \cdot & \cdot & \cdot
\end{array}$$

FAST FOURIER TRANSFORM PROCESSING DEVICE, FAST FOURIER TRANSFORM PROCESSING SYSTEM, AND FAST FOURIER TRANSFORM PROCESSING METHOD

BACKGROUND OF THE INVENTION

1. Field of the Invention

The present invention relates to a fast Fourier transform process. For example, this invention is used in a signal analysis of a voice signal or the like, and a modulation/demodulation process for a digital transmission.

In detail, the invention relates to a fast Fourier transform process that performs a fast Fourier transform process or its inverse transform process of variable sampling points to a series of discrete complex number input signals.

2. Description of the Related Art

Up to now, for example, in a signal analysis of a voice signal, a modulation/demodulation process for a digital transmission, or the like, a fast Fourier transform processing device has been used.

As such a fast Fourier transform processing device, for example, a device disclosed in "ISSCC89, Digest, pp166 to 167, 327, THPM12.5: A 200MIPS Single-Chip 1K FFT Processor" is known.

A fast Fourier transform processing device described in this reference literature performs a computing process by means of data paths composed of a 2-port RAM, a twiddle factor ROM, and plural computing elements.

And this device is provided with plural data paths and improves throughput of the internal computation by performing a parallel processing.

This data path is provided with a pipeline structure composed of a multiplier and an adder-subtracter which are disposed between register files, and performs a Fourier transform for transforming inputted complex number data from a time domain to a frequency domain or an inverse Fourier transform for transforming them from a frequency domain to a time domain by means of this pipeline process.

And this data path performs a fast Fourier transform on the basis of an algorithm of radix 4 in case the number of sampling points is 1024, 256, or 64.

However, since a former fast Fourier transform processing device as disclosed in the above-mentioned reference literature has a data path architecture using a fast Fourier transform algorithm of radix 4, it has a disadvantage that although it can perform a fast transform process when the number of sampling points in the fast Fourier transform is the nth power of 4 (namely, $4^n$), it is much deteriorated in processing efficiency if the number of sampling points is not $4^n$.

For example, if the number of sampling points is 512 (the 4th power of 4×2) or 128 (the 3rd power of 4×2), although it can perform a fast Fourier transform process itself, its processing speed is very slow since it cannot help but perform a very inefficient process.

And a former fast Fourier transform processing device can perform processing by means of plural devices connected in parallel with one another if its internal working memory is insufficient in capacity. However, in that case, a processing system must be built by adding newly a complex adder-subtracter, a complex multiplier, a working memory, and the like to this device as discrete components, and as a result this causes a disadvantage that the processing device comes to be very large in scale. For example, since the fast Fourier transform processing device disclosed in the above-mentioned reference literature cannot perform by itself a fast Fourier transform in which the number of sampling points is more than 1024, a new system as described above must be built, for example, if the number of sampling points is 2048 or 4096.

SUMMARY OF THE INVENTION

A first object of the present invention is to provide a fast Fourier transform processing device and a fast Fourier transform processing method, which can cope with both fast Fourier transform algorithms of radix 4 and 2.

A second object of the invention is to provide a fast Fourier transform processing system and a fast Fourier transform processing method, which can be performed by having plural chips connected without using additional discrete components if the number of sampling points is doubled.

The present invention attains the above-mentioned objects by means of the following compositions.

(1) A fast Fourier transform processing device according to the first invention comprises:

a working memory for storing complex number data in which the number of sampling points is $4^n \times 2$ or $4^n$ (where n is a natural number), and the data are inputted from the outside and temporarily stored as one group, and a computing means, which repeats n times a series of computing operations of dividing complex number data stored in said working memory into 4 groups A, B, C and D according to computation series and sampling point numbers, performing the following computations:

$$ai = \{(Ai+Ci)+(Bi+Di)\} \times Wi1 \quad (1)$$

$$ci = \{(Ai+Ci)-(Bi+Di)\} \times Wi3 \quad (2)$$

$$bi = \{(Ai-Ci)-j(Bi-Di)\} \times Wi2 \quad (3)$$

$$di = \{(Ai-Ci)+j(Bi-Di)\} \times Wi4 \quad (4),$$

using the ith complex number data Ai, Bi, Ci and Di belonging to these groups A, B, C and D and twiddle factors Wi1, Wi2, Wi3 and Wi4 in relation to every i, and storing the computation results ai, bi, ci and di into said working memory as Ai, Bi, Ci and Di; and in case that said number of sampling points is $4^n \times 2$, which said data path further performs at one time a process of performing the following computations:

$$ai = Ai + Bi \quad (5)$$

$$bi = Ai - Bi \quad (6)$$

$$ci = Ci + Di \quad (7)$$

$$di = Ci - Di \quad (8),$$

using the complex number data Ai, Bi, Ci and Di obtained by those computations in relation to every i, and storing the computation results ai, bi, ci and di into said working memory.

According to this invention, it is possible to provide by a simple composition a fast Fourier transform processing device capable of coping with both fast Fourier transform algorithms of radix 4 and 2.

(2) A fast Fourier transform processing device according to the second invention comprises;

a working memory for having complex number data in which the number of sampling points is the $4^n \times 2$ or the $4^n$ (where n is a natural number) inputted from the outside and temporarily storing them as one group, a first computing means which divides the groups of complex number data stored in said working memory into 16 groups AG1, BG1, CG1, DG1, AG2, BG2, CG2, DG2, AG3, BG3, CG3, DG3, AG4, BG4, CG4 and DG4 according to computation series and sampling point numbers, and performs the following computing operations in relation to each of the after-division group combinations {AG1, BG1, CG1, DG1}, {AG2, BG2, CG2, DG2}, {AG3, BG3, CG3, DG3} and {AG4, BG4, CG4, DG4}:

$$ai = \{(Ai+Ci)+(Bi+Di)\} \times Wi1 \tag{1}$$

$$ci = \{(Ai+Ci)-(Bi+Di)\} \times Wi3 \tag{2}$$

$$bi = \{(Ai-Ci)-j(Bi-Di)\} \times Wi2 \tag{3}$$

$$di = \{(Ai-Ci)+j(Bi-Di)\} \times Wi4 \tag{4},$$

using the ith complex number data Ai, Bi, Ci and Di belonging to the groups of each group combination and the twiddle factors Wi1, Wi2, Wi3 and Wi4, a transposing means for inputting in four by four the computation results ai, bi, ci and di of said first data pass, forming a matrix of 4 rows and 4 columns, and then transposing said matrix, and after this, outputting column by column the complex number data forming the transposed matrix which have been obtained by these computing operations, and a second computing means performing one after another said computing operations (1) to (4) using the complex number data inputted from said transposing means as Ai, Bi, Ci and Di, and storing the results ai, bi, ci and di of these computing operations one after another in said group combinations {AG1, AG2, AG3, AG4}, {BG1, BG2, BG3, BG4}, {CG1, CG2, CG3, CG4} and {DG1, DG2, DG3, DG4} in said working memory.

According to this invention, it is possible to provide by a simple composition a fast Fourier transform processing device capable of coping with both fast Fourier transform algorithms of radix 4 and 2 and performing a faster Fourier transform process than the first invention.

(3) A fast Fourier transform processing system according to the third invention comprises;

a working memory for having complex number data in which the number of sampling points is 2N (N=$4^n \times 2$ or $4^n$, where n is a natural number) inputted from the outside and temporarily storing them as one group, and a computing means which:

performs at one time a series of computing processes composed of dividing complex number data stored in said working memory into 8 groups of A1, B1, C1, D1, A2, B2, C2 and D2 according to computation series and sampling point numbers, performing the following computing operations in relation to every i:

$$a1i = \{(A1i+C1i)+(A2i+C2i)\} \times W1i1 \tag{1}$$

$$c1i = \{(A1i+C1i)-(A2i+C2i)\} \times W1i3 \tag{2}$$

$$b1i = \{(A1i-C1i)-j(A2i-C2i)\} \times W1i2 \tag{3}$$

$$d1i = \{(A1i-C1i)+j(A2i-C2i)\} \times W1i4 \tag{4}$$

$$a2i = \{(B1i+D1i)+(B2i+D2i)\} \times W2i1 \tag{5}$$

$$c2i = \{(B1i+D1i)-(B2i+D2i)\} \times W2i3 \tag{6}$$

$$b2i = \{(B1i-D1i)-j(B2i-D2i)\} \times W2i2 \tag{7}$$

$$d2i = \{(B1i-D1i)+j(B2i-D2i)\} \times W2i4 \tag{8},$$

using the ith complex number data A1i, B1i, C1i, D1i, A2i, B2i, C2i and D2i belonging to the after-division groups A1, B1, C1, D1, A2, B2, C2 and D2 and the twiddle factors W1i1, W1i2, W1i3, W1i4, W2i1, W2i2, W2i3 and W2i4, and storing the results a1i, b1i, c1i, d1i, a2i, b2i, c2i and d2i of these computing operations as complex number data A1i, B1i, C1i, D1i, A2i, B2i, C2i and D2i into said working memory, dividing complex number data stored in said working memory into 4 groups according to computation series and sampling point numbers, and then, repeats at (n−1) times a series of computing processes composed of further dividing each of said groups of complex number data stored in said working memory into 4 groups of A, B, C and D according to computation series and sampling point numbers, performing the following computing operations in relation to every i:

$$ai = \{(Ai+Ci)+(Bi+Di)\} \times Wi1 \tag{9}$$

$$ci = \{(Ai+Ci)-(Bi+Di)\} \times Wi3 \tag{10}$$

$$bi = \{(Ai-Ci)-j(Bi-Di)\} \times Wi2 \tag{11}$$

$$di = \{(Ai-Ci)+j(Bi-Di)\} \times Wi4 \tag{12},$$

using the ith complex number data Ai, Bi, Ci and Di belonging to the after-division groups A, B, C and D and the twiddle factors Wi1, Wi2, Wi3 and Wi4, and storing the results ai, bi, ci, and di of these computing operations as complex number data Ai, Bi, Ci and Di into said working memory, and in case of "$4^n \times 2$", furthermore:

performs at one time the following computing operations in relation to every i:

$$ai = (Ai+Bi) \tag{13}$$

$$bi = (Ai-Bi) \tag{14}$$

$$ci = (Ci+Di) \tag{15}$$

$$di = (Ci-Di) \tag{16},$$

using the complex number data Ai, Bi, Ci and Di obtained by those computing operations, and storing the results a1i, b1i, c1i, a2i, b2i, c2i and d2i of these computing operations into said working memory.

According to this invention, it is possible to provide by a simple composition a fast Fourier transform processing device capable of coping with both fast Fourier transform algorithms of radix 4 and 2 and performing a faster Fourier transform processing than the first invention.

(4) A fast Fourier transform processing system according to the fourth invention comprises;

plural fast Fourier transform processing devices each of which is provided with, a working memory for having complex number data in which the number of sampling points is the $4^n \times 22$ or $4^n$ (where n is a natural number) inputted from the outside and temporarily storing them as one group, a computing means which repeats at n times a series of computing operations of dividing the complex number data stored in said working memory into 4 groups A, B, C and D according to computation series and sampling point numbers, performing the following computations:

$$ai=\{(Ai+Ci)+(Bi+Di)\} \times Wi1 \quad (1)$$

$$ci=\{(Ai+Ci)-(Bi+Di)\} \times Wi3 \quad (2)$$

$$bi=\{(Ai-Ci)-j(Bi-Di)\} \times Wi2 \quad (3)$$

$$di=\{(Ai-Ci)+j(Bi-Di)\} \times Wi4 \quad (4),$$

using the ith complex number data Ai, Bi, Ci and Di belonging to said groups A, B, C and D, and twiddle factors Wi1, Wi2, Wi3 and Wi4 in relation to every i, and storing the computation results ai, bi, ci and di into said working memory as the complex number data Ai, Bi, Ci and Di; and in case that the number of sampling points is $4^n \times 2$, which data path further performs at one time a process of performing the following computations:

$$ai=Ai+Bi \quad (5)$$

$$bi=Ai-Bi \quad (6)$$

$$ci=Ci+Di \quad (7)$$

$$di=Ci-Di \quad (8),$$

using the complex number data Ai, Bi, Ci and Di obtained by those computations in relation to every i, and storing the computation results ai, bi, ci and di, respectively, into said working memory, input data selecting circuits, which are provided in each of said fast Fourier transform processing devices, for selectively inputting complex number data into these fast Fourier transform processing devices, and an output data selecting circuit for selectively making the plural fast Fourier transform processing devices output the complex number data obtained after the computing process.

According to this invention, it is possible to improve the processing speed only by connecting plural fast Fourier transform processing devices with one another and connecting them with input data selecting circuits and an output data selecting circuit.

(5) A fast Fourier transform processing system according to the fifth invention comprises;

plural fast Fourier transform processing devices each of which is provided with, a working memory for having complex number data in which the number of sampling points is $4^n \times 2$ or $4^n$ (where n is a natural number) inputted from the outside and temporarily storing them, a computing means which repeats at n times a series of computing operations of dividing the complex number data stored in said working memory into 4 groups A, B, C and D according to computation series and sampling point numbers, and performing the following computations:

$$ai=\{(Ai+Ci)+(Bi+Di)\} \times Wi1 \quad (1)$$

$$ci=\{(Ai+Ci)-(Bi+Di)\} \times Wi3 \quad (2)$$

$$bi=\{(Ai-Ci)-j(Bi-Di)\} \times Wi2 \quad (3)$$

$$di=\{(Ai-Ci)+j(Bi-Di)\} \times Wi4 \quad (4),$$

using the ith complex number data Ai, Bi, Ci and Di belonging to said groups A, B, C and D, and twiddle factors Wi1, Wi2, Wi3 and Wi4 in relation to every i, and storing the computation results ai, bi, ci and di into said working memory as the complex number data Ai, Bi, Ci and Di, and in case that the number of sampling points is $4^n \times 2$, which data path further performs at one time a process of performing the following computations:

$$ai=Ai+Bi \quad (5)$$

$$bi=Ai-Bi \quad (6)$$

$$ci=Ci+Di \quad (7)$$

$$di=Ci-Di \quad (8),$$

using the complex number data Ai, Bi, Ci and Di obtained by those computations in relation to every i, and storing the computation results ai, bi, ci and di, respectively, into said working memory;

input data selecting circuits, which are provided in each of the fast Fourier transform processing devices, for selectively inputting complex number data from the outside or complex number data outputted from another fast Fourier transform processing device, and an output data selecting circuit for selectively making the respective fast Fourier transform processing devices output the complex number data obtained after the computing process.

According to this invention, it is possible to extend the number of sampling points only by connecting plural fast Fourier transform processing devices and connecting them with input data selecting circuits and an output data selecting circuit.

(6) A fast Fourier transform processing method according to the sixth invention comprises;

a first computing process of having complex number data in which the number of sampling points is $4^n \times 2$ or $4^n$ (where n is a natural number) inputted from the outside and temporarily storing them as one group, a second computing process which repeats at n times a series of steps of dividing each group of complex number data temporarily stored into 4 groups A, B, C and D according to computation series and sampling point numbers, performing the following computations:

$$ai=\{(Ai+Ci)+(Bi+Di)\} \times Wi1 \quad (1)$$

$$ci=\{(Ai+Ci)-(Bi+Di)\} \times Wi3 \quad (2)$$

$$bi=\{(Ai-Ci)-j(Bi-Di)\} \times Wi2 \quad (3)$$

$$di=\{(Ai-Ci)+j(Bi-Di)\} \times Wi4 \quad (4),$$

using the ith complex number data Ai, Bi, Ci and Di belonging to these groups A, B, C and D, and twiddle factors Wi1, Wi2, Wi3 and Wi4 in relation to every i, and substituting ai, bi, ci and di for Ai, Bi, Ci and Di, and in case that said number of sampling points is $4^n \times 2$, further performing at one time a step of performing the following computations:

$$ai=Ai+Bi \quad (5)$$

$$bi=Ai-Bi \quad (6)$$

$$ci=Ci+Di \quad (7)$$

$$di=Ci-Di \quad (8),$$

using the complex number data Ai, Bi, Ci and Di obtained by those computations in relation to every i, and substituting the computation results ai, bi, ci and di for Ai, Bi, Ci and Di.

According to this invention, it is possible to provide only by a simple computing process a fast Fourier transform process capable of coping with both fast Fourier transform algorithms of radix 4 and 2.

(7) A fast Fourier transform processing method according to the seventh invention comprises;

a first process of having complex number data in which the number of sampling points is $4^n \times 2$ or $4^n$ (where n is a natural number) inputted from the outside and temporarily storing them as one group, and a second process of;

repeating at n times a series of computing steps composed of;

a first computing step of dividing each group of complex number data temporarily stored into 16 groups of AG1, BG1, CG1, DG1, AG2, BG2, CG2, DG2, AG3, BG3, CG3, DG3, AG4, BG4, CG4 and DG4 according to computation series and sampling point numbers, a second computing step of performing the following computing operations in relation to each of the group combinations {AG1, BG1, CG1, DG1}, {AG2, BG2, CG2, DG2}, {AG3, BG3, CG3, DG3} and {AG4, BG4, CG4, DG4}:

$$ai = \{(Ai+Ci)+(Bi+Di)\} \times Wi1 \quad (1)$$

$$ci = \{(Ai+Ci)-(Bi+Di)\} \times Wi3 \quad (2)$$

$$bi = \{(Ai-Ci)-j(Bi-Di)\} \times Wi2 \quad (3)$$

$$di = \{(Ai-Ci)+j(Bi-Di)\} \times Wi4 \quad (4),$$

using the ith complex number data $Ai$, $Bi$, $Ci$ and $Di$ belonging to the groups of each group combination and the twiddle factors $Wi1$, $Wi2$, $Wi3$ and $Wi4$, a third computing step of inputting in four by four the computation results $ai$, $bi$, $ci$ and $di$ of the second computing step and forming a matrix of 4 rows and 4 columns and then transposing this matrix, and after this, outputting column by column the complex number data forming the transposed matrix which have been obtained by these operations, and a fourth computing step of performing one after another the computing operations (1) to (4) using these complex number data as $Ai$, $Bi$, $Ci$ and $Di$, and substituting one after another $ai$, $bi$, $ci$ and $di$ for the complex number data $Ai$, $Bi$, $Ci$ and $Di$ of the group combinations {AG1, AG2, AG3, AG4}, {BG1, BG2, BG3, BG4}, {CG1, CG2, CG3, CG4} and {DG1, DG2, DG3, DG4}, and in case that the number of sampling points is $4^n \times 2$, further performing at one time a computing step of performing the following computing operations in relation to every i:

$$ai = Ai + Bi \quad (5)$$

$$bi = Ai - Bi \quad (6)$$

$$ci = Ci + Di \quad (7)$$

$$di = Ci - Di \quad (8),$$

using the complex number data $Ai$, $Bi$, $Ci$ and $Di$ obtained by those computing processes and substituting the computation results $ai$, $bi$, $ci$ and $di$ for $Ai$, $Bi$, $Ci$ and $Di$.

According to this invention, it is possible to provide a fast Fourier transform processing device capable of coping with both fast Fourier transform algorithms of radix 4 and 2 and performing a faster Fourier transform process than the sixth invention.

(8) A fast Fourier transform processing method according to the eighth invention comprises;

a first process of having complex number data in which the number of sampling points is 2N ($N=4^n \times 2$ or $4^n$, where n is a natural number) inputted from the outside and temporarily storing them as one group, and a second process of;

performing at one time a series of computing processes composed of dividing complex number data temporarily stored into 8 groups A1, B1, C1, D1, A2, B2, C2 and D2 according to computation series and sampling point numbers, performing the following computing operations in relation to every i:

$$a1i = \{(A1i+C1i)+(A2i+C2i)\} \times W1i1 \quad (1)$$

$$c1i = \{(A1i+C1i)-(A2i+C2i)\} \times W1i3 \quad (2)$$

$$b1i = \{(A1i-C1i)-j(A2i-C2i)\} \times W1i2 \quad (3)$$

$$d1i = \{(A1i-C1i)+j(A2i-C2i)\} \times W1i4 \quad (4)$$

$$a2i = \{(B1i+D1i)+(B2i+D2i)\} \times W2i1 \quad (5)$$

$$c2i = \{(B1i+D1i)-(B2i+D2i)\} \times W2i3 \quad (6)$$

$$b2i = \{(B1i-D1i)-j(B2i-D2i)\} \times W2i2 \quad (7)$$

$$d2i = \{(B1i-D1i)+j(B2i-D2i)\} \times W2i4 \quad (8),$$

using the ith complex number data $A1i$, $B1i$, $C1i$, $D1i$, $A2i$, $B2i$, $C2i$ and $D2i$ belonging to the after-division groups A1, B 1, C1, D1, A2, B2, C2 and D2 and the twiddle factors $W1i1$, $W1i2$, $W1i3$, $W1i4$, $W2i1$, $W2i2$, $W2i3$ and $W2i4$, and substituting the results $a1i$, $b1i$, $c1i$, $d1i$, $a2i$, $b2i$, $c2i$ and $d2i$ of these computing operations for the $A1i$, $B1i$, $C1i$, $D1i$, $A2i$, $B2i$, $C2i$ and $D2i$, dividing all of complex number data 4 groups according to computation series and sampling point numbers, and then, repeating at (n−1) times a series of computing processes composed of further dividing each of the groups into 4 groups a, B, C and D according to their computation series and sampling point numbers, and performing the following computing operations in relation to every i:

$$ai = \{(Ai+Ci)+(Bi+Di)\} \times Wi1 \quad (9)$$

$$ci = \{(Ai+Ci)-(Bi+Di)\} \times Wi3 \quad (10)$$

$$bi = \{(Ai-Ci)-j(Bi-Di)\} \times Wi2 \quad (11)$$

$$di = \{(Ai-Ci)+j(Bi-Di)\} \times Wi4 \quad (12),$$

using the ith complex number data $Ai$, $Bi$, $Ci$ and $Di$ belonging to the after-division groups A, B, C and D and the twiddle factors $Wi1$, $Wi2$, $Wi3$ and $Wi4$, and substituting the results $ai$, $bi$, $ci$ and $di$ of these computing operations for the $Ai$, $Bi$, $Ci$ and $Di$, and in case of "$N=4^n \times 2$", furthermore performing at one time the following computing operations in relation to every i:

$$ai = (Ai+Bi) \quad (13)$$

$$bi = (Ai-Bi) \quad (14)$$

$$ci = (Ci+Di) \quad (15)$$

$$di = (Ci-Di) \quad (16),$$

using the complex number data Ai, Bi, Ci, and Di obtained by those computing operations, and substituting the results a1i, b1i, c1i, a2i, b2i, c2i and d2i of these computing operations for the A1i, B1i, C1i, D1i, A2i, B2i, C2i and D2i.

According to this invention, it is possible to provide a fast Fourier transform processing method capable of coping with both fast Fourier transform algorithms of radix 4 and 2 and performing a faster Fourier transform processing than the sixth invention.

(9) A fast Fourier transform processing method according to the ninth invention comprises;

a first computing process of storing 2N pieces of complex number data (N $4^n \times 2$ or $4^n$, where n is a natural number) which inputted from the outside to the working memories of first fast Fourier transform processing device and second fast Fourier transform processing device N/4 by N/4 according to sampling point numbers, forming one group in each said working memory, and a second computing process which repeats at (n−1) times a series of steps of dividing each group of complex number data temporarily stored in said working memories of said first and second fast Fourier transform processing device into 4 groups A, B, C and D according to computation series and sampling numbers, performing the following computations:

$$ai = \{(Ai+Ci)+(Bi+Di)\} \times Wi1 \quad (1)$$

$$ci = \{(Ai+Ci)-(Bi+Di)\} \times Wi3 \quad (2)$$

$$bi = \{(Ai-Ci)-j(Bi-Di)\} \times Wi2 \quad (3)$$

$$di = \{(Ai-Ci)+j(Bi-Di)\} \times Wi4 \quad (4),$$

using the ith complex number data Ai, Bi, Ci and Di belonging to these groups A, B, C and D, and twiddle factors Wi1, Wi2, Wi3 and Wi4 in relation to every i, and storing the computation results ai, bi, ci and di into said working memories as Ai, Bi, Ci and Di, replacing the complex number data belonging to the groups C and D of the first fast Fourier transform processing device and the complex number data belonging to the groups A and B of the second fast Fourier transform processing device with one another and then replacing the complex number data belonging to the group B and the complex number data belonging to the group C with one another for each of the first fast Fourier transform processing device and the second fast Fourier transform processing device, a third computing process which repeats at n times a series of steps of further dividing each group of complex number data stored in said first and second fast Fourier transform processing devices into 4 groups A, B, C and D according to computation series and sampling point numbers, performing said computations (1)~(4) using the ith complex number data Ai, Bi, Ci and Di belonging to the after-division groups A, B, C and D and the twiddle factors Wi1, Wi2, Wi3 and Wi4 in relation to every i, and substituting ai, bi, ci and di for Ai, Bi, Ci and Di, and in case that said number of sampling points is $4^n \times 2$, further performing at one time a step of performing the following computations:

$$ai = Ai + Bi \quad (5)$$

$$bi = Ai - Bi \quad (6)$$

$$ci = Ci + Di \quad (7)$$

$$di = Ci - Di \quad (8),$$

using the complex number data Ai, Bi, Ci and Di obtained by those computations in relation to every i, and storing the computation results ai, bi, ci and di in the working RAM, respectively, as Ai, Bi, Ci and Di.

According to this invention, it is possible to perform a Fourier transform process in which the number of sampling points is extended simply by connecting plural fast Fourier transform processing devices, and connecting them with input data selecting circuits and an output data selecting circuit.

BRIEF DESCRIPTION OF THE DRAWINGS

The foregoing and other objects, features and advantages of the present invention will be better understood from the following description taken in connection with the accompanying drawings, in which:

FIG. 1 is a block diagram roughly showing the composition of a fast Fourier transform processing device according to a first embodiment of the invention;

FIG. 19 is a conceptual diagram showing operation of the fast Fourier transform processing device shown in FIG. 18;

DESCRIPTION OF THE PREFERRED EMBODIMENTS

Figure 2A:
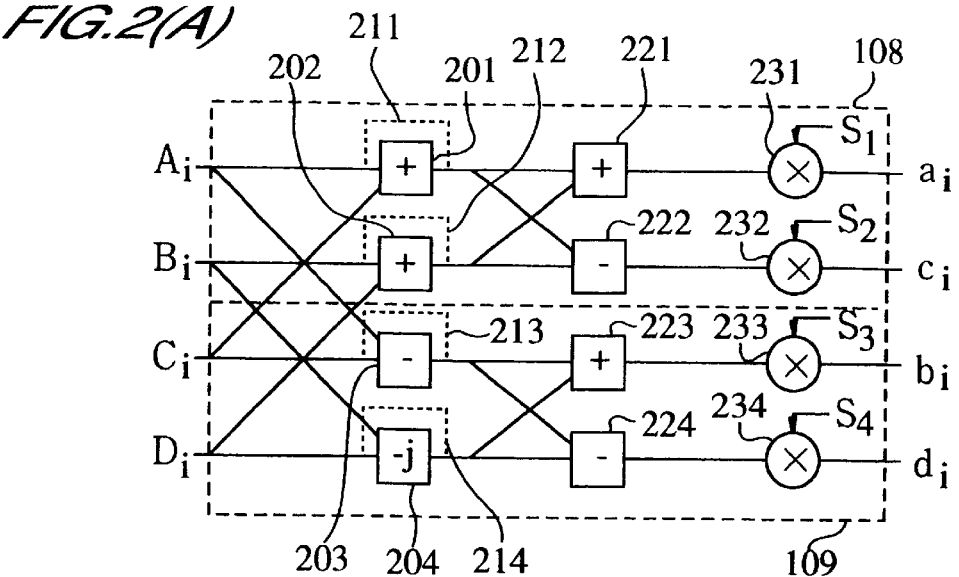
FIG. 2(A) is a block diagram conceptually showing an internal structure of a first data path and a second data path shown in FIG. 1, and FIG. 2(B) and 2(C) are circuits each of which is equivalent to the circuit of FIG. 2(A)

Embodiments of the present invention are described with reference to the drawings in the following.

It should be understood that components in the drawings are shown so roughly that they can be simply understood in size, shape and disposition and the numerical conditions described below are provided only as examples.

First Embodiment

A first embodiment of the present invention is described with reference to FIGS. 1 to 3 in the following.

In this embodiment, a case where the number of sampling points is 2048 is described as an example.

FIG. 1 is a block diagram roughly showing the composition of a fast Fourier transform processing device according to this embodiment.

As shown in FIG. 1, an input terminal 101 to which the real number part of external data is to be inputted and an input terminal 102 to which the imaginary number part of external data is to be inputted are connected respectively to the input ends of registers 103 and 104.

The output ends of these registers 103 and 104 are connected to the input ends at one side of selectors 105 and 106.

Output data of the selectors 105 and 106 are taken in by a working RAM 107.

The working RAM 107 is provided with a data input buffer part 107a, a real number data storing part 107b, an imaginary number data storing part 107c, and a data output buffer part 107d. The working RAM 107 can store complex number data of 2048 points in it.

Output data of this working RAM 107 is inputted into a first data path 108 and a second data path 109. A sin/cos factor ROM 110 stores twiddle factors in it. And twiddle factors outputted from the sin/cos factor ROM 110 are also inputted into the first data path 108 and the second data path 109.

The first data path 108 and the second data path 109 perform a later described computing process, by means of input data and twiddle factors, and output data showing the result of computation.

And this output data is inputted to the working RAM 107 through the selectors 105 and 106. Then, output signals of the working RAM 107 are inputted respectively to selectors 111 and 112.

And output signals of these selectors 111 and 112 are supplied respectively to an output terminal 115 for the real number part and an output terminal 116 for the imaginary number part through registers 113 and 114.

In addition to output signals of the above-mentioned data paths 108 and 109, an output signal of working RAM 107 and an output signal of the sin/cos factor ROM 110 are also inputted to the selectors 111 and 112. And the selectors 111 and 112 supply signals selected by control of a sequence control part 119 described later to output terminals 115 and 116 through the registers 113 and 114.

A clock generating part 117 converts a system clock signal SCLK inputted from the outside and supplies it to a memory address generating part 118 and the sequence control part 119.

The memory address generating part 118 generates an address signal according to the timing of a clock signal inputted from the clock generating part 117 and supplies it to the working RAM 107 and the sin/cos factor ROM 110.

The sequence control part 119 controls operations of the working RAM 107, the data paths 108 and 109, and the sin/cos factor ROM 110 and selects output signals of the selector's 105, 106, 111 and 112, on the basis of a status control signal inputted from the outside and a clock signal inputted from the clock generating part 117. And the sequence control part 119 can also output a status indicating signal to the outside.

FIG. 2(A) is a block diagram conceptually showing an internal structure of the first data path 108 or the second data path 109 shown in FIG. 1.

As shown in FIG. 2(A), each of the data paths 108 and 109 is provided with adders 201 and 202, a subtracter 203, and a complex subtracter 204 as computing elements of the first stage. The adder 201 performs an arithmetic operation (Ai+Ci), the adder 202 performs an arithmetic operation (Bi+Di), the subtracter 203 performs an arithmetic operation (Ai−Ci), and the complex subtracter 204 performs an arithmetic operation j(Bi−Di). These four computing elements 201 to 204 have, respectively, bypasses 211 to 214, and can also transfer data Ai, Bi, Ci and Di to computing elements 221 to 224 of the second stage as they are without performing those computing operations. The sequence control part 119 determines whether data should be computed by the computing elements 201 to 204 or should be transferred through the bypasses 211 to 214 as they are.

As shown in FIG. 2(A), adders 221 and 223, and subtracters 222 and 224 are provided as computing elements of the second stage. The adder 221 adds output values of the adders 201 and 202 of the first stage (or data taken from the bypasses 211 and 212) to each other, the subtracter 222 subtracts output values of the adders 201 and 202 of the first stage (or data taken from the bypasses 211 and 212) from each other, the adder 223 adds an output value of the subtracter 203 of the first stage and an output value of the complex subtracter 204 (or data taken from the bypasses 213 and 214) to each other, and the subtracter 224 subtracts an output value of the subtracter 203 of the first stage and an output value of the complex subtracter 204 (or data taken from the bypasses 213 and 214) from each other.

As shown in FIG. 2(A), furthermore, multipliers 231, 232, 233 and 234 are provided as computing elements of the third stage. The multiplier 231 outputs number ai obtained by multiplying an output value of the adder 221 of the second stage by a twiddle factor W1 or "1" (a signal S1 in FIG. 2(A)) inputted from the sin/cos factor ROM 110, the multiplier 232 outputs number ci obtained by multiplying an output value of the subtracter 222 by a twiddle factor W3 or "1" (a signal S2 in FIG. 2(A)), the multiplier 233 outputs number bi obtained by multiplying an output value of the adder 223 by a twiddle factor W2 or "1" (a signal S3 in FIG. 2(A)), and the multiplier 234 outputs number di obtained by multiplying an output value of the subtracter 224 by a twiddle factor W4 or "1" (a signal S4 in FIG. 2(A)). The sequence control part 119 controls these multipliers 231 to 234 to multiply output values of the computing elements 221 to 224 of the second stage by twiddle factors inputted from the sin/cos factor ROM 110 or by "1".

As described later, when performing a computing process of radix 4 in this embodiment, the device performs the computing process by means of the computing elements 201 to 204 of the first stage (namely, it does not use the bypasses 211 to 214), and multiplies the output values of second stage by twiddle factors by means of the computing elements 231 to 234 of the third stage.

Figure 2B:
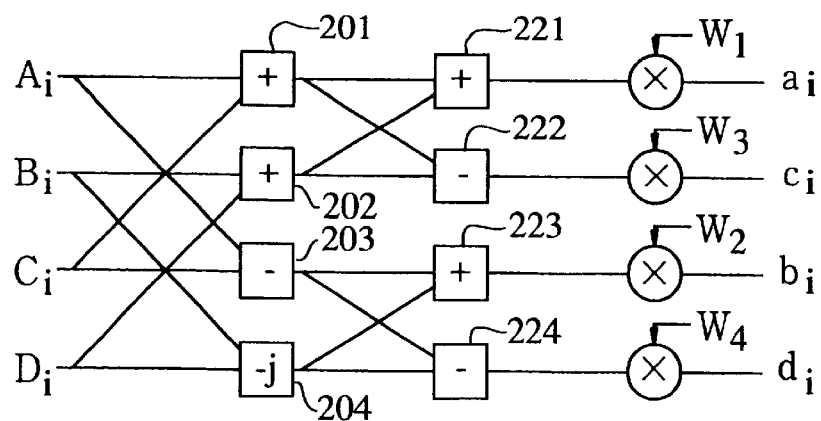

FIG. 2(B) shows an equivalent circuit of the first data path 108 or the second data path 109 in this case.

Figure 2C:
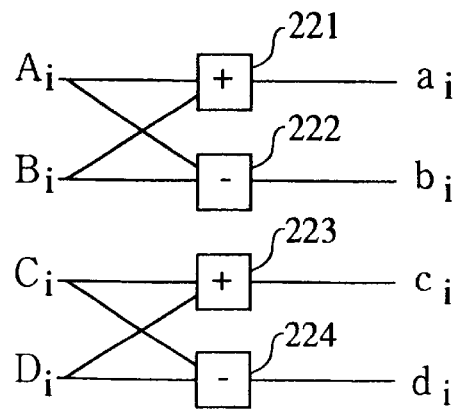

On the other hand, when performing a computing process of radix 2, the device only transfers data by means of the bypasses 211 to 214 at the first stage (namely, it does not perform the computing process by means of the computing elements 201 to 204), and multiplies the output values of second stage by "1" in the computing elements 231 to 234 of the third stage. FIG. 2(C) shows an equivalent circuit of the first data path 108 or the second data path 109 in this case.

Although arithmetic expressions for a fast Fourier transform processing computation according to this embodiment are publicly known, a case where the number of sampling points is 2048 is shown as an example in Table 1.

---

1. Arithmetic expressions for a fast Fourier transform process $X (n_5\ n_4\ n_3\ n_2\ n_1\ n_0)$
$= \Sigma\ \Sigma\ \Sigma\ \Sigma\ \Sigma\ X (k_5\ k_4\ k_3\ k_2\ k_1\ k_0)\ e^{-j(2\pi/2048)nk}$
$= x_6 (n_0\ n_1\ n_2\ n_3\ n_4\ n_5)$ Arithmetic expressions at the respective stages (1 = p to 6) in a 2048-point fast Fourier transform arithmetic $l = 1;\ x_1 (n_0\ k_4\ k_3\ k_2\ k_1\ k_0)$
$= [\Sigma\ X (k_5\ k_4\ k_3\ k_2\ k_1\ k_0)\ d^{-j(\pi/2)k_5 n_0}] H_1$
$k_5 = 0\sim 3$ $l = 2;\ x_2 (n_0\ n_1\ k_3\ k_2\ k_1\ k_0)$
$= [\Sigma\ x_1 (n_0\ k_4\ k_3\ k_2\ k_1\ k_0)\ e^{-j(\pi/2)k_4 n_1}] H_2$
$k_4 = 0\sim 3$ $l = 3;\ x_3 (n_0\ n_1\ n_2\ k_2\ k_1\ k_0)$
$= [\Sigma\ x_2 (n_0\ n_1\ k_3\ k_2\ k_1\ k_0)\ e^{-j(\pi/2)k_3 n_2}] H_3$
$k_3 = 0\sim 3$ $l = 4;\ x_4 (n_0\ n_1\ n_2\ n_3\ k_1\ k_0)$
$= [\Sigma\ x_3 (n_0\ n_1\ n_2\ k_2\ k_1\ k_0)\ e^{-j(\pi/2)k_2 n_3}] H_4$
$k_2 = 0\sim 3$ $l = 5;\ x_5 (n_0\ n_1\ n_2\ n_3\ n_4\ k_0)$
$= [\Sigma\ x_4 (n_0\ n_1\ n_2\ n_3 k_1\ k_0)\ e^{-j(\pi/2)k_1 n_4}] H_5$
$k_1 = 0\sim 3$ $l = 6;\ x_6 (n_0\ n_1\ n_3\ n_4\ n_5)$
$= [\Sigma\ x_5 (n_0\ n_1\ n_2\ n_3\ n_4\ k_0)\ e^{-j(\pi)k_0 n_5}]\ 1$
$k_0 = 0\sim 1$

---

-continued

1. Arithmetic expressions for a fast Fourier transform process

Expressions for finding variables k and n $k = (4^4 k_5 + 4^3 k_4 + 4^2 k_3 + 4^1 k_2 + 4^0 k_1) + k_0$
; $k_5 \sim k_1 = 0, 1, 2, 3\ k_0 = 0, 1$
$n = 4^5 n_5 + 4^4 n_4 + 4^3 n_3 + 4^2 n_2 + 4^1 n_1 + n_0$
; $n_5 = 0, 1\ n_4 \sim n_0 = 0, 1, 2, 3$

---

TABLE 2

2. Twiddle factors to be used at the respective stages $H_1 = e^{-j(\pi/8)(k_4 + k_3/4 + k_2/16 + k_1/64 + k_0/128)n_0}$
$H_2 = e^{-j(\pi/8)(k_3 + k_2/4 + k_1/16 + k_0/32)n_1}$
$H_3 = e^{-j(\pi/8)(k_2 + k_1/4 + k_0/8)n_2}$
$H_4 = e^{-j(\pi/8)(k_1 + k_0/2)n_3}$
$H_5 = e^{-j(\pi/4)k_0 n_4}$

---

Next, an internal structure of the working RAM 107 shown in FIG. 1 is described with reference to FIG. 3 in the following.

Figure 3:
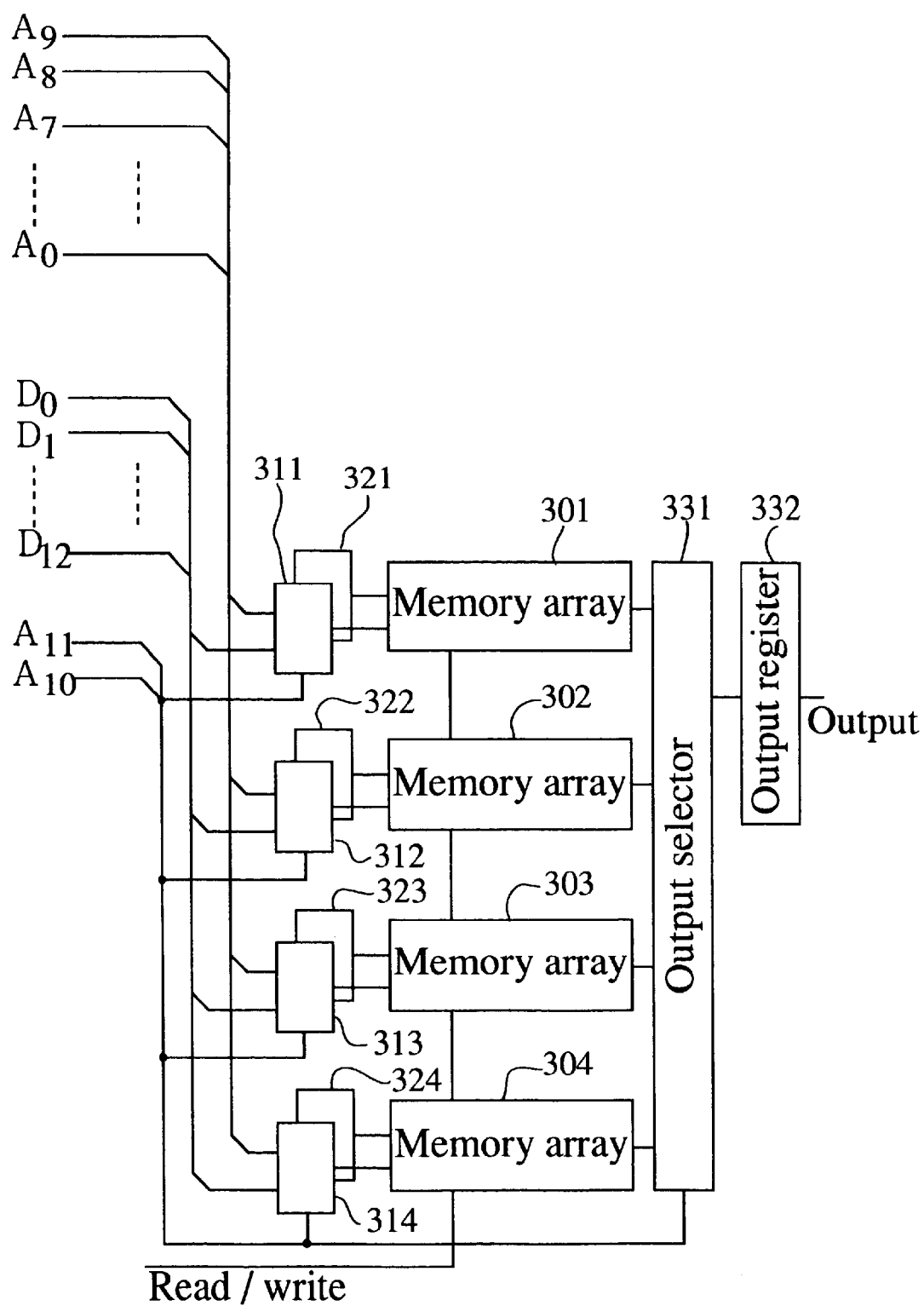
FIG. 3 is a block diagram roughly showing an internal structure of the working RAM shown in FIG. 1.

As shown in FIG. 3, the working RAM 107 is provided with memory arrays 301 to 304 for storing information, write-data registers 311 to 314 for temporarily holding data to be written into these memory arrays 301 to 304, address registers 321 to 324 for temporarily holding address data at the time of addressing write data or read data, an output selector 331 for selecting output data from the memory arrays 301 to 304, and an output register 332 for temporarily holding output data outputted from the four output selectors.

Although the composition adopted in this case has memory arrays and registers that are respectively divided into four parts, this composition is not essential. In order to perform read and write operations at the same time, however, it is better to divide them into two or more operations, or to use a multiport memory array.

Next, operation of the fast Fourier transform processing device shown in FIG. 1 is described.

First, data to be processed (a complex number) is divided into its real number part and its imaginary number part, and inputted the device through the input terminals 101 and 102. At this time, the selectors 105 and 106 have selected inputs from the registers 103 and 104 by control of the sequence control part 119. Therefore, the real number part is stored into the real number data storing part 107b of the working RAM 107 and the imaginary number part is stored into the imaginary number data storing part 107c. In this way, complex number data of 2048 points are stored one after another into the working RAM 107.

When storing data to be processed into the working RAM 107 has been finished, then a fast Fourier transform process is performed using these data to be processed.

Since it is assumed that the number of sampling points is 2048 (the 5th power of 4×2) in this embodiment, as described below, the device repeats a computing process of radix 4 at 5 successive times, and then performs a computing process of radix 2 at one time.

First, the first computing process (of radix 4) is described.

Figure 4:
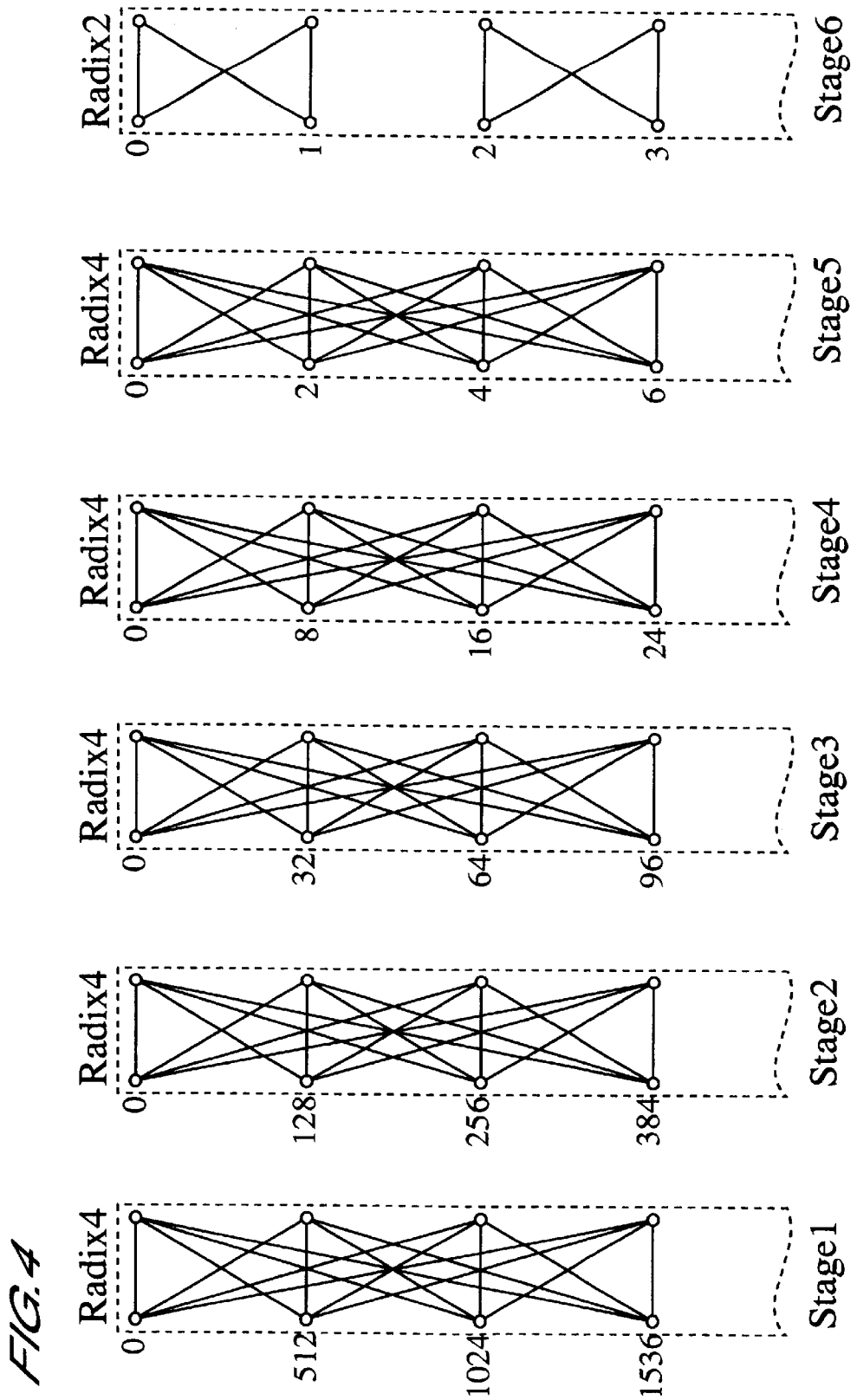
FIG. 4 is a conceptual diagram showing operation of a fast Fourier transform processing device according to the first embodiment of the invention.

As shown in stage 1 of FIG. 4 (each of the stages corresponds to a "computation series" of the present invention), in this computing process the device divides complex number data stored in the working RAM 107 into four groups according to stored addresses (which coincide with "sampling point numbers" of the invention) to handle them. That is to say, the device sets the complex number data stored in addresses 0 to 511 as group A, the complex number data stored in addresses 512 to 1023 as group B, the complex number data stored in addresses 1024 to 1535 as group C, and the complex number data stored in addresses 1536 to 2047 as group D.

First, the working RAM 107 outputs the first complex number data of each of the groups A, B, C and D (namely, the complex number data of addresses 0, 512, 1024 and 1536). These four pieces of complex number data are inputted respectively into the first data path 108 and the second data path 109. At the same time as this, the sin/cos factor ROM 110 outputs twiddle factors W1, W2, W3 and W4, respectively, corresponding to addresses 0, 512, 1024 and 1536. And the twiddle factors W1 and W3 are inputted to the first data path 108, and the twiddle factors W2 and W4 are inputted to the second data path 109.

The first data path 108 computes complex number data ai and ci by performing computation of the following expressions (1) and (2):

$$ai = \{(Ai+Ci)+(Bi+Di)\} \times W1 \quad (1)$$

$$ci = \{(Ai+Ci)-(Bi+Di)\} \times W3 \quad (2)$$

The second data path 109 computes complex number data bi and di by performing computation of the following expressions (3) and (4):

$$bi = \{(Ai-Ci)-j(Bi-Di)\} \times W2 \quad (3)$$

$$di = \{(Ai-Ci)+j(Bi-Di)\} \times W4 \quad (4)$$

In the expressions (1) to (4), Ai, Bi, Ci and Di represent, respectively, data belonging to the groups Ai, Bi, Ci and Di out of the complex number data stored in the working RAM 107. That is to say, in this case, they represent the complex number data of addresses 0, 512, 1024 and 1536.

A butterfly arithmetic operation using these expressions (1) to (4) is described with reference to FIG. 2(B).

As shown in FIG. 2(B), the first data path 108 and the second data path 109 take in the complex number data corresponding to Ai, Bi, Ci and Di, and compute (Ai+Ci), (Bi+Di), (Ai−Ci) and j(Bi−Di) at the first stage, and then compute "(Ai+Ci)+(Bi+Di)", "(Ai+Ci)−(Bi+Di)", "(Ai−Ci)−j(Bi−Di)" and "(Ai−Ci)+j(Bi−Di)" using those computed values at the second stage, and further compute "{(Ai+Ci)+(Bi+Di)}×W1", "{(Ai+Ci)−(Bi+Di)}×W3", "{(Ai−Ci)−j(Bi−Di)}×W2" and "{(Ai−Ci)+j(Bi−Di)}×W4" using those computed values at the third stage, and outputs them, respectively, as the computation results ai, bi, ci and di.

When the computing process has been finished, the computation results ai, bi, ci and di are outputted from the data paths 108 and 109. At this time, the selectors 105 and 106 select inputs from the data paths 108 and 109 by control of the sequence control part 119. And the output data of the data paths 108 and 109 are stored into the working RAM 107.

At this time, the computation result ai of the expression (1) is stored at an address belonging to the group A (address 0 in this case), the computation result bi of the expression (3) is stored at an address belonging to the group B (address 512 in this case), the computation result ci of the expression (2) is stored at an address belonging to the group C (address 1024 in this case), and the computation result di of the expression (4) is stored at an address belonging to the group D (address 1536 in this case). Locations for storing the complex number data ai, bi, ci and di are determined by the sequence control part 119 controlling the memory address generating part 118.

Following this, the device performs the same computing process using the complex number data of addresses 1, 513, 1025 and 1537, and then performs computing processes one after another in the same way in relation to the complex number data of all the addresses.

When the first computing process has been finished in this way, then the device performs the second computing process (of radix 4) in the following manner.

As shown in stage 2 of FIG. 4, in the second computing process the device further divides addresses 0 to 511, addresses 512 to 1023, addresses 1024 to 1535 and addresses 1536 to 2047 out of the addresses of the working RAM 107, respectively, into four groups. That is to say, in the second computing process the device divides the addresses of the working RAM 107 into 16 parts in total.

And for example, the device handles addresses 0 to 127 as group A, addresses 128 to 255 as group B, addresses 256 to 383 as group C and addresses 384 to 511 as group D among addresses 0 to 511, and performs a computing process on them using the above-mentioned expressions (1) to (4).

That is to say, the device first reads out the complex number data of addresses 0, 128, 256 and 384 from the working RAM 107, reads out twiddle factors corresponding to these addresses from the sin/cos factor ROM 110, and takes in them into the data paths 108 and 109. Following this, the device executes the above-mentioned expressions (1) to (4), using the complex number data of address 0 as Ai, the complex number data of address 128 as Bi, the complex number data of address 256 as Ci and the complex number data of address 384 as Di. And the device stores the complex number data ai, bi, ci and di obtained by these computing operations, respectively, into addresses 0, 128, 256 and 384 the working RAM 107. After this, in the same way as this, the device performs a computing process using complex number data of addresses 0 to 511 one after another.

When a computing process using the complex number data of addresses 0 to 511 has been finished, then the device divides addresses 512 to 1023 into groups A, B, C and D, and performs the same computing process. Furthermore, the device performs a computing process in the same way also in relation to the complex number data of addresses 1024 to 1535 and addresses 1536 to 2047.

When the second computing process has been finished in this way, then the device performs the third computing process (of radix 4) in the following manner.

As shown in stage 3 of FIG. 4, in the third computing process the device further divides each of the address groups obtained by dividing the addresses of the working RAM 107 into 16 parts in the second computing process into four groups A, B, C and D. That is to say, in the third computing process the device divides the addresses of the working RAM 107 into 64 parts in total.

For example, the device handles addresses 0 to 31 as group A, addresses 32 to 63 as group B, addresses 64 to 95 as group C and addresses 96 to 127 as group D among addresses 0 to 127, which are the first address group obtained by dividing into 16 parts in the second computing process.

In the third computing process also, the device first reads out the complex number data of addresses 0, 32, 64 and 96 from the working RAM 107, reads out the twiddle factors corresponding to these addresses from the sin/cos factor ROM 110, and takes them into the data paths 108 and 109.

Following this, the device executes the above-mentioned expressions (1) to (4), using the complex number data of address 0 as Ai, the complex number data of address 32 as Bi, the complex number data of address 64 as Ci and the complex number data of address 96 as Di. And the device stores the complex number data ai, bi, ci and di obtained by these computing operations, respectively, at addresses 0, 32, 64 and 96 of the working RAM 107. After this, in the same way as this, the device performs a computing process using complex number data of other addresses one after another.

After a computing process using the complex number data of addresses 0 to 127 has been finished, the device divides addresses 128 to 255 into groups A, B, C and D, and performs the same computing process. Furthermore, it also performs a computing process in the same way in relation to the complex number data of the remaining address blocks.

When the third computing process has been finished in this way, then the device performs the fourth computing process (of radix 4) in the following manner.

In the fourth computing process, as shown in stage 4 of FIG. 4, the device further divides each of the address groups obtained by dividing the addresses of the working RAM 107 into 64 parts in the third computing process into four groups A, B, C and D. That is to say, in the fourth computing process the device divides the addresses of the working RAM 107 into 256 parts in total.

For example, the device handles addresses 0 to 7 as group A, addresses 8 to 15 as group B, addresses 16 to 23 as group C and addresses 24 to 31 as group D among addresses 0 to 31, which are the first address block obtained by dividing the addresses of the working RAM 107 into 64 parts in the third computing process.

And the device first reads out the complex number data of addresses 0, 8, 16 and 24 from the working RAM 107, reads out the twiddle factors corresponding to these addresses from the sin/cos factor ROM 110, and takes in them into the data paths 108 and 109. Following this, the device executes the above-mentioned expressions (1) to (4), using the complex number data of address 0 as Ai, the complex number data of address 8 as Bi, the complex number data of address 16 as Ci and the complex number data of address 24 as Di. After this, the device stores the complex number data ai, bi, ci and di obtained by these computing operations, respectively, at addresses 0, 8, 16 and 24 of the working RAM 107. After this, in the same way as this, the device performs a computing process using complex number data of other addresses one after another.

When a computing process using the complex number data of addresses 0 to 31 has been finished in this manner, then the device divides addresses 32 to 63 into groups A, B, C and D, and performs the same computing process. Furthermore, the device performs a computing process in the same way also in relation to complex number data of the remaining address blocks.

When the fourth computing process has been finished in this way, then the device performs the fifth computing process (of radix 4) in the following manner.

In the fifth computing process also, as shown in stage 5 of FIG. 4, the device further divides each of the address groups obtained by dividing the addresses of the working RAM 107 into 256 parts in the fourth computing process into four groups of A, B, C and D. That is to say, in the fifth computing process the device divides the addresses of the working RAM 107 into 1024 parts in total.

For example, the device handles addresses 0 and 1 as group A, addresses 2 and 3 as group B, addresses 4 and 5 as group C and addresses 6 and 7 as group D among addresses 0 to 7, which are the first address group obtained by dividing the addresses of the working RAM 107 into 256 parts.

And the device first reads out the complex number data of addresses 0, 2, 4 and 6 from the working RAM 107, reads out the twiddle factors corresponding to these addresses from the sin/cos factor ROM 110, and takes them into the data paths 108 and 109. Following this, the device executes the above-mentioned expressions (1) to (4), using the complex number data of address 0 as Ai, the complex number data of address 2 as Bi, the complex number data of address 4 as Ci and the complex number data of address 6 as Di. After this, the device stores the complex number data ai, bi, ci and di obtained by these computing operations, respectively, at addresses 0, 2, 4 and 6 of the working RAM 107. After this, in the same way as this, the device performs a computing operation using complex number data of addresses 1, 3, 5 and 7 one after another.

When a computing process using the complex number data of addresses 0 to 7 has been finished in this manner, then the device divides addresses 8 to 15 into groups A, B, C and D, and performs the same computing process. Furthermore, the device performs a computing process in the same way also in relation to complex number data of the remaining address blocks.

When the fifth computing process has been finished in this way, then the device performs a computing process of radix 2 as the sixth computing process. In this computing process, as shown in stage 6 of FIG. 4, the device divides the addresses of the working RAM 107 into 1024 groups in the same way as in fifth computing process. In this case the device performs the same computing process for groups A and B as that for groups C and D.

For example, the device handles address 0 as group A, address 1 as group B, address 2 as group C and address 3 as group D among addresses 0 and 1 of the first address group and addresses 2 and 3 of the second address group, which are obtained by dividing the addresses of the working RAM 107 into 1024 parts.

And the device first reads out the complex number data of addresses 0, 1, 2 and 3 from the working RAM 107.

The first data path 108 computes complex number data ai and bi by performing arithmetic operations of the following expressions (5) and (6):

$$ai = Ai + Bi \qquad (5)$$

$$bi = Ai - Bi \qquad (6).$$

And the second data path 109 computes complex number data ci and di by performing arithmetic operations of the following expressions (7) and (8):

$$ci = Ci + Di \qquad (7)$$

$$di = Ci - Di \qquad (8).$$

In the expressions (5) to (8), Ai, Bi, Ci and Di, respectively, represent data belonging to addresses of the groups A, B, C and D among the complex number data stored in the working RAM 107.

A butterfly arithmetic operation using these expressions (5) to (8) is described with reference to FIG. 2(C).

As shown in FIG. 2(C), first, the first data path 108 takes in complex number data Ai and Bi and the second data path 109 takes in complex number data Ci and Di. And the first data path 108 computes (Ai+Bi) and (Ai−Bi), and outputs the computation results ai and bi.

On the other hand, the second data path 109 computes (Ci+Di) and (Ci−Di), and outputs the computation results ci and di.

The computation results ai, bi, ci and di obtained in this manner are stored at addresses 0, 1, 2 and 3 of the working RAM 107.

When a computing process using the complex number data of addresses 0 to 3 has been finished in this manner, then the device performs the same computing process also in relation to complex number data of the remaining address blocks.

After this, the complex number data stored in the working RAM 107 are outputted to the outside from the output terminals 115 and 116 through the registers 113 and 114.

Figure 12:
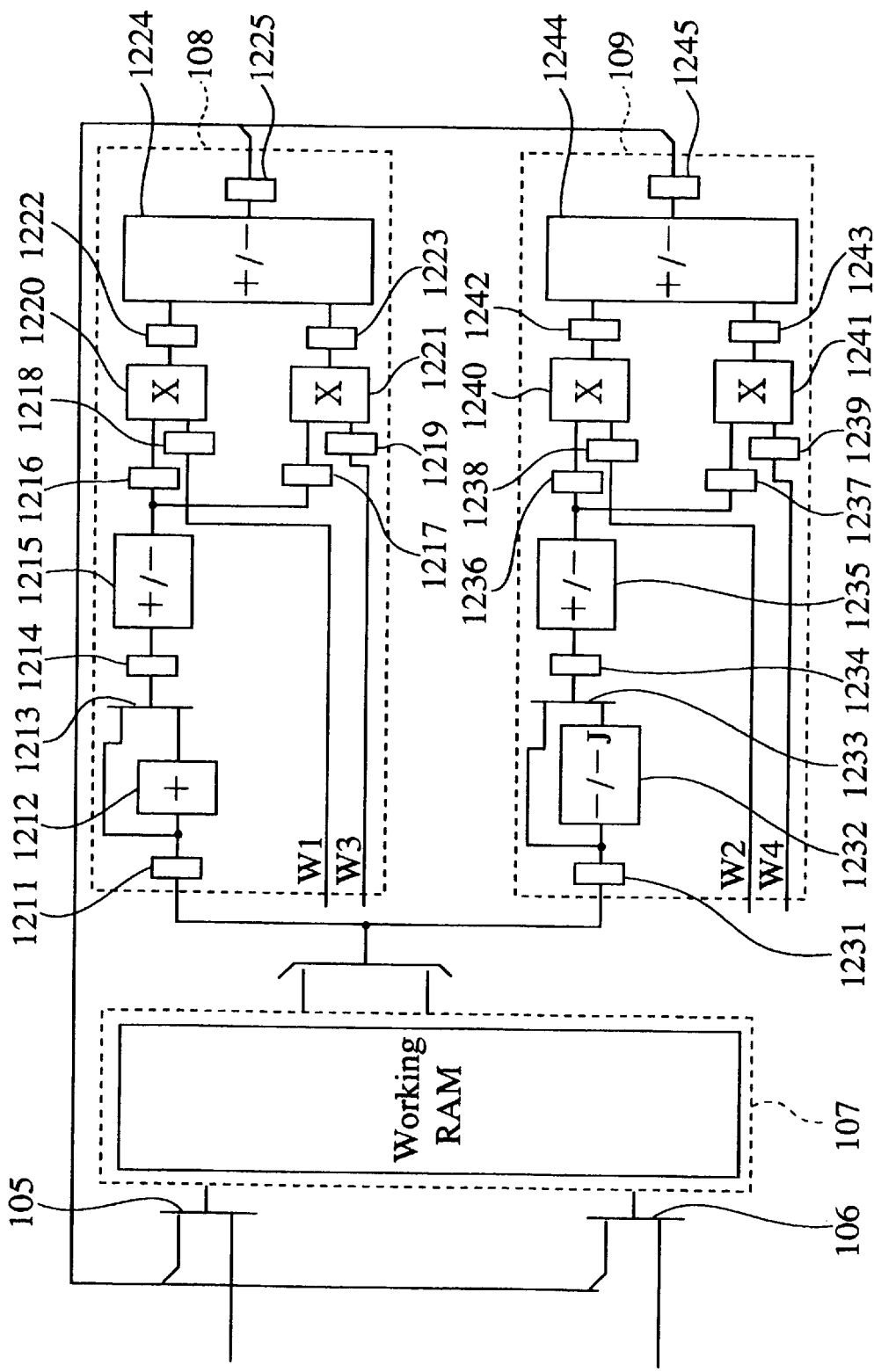
FIG. 12 is a block diagram roughly showing another example of the composition of the data paths and according to the first embodiment.

Next, another example of a composition of the data paths 108 and 109 according to this embodiment is described with reference to FIG. 12. In FIG. 12, components to which the same symbols as those of FIG. 1 are given represent the same components as those of FIG. 1.

In the first data path 108 shown in FIG. 12, a register 1211 temporarily holds the real number part or the imaginary number part of complex number data Ai to Di inputted from the working RAM 107.

And an adder 1212 performs a computing operation as described later using data inputted from the register 1211.

A selector 1213 selects and outputs data inputted from the adder 1212 or data inputted from the register 1211 to a register 1214.

The register 1214 temporarily holds data inputted from the selector 1213.

An adder/subtracter 1215 performs addition or subtraction as described later using complex number data inputted from the register 1214.

Registers 1216 and 1217 alternate with each other in temporarily holding data outputted from the adder/subtracter 1215.

A register 1218 temporarily holds a twiddle factor W1 inputted from the sin/cos factor ROM 110 (see FIG. 1). And a register 1219 temporarily holds a twiddle factor W3 inputted from the sin/cos factor ROM 110.

A multiplier 1220 multiplies data inputted from the register 1216 by a twiddle factor W1, a real number "1" or a real number "0". In the same way, a multiplier 1221 multiplies data inputted from the register 1217 by a twiddle factor W3, a real number "1" or a real number "0".

A register 1222 temporarily holds a computation result outputted by the multiplier 1220. In the same way, the register 1223 temporarily holds a computation result outputted by the multiplier 1221.

An adder/subtracter 1224 performs addition or subtraction as described later using data inputted from the registers 1222 and 1223.

A register 1225 temporarily holds data inputted from the adder/subtracter 1224. Data held by this register 1225 are stored through the selectors 105 and 106 into the working RAM 107.

In the second data path 109, a register 1231 temporarily holds the real number part or the imaginary number part of complex number data Ai to Di inputted from the working RAM 107.

And a subtracter/complex subtracter 1232 performs a computing operation as described later using data inputted from the register 1231.

A selector 1233 selects and outputs data inputted from the subtracter/complex subtracter 1232 or data inputted from the register 1231 to a register 1234.

The register 1234 temporarily holds data inputted from the selector 1233.

An adder/subtracter 1235 performs addition or subtraction as described later using complex number data inputted from the register 1234.

Registers 1236 and 1237 alternate with each other in temporarily holding data outputted from the adder/subtracter 1235.

A register 1238 temporarily holds a twiddle factor W2 inputted from the sin/cos factor ROM 110 (see FIG. 1). And a register 1239 temporarily holds a twiddle factor W4 inputted from the sin/cos factor ROM 110.

A multiplier 1240 multiplies data inputted from the register 1236 by the twiddle factor W2, a real number "1" or a real number "0". In the same way, a multiplier 1241 multiplies data inputted from the register 1237 by the twiddle factor W4, a real number "1" or a real number "0".

A register 1242 temporarily holds a computation result outputted by the multiplier 1240. In the same way, the register 1243 temporarily holds a computation result outputted by the multiplier 1241.

An adder/subtracter 1244 performs addition or subtraction as described later using data inputted from the registers 1242 and 1243.

A register 1245 temporarily holds data inputted from the adder/subtracter 1244. Data held by this register 1245 are stored through the selectors 105 and 106 into the working RAM 107.

Following this, operation of the data paths 108 and 109 shown in FIG. 12 is described with reference to FIGS. 13 to 16.

Figure 13:
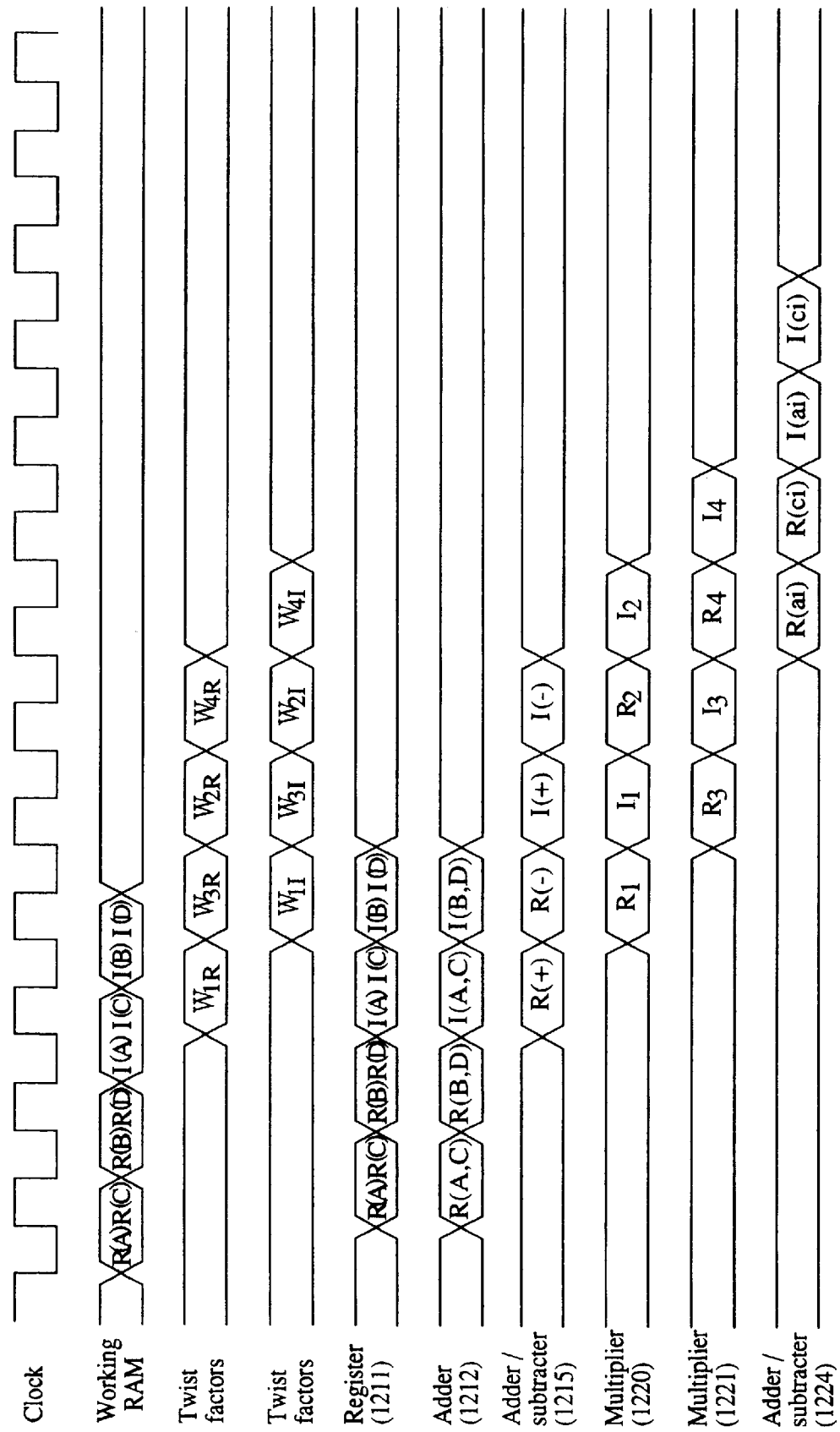
FIG. 13 is a timing chart for explaining operation of the data path when the radix is 4.

FIG. 13 is a timing chart for explaining operation of the data path 108 in case that the radix is 4.

As shown in FIG. 13, at trailing edges of the system clock SCLK the working RAM 107 outputs one after another the real parts (represented by R(A) and R(C) in FIG. 13) of complex number data Ai and Ci, the real parts (represented by R(B) and R(D) in FIG. 13) of complex number data Bi and Di, the imaginary parts (represented by I(A) and I(C) in FIG. 13) of the complex number data Ai and Ci, and the imaginary parts (represented by I(B) and I(D) in FIG. 13) of the complex number data Bi and Di. These data R(A) and R(C), R(B) and R(D), I(A) and I(C), and I(B) and I(D) are stored one after another into the register 1211 at leading edges of the system clock SCLK.

The adder 1212 first has data R(A) and R(C) inputted from the register 1211, and performs a computing operation "R(A, C)=R(A)+R(C)". Following this, the adder 1212 performs one after another similar computing operations "R(B, D)=R(B)+R(D)", "I(A, C)=I(A)+I(C)", and "I(B, D)=I(B)+I(D)". The computation results R(A, C), R(B, D), I(A, C) and I(B, D) are stored one after another into the register 1214 through the selector 1213.

The adder/subtracter 1215 first has data R(A, C) and data R(B, D) inputted from the register 1214 and performs a computing operation "R(+)=R(A, C)+R(B, D)", and then has data R(A, C) and data R(B, D) inputted again from the register 1214 and performs a computing operation "R(−)=R(A, C)−R(B, D)". Furthermore, the adder/subtracter 1215 has data I(A, C) and data I(B, D) inputted from the register 1214 and performs a computing operation "I(+)=I(A, C)+I(B, D)", and then has data I(A, C) and data I(B, D) inputted again from the register 1214 and performs a computing operation "I(−)=I(A, C)−I(B, D)". The computation results R(+) and I(+) are stored into the register 1216, while the computation results R(−) and I(−) are stored into the register 1217.

The multiplier 1220 first computes R1 by multiplying the data R(+) inputted from the register 1216 by the real number part W1R of a twiddle factor W1 inputted from the register 1218, and furthermore computes I1 by multiplying the data R(+) by the imaginary number part W1I of the twiddle factor W1. Next, the multiplier 1220 computes R2 by multiplying the data I(+) inputted from the register 1216 by the imaginary number part W1 I of the twiddle factor W1, and then computes I2 by multiplying the data I(+) by the real number part W1 R of the twiddle factor W1. The computation results R1, I1, R2, and I2 are stored into the register 1222.

On the other hand, the multiplier 1221 first computes R3 by multiplying the data R(−) inputted from the register 1217 by the real number part W3R of a twiddle factor W3 inputted from the register 1219, and furthermore computes I3 by multiplying the data R(−) by the imaginary number part W3I of the twiddle factor W3. Next, the multiplier 1221 computes R4 by multiplying the data I(−) inputted from the register 1217 by the imaginary number part W3I of the twiddle factor W3, and then computes I4 by multiplying the data I(−) by the real number part W3R of the twiddle factor W3. The computation results R3, I3, R4, and I4 are stored into the register 1223.

The adder/subtracter 1224 first computes "R(ai)=R1+R2" using data R1 and R2 read in from the register 1222, and then computes "R(ci)=R3+R4" using data R3 and R4 read in from the register 1223. Furthermore, the adder/subtracter 1224 computes "I(ai)=I1+I2" using data I1 and I2 read in from the register 1222, and then computes "I(ci)=I3+I4" using data I3 and I4 read in from the register 1223. In this way, the real number part R(ai) and the imaginary number part I(ai) of the complex number data ai shown in the above expression (1), and the real number part R(ci) and the imaginary number part I(ci) of the complex number data ci shown in the above expression (2) can be obtained. These computation results are stored into the working RAM 107 through the register 1225 and the selector 105.

Figure 14:
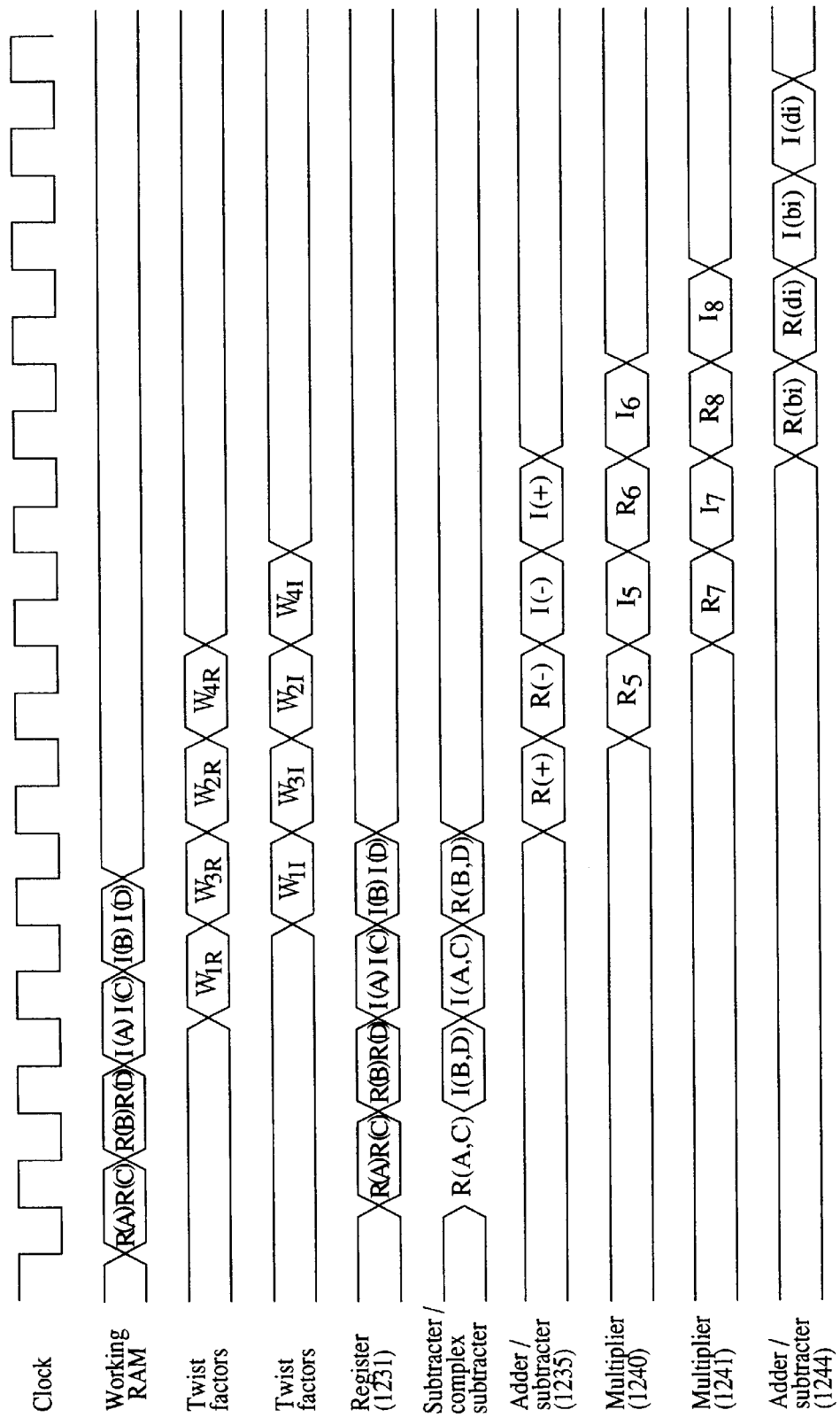
FIG. 14 is a timing chart for explaining operation of the data path when the radix is 4.

FIG. 14 is a timing chart for explaining operation of the data path 109 in case that the radix is 4.

As described above with reference to FIG. 13, when the working RAM 107 outputs one after another data R(A) and R(C), data R(B) and R(D), data I(A) and I(C), and data I(B) and I(D), these data are stored one after another also into the register 1231.

The subtracter/complex subtracter 1232 first has data R(A) and R(C) inputted from the register 1231, and performs the computing operation "R(A, C)=R(A)−R(C)". Next, the subtracter/complex subtracter 1232 performs the computing operations "I(B, D)=j(R(B)−R(D))", "I(A, C)=I(A)−I(C)", and "R(B, D)=j(I(B)−I(D))". These computation results R(A, C), I(B, D), I(A, C) and R(B, D) are stored one after another into the register 1234 through the selector 1233.

The adder/subtracter 1235 first has data R(A, C) and data R(B, D) inputted from the register 1234 and performs a computing operation "R(+)=R(A, C)+R(B, D)", and then has data R(A, C) and data R(B, D) inputted again from the register 1234 and performs a computing operation "R(−)=R(A, C)−R(B, D)". Furthermore, the adder/subtracter 1235 has data I(A, C) and data I(B, D) inputted from the register 1234 and performs a computing operation "I(−)=I(A, C)−I(B, D)", and then has data I(A, C) and data I(B, D) inputted again from the register 1234 and performs a computing operation "I(+)=I(A, C)+I(B, D)". The computation results R(+) and I(−) are stored into the register 1236, while the computation results R(−) and I(+) are stored into the register 1237.

The multiplier 1240 first computes R5 by multiplying the data R(+) inputted from the register 1236 by the real number part W2R of a twiddle factor W2 inputted from the register 1238, and furthermore computes I5 by multiplying the data R(+) by the imaginary number part W2I of the twiddle factor W2. Next, the multiplier 1240 computes R6 by multiplying the data I(−) inputted from the register 1236 by the imaginary number part W2I of the twiddle factor W2, and then computes I6 by multiplying the data I(−) by the real number part W2R of the twiddle factor W2. These computation results R5, I5, R6, and I6 are stored into the register 1242.

On the other hand, the multiplier 1241 first computes R7 by multiplying the data R(−) inputted from the register 1237 by the real number part W4R of a twiddle factor W4 inputted from the register 1239, and furthermore computes I7 by multiplying the data R(−) by the imaginary number part W4I of the twiddle factor W4. Next, the multiplier 1241 computes R8 by multiplying the data I(+) inputted from the register 1236 by the imaginary number part W4I of the twiddle factor W4, and then computes I8 by multiplying the data I(+) by the real number part W4R of the twiddle factor W4. These computation results R7, I7, R8, and I8 are stored into the register 1243.

The adder/subtracter 1244 first computes "R(bi)=R5+R6" using data R5 and R6 read in from the register 1242, and then computes "R(di)=R7+R8" using data R7 and R8 read in from the register 1243. Furthermore, the adder/subtracter 1244 computes "I(bi)=I5+I6" using data I5 and I6 read in from the register 1242, and then computes "I(di) =I7+I8" using data I7 and I8 read in from the register 1243. These computation results are stored into the working RAM 107 through the register 1245 and the selector 105.

Figure 15:
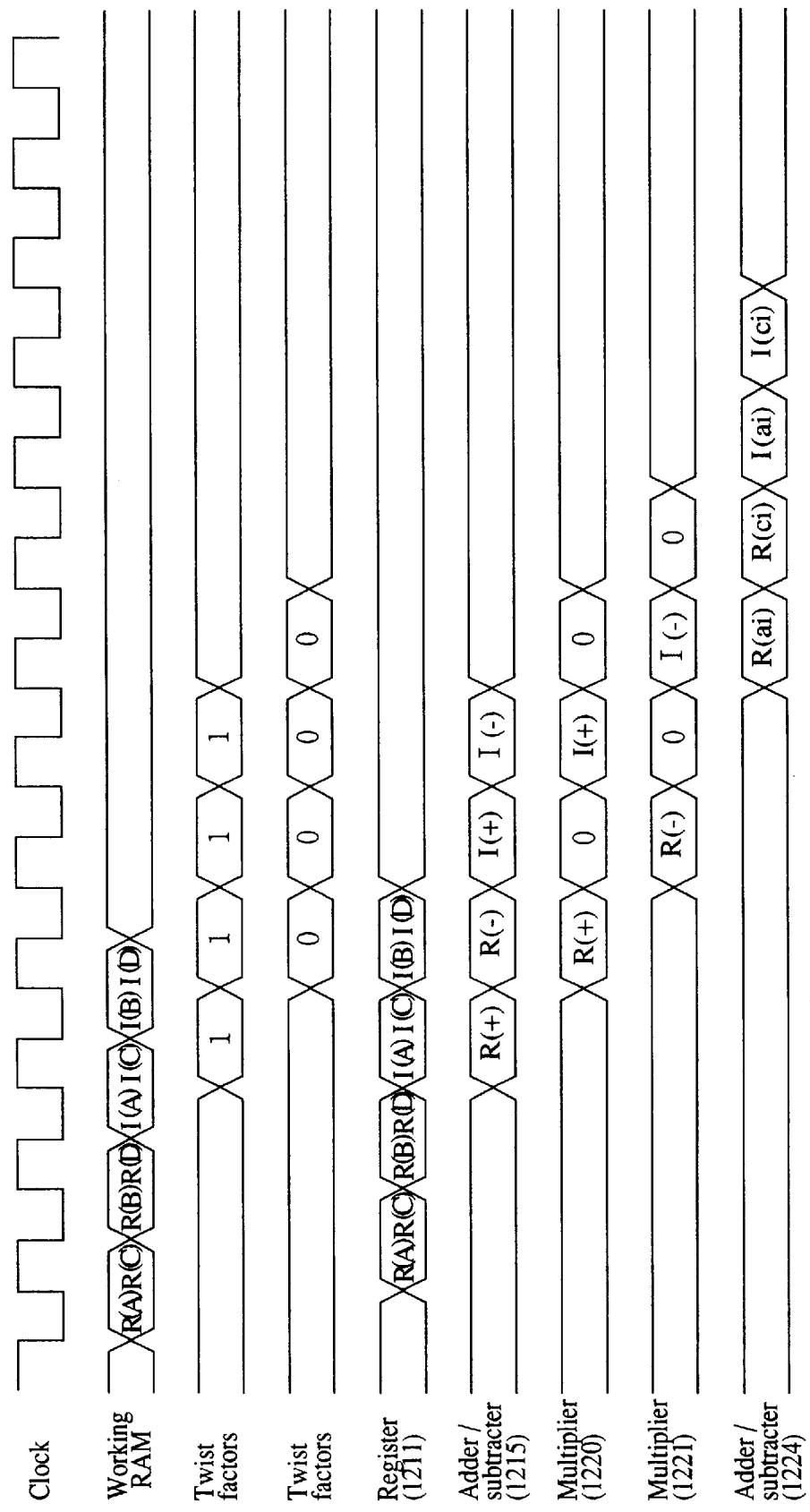
FIG. 15 is a timing chart for explaining operation of the data path when the radix is 2.

FIG. 15 is a timing chart for explaining operation of the data path 108 in case that the radix is 2.

As shown in FIG. 15, in the same way as the case of the radix 4, at trailing edges of the system clock SCLK the working RAM 107 outputs one after another data R(A) and R(C), data R(B) and R(D), data I(A) and I(C), and data I(B) and I(D), and then the data R(A), R(C), I(A) and I(C) out of these data are stored one after another in the register 1211 at leading edges of the system clock SCLK.

Hereupon, in case that the radix is 2, the selector 1213 outputs data inputted from the register 1211. Accordingly, the above-mentioned data R(A), R(C), I(A) and I(C) are stored one after another into the register 1214.

The adder/subtracter 1215 first has data R(A) and data R(B) inputted from the register 1214 and performs a computing operation "R(A, B)=R(A)+R(B)", and then has data R(A) and data R(B) inputted again from the register 1214 and performs a computing operation "R(A, B)=R(A)−R(B)". Furthermore, the adder/subtracter 1215 has data I(A) and data I(B) inputted from the register 1214 and performs a computing operation "I(A, B)=I(A)+I(B)" and then has data I(A) and data I(B) inputted again from the register 1214 and performs a computing operation "I(A, B)=I(A)−I(B)". The computation results R(A, B) and I(A, B) are stored into the register 1216, while the computation results R(A, B)and I(A, B) are stored into the register 1217.

The multiplier 1220 uses "W=1+j×0" as a twiddle factor in case of radix 2. That is to say, the multiplier 1220 first multiplies the data R(A, B) inputted from the register 1216 by "1", and further multiplies the data R(A, B) by "0". Next, the multiplier 1220 multiplies the data I(A, B) inputted from the register 1216 by "1", and further multiplies the data I(A, B) by "0". These computation results R(A, B), 0, I(A, B), and 0 are stored into the register 1222.

The multiplier 1241 also uses "W=1+j×0" as a twiddle factor. That is to say, the multiplier 1221 first multiplies the data R(A, B) inputted from the register 1217 by "1", and further multiplies the data R(A, B) by "0". Next, the multiplier 1221 multiplies the data I(A, B) inputted from the register 1217 by "1", and further multiplies the data I(A, B)

by "0". These computation results R(A, B), 0, I(A, B), and 0 are stored into the register 1223.

The adder/subtracter 1224 first computes "R(ai)=R(A, B)+0" using data R(A, B) and 0 read in from the register 1222, and then computes "R(bi)=R(A, B)+0" using data R(A, B) and 0 read in from the register 1223. Furthermore, the adder/subtracter 1224 computes "I(ai)=I(A, B)+0" using data I(A, B) and 0 read in from the register 1222, and then computes "I(bi)=I(A, B)+0" using data I(A, B) and 0 read in from the register 1223. These computation results are stored into the working RAM 107 through the register 1225 and the selector 105.

Figure 16:
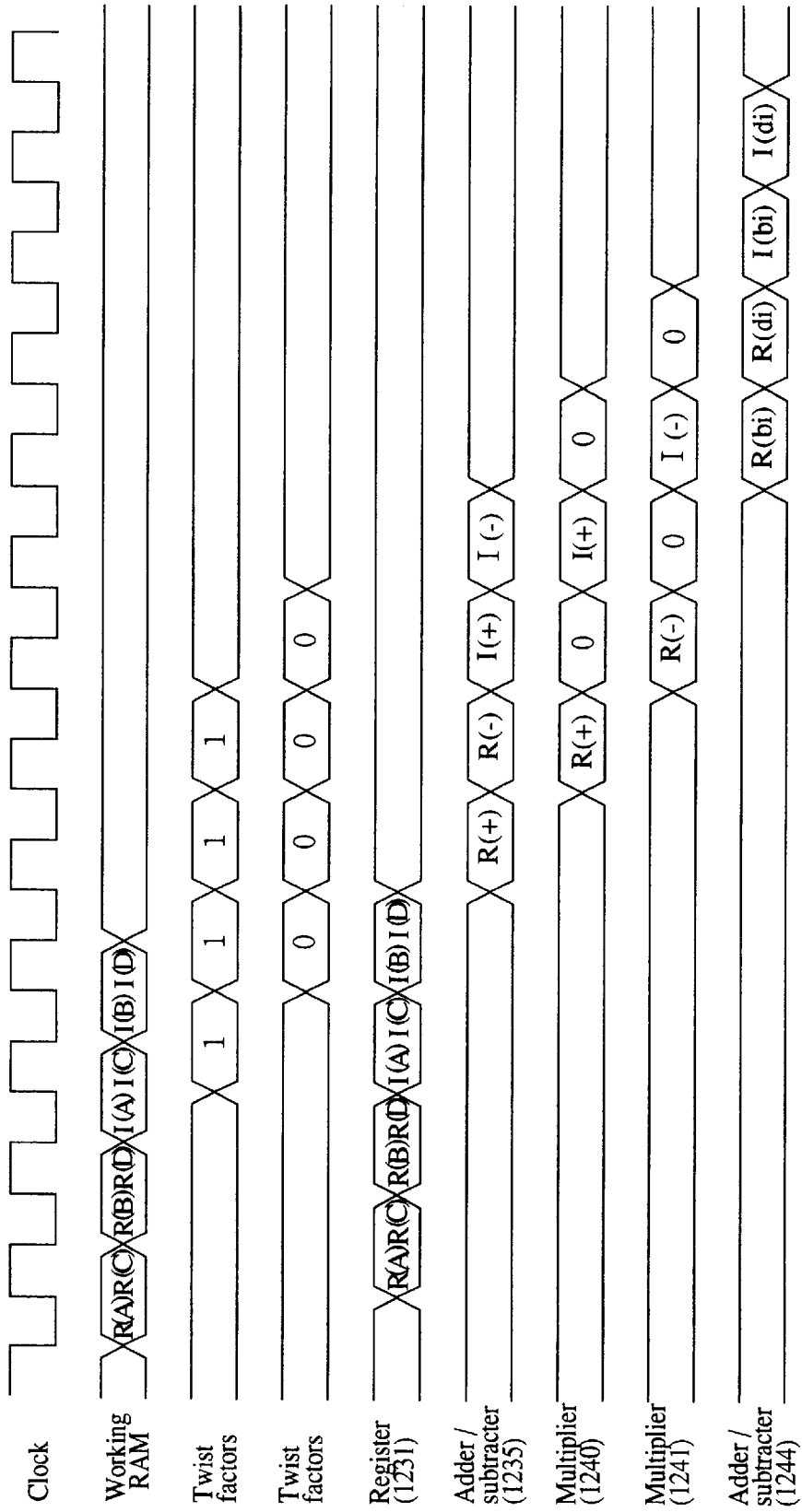
FIG. 16 is a timing chart for explaining operation of the data path when the radix is 2.

FIG. 16 is a timing chart for explaining operation of the data path 109 when the radix is 2.

As described above with reference to FIG. 15, when the working RAM 107 outputs one after another data R(A) and R(C), data R(B) and R(D), data I(A) and I(C), and data I(B) and I(D), the R(C), R(D), I(C) and I(D) out of these data are stored one after another into the register 1231 at leading edges of the system clock SCLK.

And when the selector 1233 outputs data inputted from the register 1231, the above-mentioned data R(C), R(D), I(C) and I(D) are stored one after another into the register 1234.

The adder/subtracter 1235 performs one after another computing operations "R(C, D)=R(C)+R(D)" and "R(C, D)=R(C)−R(D)", using the data R(C) and R(D) stored in the register 1234. Furthermore, the adder/subtracter 1235 performs computing operations "I(C, D)=I(C)+I(D)" and "I(C, D)=I(C)−I(D)", using the data I(C) and I(D) stored in the register 1234. The computation results R(C, D) and I(C, D) are stored into the register 1236, while the computation results R(C−D) and I(C−D) are stored into the register 1237.

In the same way as the multiplier 1220 of FIG. 15, the multiplier 1240 performs a computing operation using "W=1+j×0" as a twiddle factor, and stores the computation results R(C, D), 0, I(C, D) and 0 into the register 1242.

The multiplier 1241 also performs a computing operation using "W=1+j×0" as a twiddle factor, and stores the computation results R(C, D), 0, I(C, D) and 0 into the register 1243.

The adder/subtracter 1244 first computes "R(ci)=R(C, D)+0" using data R(C, D) and 0 read in from the register 1242, and then computes "R(di)=R(C, D)+0" using data R(C, D) and 0 read in from the register 1243. Furthermore, the adder/subtracter 1244 computes "I(ci) =I(C, D)+0" using data I(C, D) and 0 read in from the register 1242, and then computes "I(di)=I(C, D)+0" using data I(C, D) and 0 read in from the register 1243. These computation results are stored into the working RAM 107 through the register 1245 and the selector 105.

By forming the data paths 108 and 109 as shown in FIG. 12, it is possible to efficiently perform a computing operation by means of a simple circuit.

Thus, according to a fast Fourier transform processing device of this embodiment, the data paths 108 and 109 capable of performing at a high speed both of a computing process of radix 4 and a computing process of radix 2 can be obtained with a simple composition.

That is to say, according to this embodiment, it is possible to provide at a low price a fast Fourier transform processing device capable of coping with both fast Fourier transform algorithms of radix 4 and 2.

Second Embodiment

Next, a second embodiment of the invention is described with reference to FIG. 5. A fast Fourier transform processing device according to this embodiment is different from the first embodiment in that this embodiment performs a block floating-point arithmetic function.

In this embodiment also, a case where the number of sampling points is 2048 is described as an example.

Figure 5:
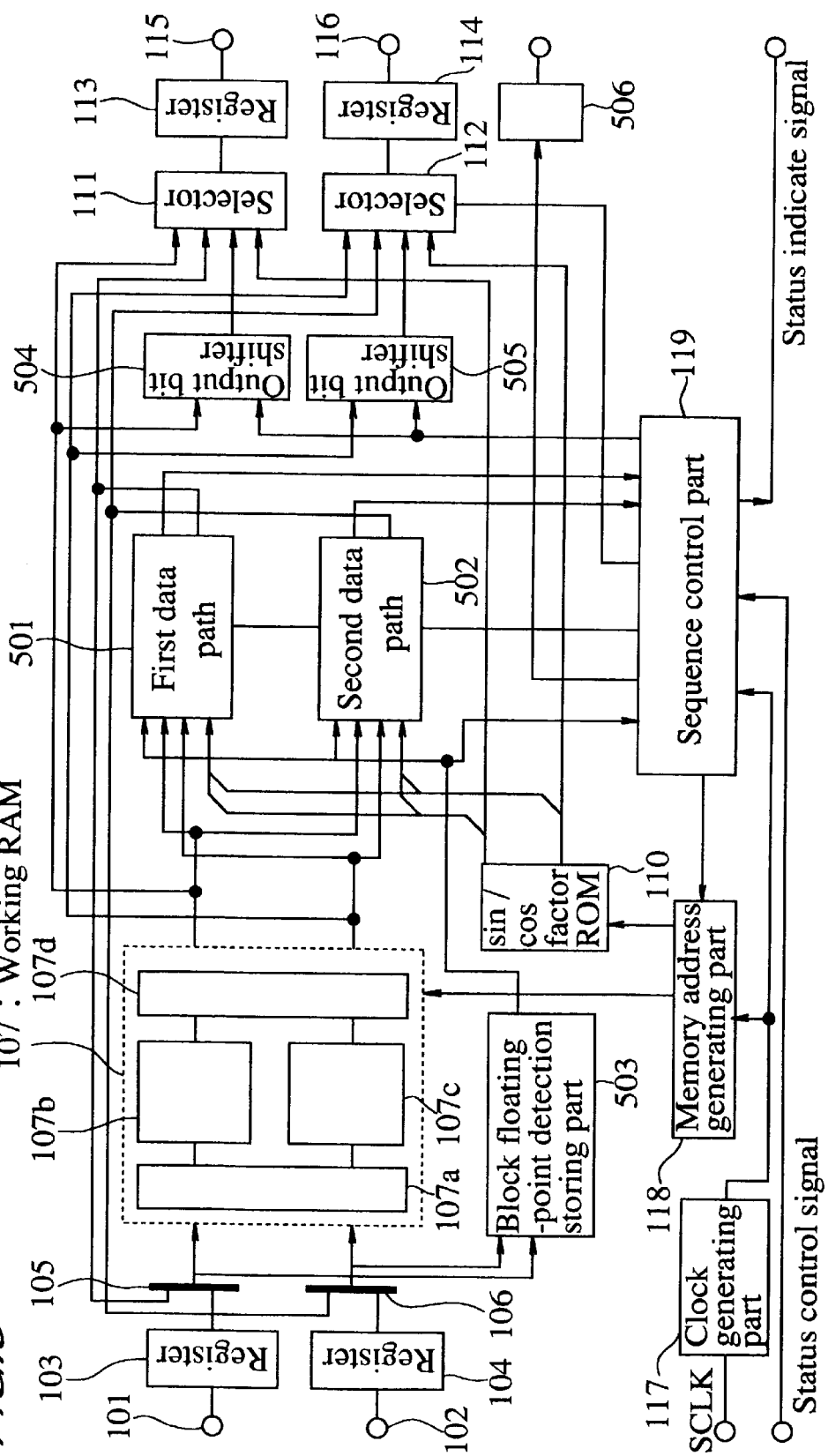
FIG. 5 is a block diagram roughly showing the composition of a fast Fourier transform processing device according to a second embodiment of the invention.

FIG. 5 is a block diagram roughly showing composition of a fast Fourier transform processing device according to this embodiment.

In FIG. 5, components to which the same symbols as FIG. 1 are given represent, respectively, the same components as those of FIG. 1.

In FIG. 5, a first data path 501 and a second data path 502 are different from the data paths 108 and 109 shown in FIG. 1 in that each of the data paths 501 and 502 has a shift function for performing block floating-point arithmetic. Since the block floating-point arithmetic itself is a publicly known technique, description of a detailed composition of the shift function used in this arithmetic operation is omitted.

A block floating-point detection storing part 503 takes in complex number data outputted from the selectors 105 and 106, detects a block floating point, and temporarily stores the detected value. Here, as described later, it is complex number data inputted from the outside through the input terminals 101 and 102 or complex number data outputted from the data paths 501 and 502 that are outputted from the selectors 105 and 106. A block floating-point detection value temporarily stored in the block floating-point detection storing part 503 is transferred to the data paths 501 and 502, and the sequence control part 119.

Output bit shifters 504 and 505 take in complex number data from the working RAM 107 and take in a floating-point exponent from the sequence control part 119. And they shift the complex number data on the basis of a value of this floating-point exponent, and output the result.

A register 506 has a floating-point exponent inputted from the sequence control part 119 and outputs it to the outside.

Following this, operation of the fast Fourier transform processing device shown in FIG. 5 is described.

In the same way as the above-mentioned first embodiment, first, the first data to be processed is divided into the real number part and the imaginary number part, and they are inputted into the device through the input terminals 101 and 102, and further they are respectively stored into the real number data storing part 107*b* and the imaginary number data storing part 107*c* of the working RAM 107.

At this time the block floating-point detection storing part 503 has this complex number data inputted from the selectors 105 and 106, and detects and stores its floating-point exponent.

Following this, when the second data to be processed is inputted from the input terminals 101 and 102 and is stored into the working RAM 107, the block floating-point detection storing part 503 has this data to be processed inputted from the selectors 105 and 106 and detects its floating-point exponent and compares this floating-point exponent with an already stored detection value (the floating-point exponent of the first data to be processed). Then, if the already stored detection value is smaller than the second detection value, the device holds the already stored detection value as it is without changing its stored content. On the other hand, if the second detection value is smaller than the already stored detection value, the device changes the stored content of the block floating-point detection storing part 503 to the second detection value.

In relation to the third or later data to be processed also, in the same way, the device detects a floating-point exponent of the data in the block floating-point detection storing part 503 and compares this value with a detection value already stored in the block floating-point detection storing part 503, and sets the smaller detection value at that time as the stored value. In this embodiment, the device performs such a detection operation as this commonly to four blocks of addresses 0 to 511, addresses 512 to 1023, addresses 1024 to 1535 and addresses 1536 to 2047. That is to say, in the detection operation, a floating-point exponent common to the groups A, B, C and D at the time of the first computing process described later is determined.

Thus, at a point of time when storing 2048 pieces of data to be processed into the working RAM 107 has been finished, the smallest value out of floating-point exponent detection values common to the respective blocks results in being stored in the block floating-point detection storing part 503.

When the operation of storing data to be processed into the working RAM 107 in this manner has been finished, then the device performs a fast Fourier transform process, using these data to be processed.

In this fast Fourier transform process, in the same way as the first embodiment, the device repeats a computing process of radix 4 five times and then performs a computing process of radix 2 at one time as described below.

First, in the first computing process (of radix 4), the device divides 2048 pieces of complex number data stored in the working RAM 107 into four groups A, B, C and D in the same way as the first embodiment (see stage 1 of FIG. 4). The data paths 501 and 502 read complex number data stored at addresses 0, 512, 1024 and 1536 of the working RAM 107 and twiddle factors stored in the sin/cos factor ROM 110, and at the same time, read a floating-point exponent detection value common to the groups A, B, C and D from the block floating-point detection storing part 503. And the device performs block floating-point arithmetic, using this detection value and the above-mentioned expressions (1) to (4).

When the computing process has been finished, the computation results ai, bi, ci and di are outputted from the data paths 501 and 502, and are stored into the working RAM 107 in the same way as the first embodiment. At this time, the block floating-point detection storing part 503 detects floating-point exponents of the computation results ai, bi, ci and di, and stores these detection results as they are.

Following this, the device performs block floating-point arithmetic also for each of the complex number data of addresses 1, 513, 1025 and 1537 of the working RAM 107, and stores one after another the computation results ai, bi, ci and di into the working RAM 107. When storing them, the block floating-point detection storing part 503 detects floating-point exponents of the computation results ai, bi, ci and di, and compares these detection values, respectively, with floating-point exponents stored in the block floating-point detection storing part 503. At this time, in such a way that the floating-point exponent of the computation result ai is compared with the floating-point exponent of the previous computation result ai, the floating-point exponent of the computation result bi is compared with the floating-point exponent of the previous computation result bi, and so forth, and the floating-point exponents of the computation results obtained by the same expression out of the expressions (1) to (4) are compared with each other. Then, if an already stored floating-point exponent is smaller than a detection value, the device holds the already stored detection value as it is without changing its stored content. On the other hand, if the detection value is smaller than the already stored floating-point exponent, the device changes the stored content of the block floating-point detection storing part 503 to this detection value.

In relation to complex number data of another address also, in the same way, after performing block floating-point arithmetic, the device detects a floating-point exponent of the data in the block floating-point detection storing part 503 when storing the computation results ai, bi, ci and di into the working RAM 107 and compares this value with a detection value already stored in the block floating-point detection storing part 503, and sets the smaller detection value at that time as the stored value.

In this embodiment, a floating-point exponent in the second computing process as described later is determined by such a detection operation.

When the first computing process and the first detection of floating-point exponents have been finished in this way, then the device performs the second computing process (of radix 4) as described below.

In the second computing process, in the same way as the first embodiment, the device further divides addresses 0 to 511, addresses 512 to 1023, addresses 1024 to 1535 and addresses 1536 to 2047 out of the addresses of the data RAM 107, respectively, into four groups. That is to say, in the second computing process, the device divides the addresses of the data RAM 107 into 16 parts in total.

And in the same way as the first embodiment, the device performs a computing process, detects a floating-point exponent in the block floating-point detection storing part 503 when storing the computation results, and stores the smallest detection value into the block floating-point detection storing part 503. A floating-point exponent common to the groups A, B, C and D at the time of the third computing process described later is determined by such a detection operation.

Furthermore, in the third to sixth or later computing process also, the device performs a block floating-point arithmetic process in the same way as the above-mentioned first and second computing processes.

In this case, although a block floating-point detection is performed commonly to the groups A, B, C and D at the time of a computing process, the device may have a block floating-point exponent to be used in the second or later computing process commonly to all samples (2048 samples in this example) at each stage.

When the sixth computing process has been finished, the device finally outputs the computation results to the outside. At this time, first the sequence control part 119 has the accumulation of the floating-point exponents used in each stage for the respective samples inputted from the block floating-point detection storing part 503, and sends them to the output bit shifters 504 and 505. Furthermore, the output bit shifters 504 and 505 shift the complex number data inputted from the working RAM 107 on the basis of this floating-point exponent, and then outputs them to the selectors 111 and 112. By this, output data of the data paths 108 and 109 are outputted to the outside from the output terminals 115 and 116 through the registers 113 and 114.

And if required, without shifting by the output bit shifters 504 and 505, the device can output the complex number data from the output terminals 115 and 116, and can output the final floating-point exponent from the register 506 to the outside.

Figure 17:
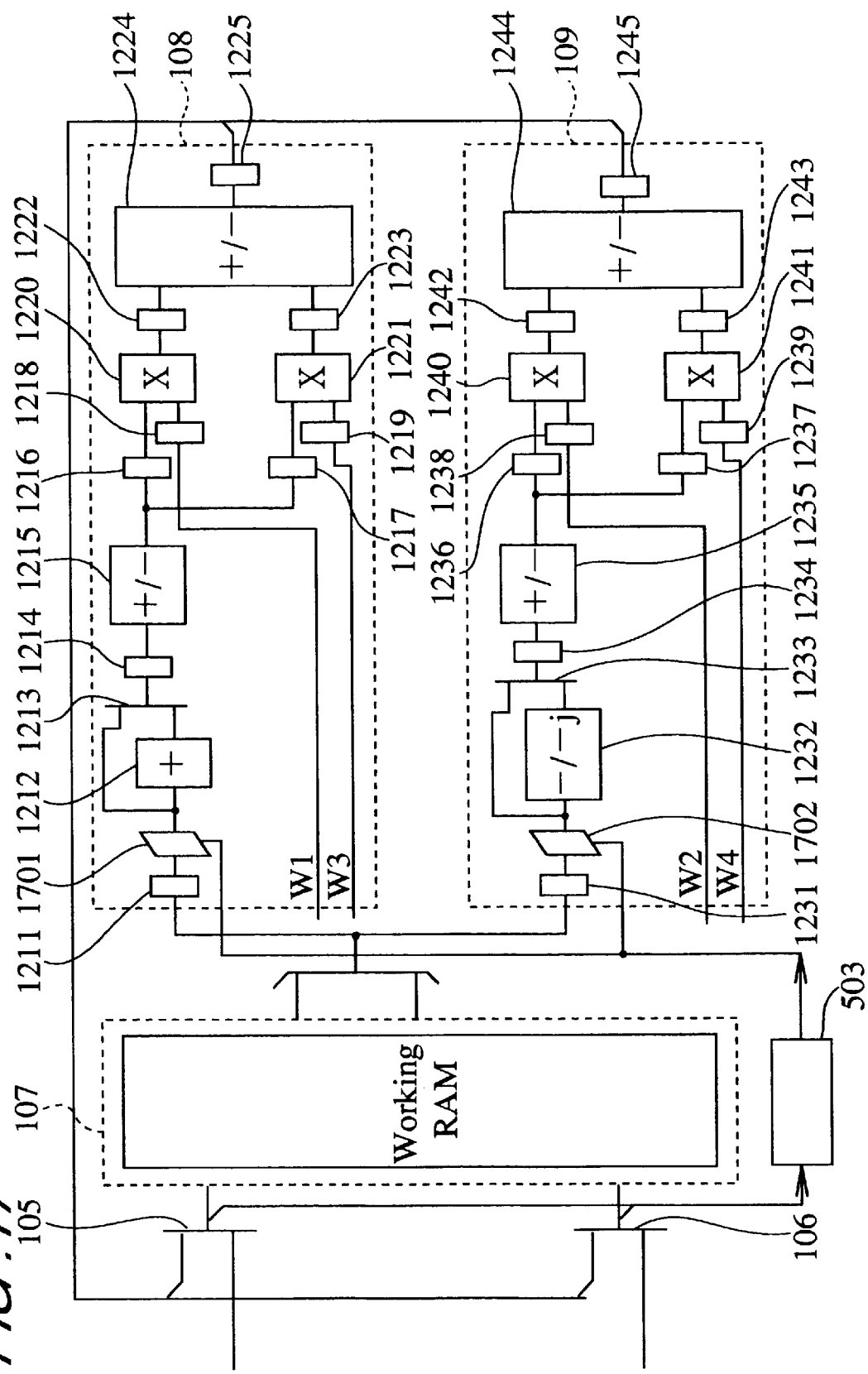
FIG. 17 is a block diagram roughly showing another example of the composition of the data paths and according to the second embodiment.

Next, another composition example of the data paths 108 and 109 according to this embodiment is described with reference to FIG. 17. In FIG. 17, components to which the same symbols as those of FIG. 5 or FIG. 12 are given represent the same components as those of FIG. 5 or FIG. 12.

The data paths 108 and 109 shown in FIG. 17 are different from the data paths 108 and 109 shown in FIG. 12 in that the data paths in FIG. 17 are provided with shifters 1701 and 1702. These shifters 1701 and 1702 have a block floating-point exponent inputted from the block floating-point detection storing part 503. And they shift data taken in from the registers 1211 and 1231 by a specified number of bits on the basis of this block floating-point exponent. Thanks to this, it is possible to perform a block floating-point computing process on the basis of control of the block floating-point detection storing part 503.

Since operation of the other components is the same as the above-mentioned data paths 108 and 109 shown in FIG. 12, description of it is omitted.

By forming the data paths 108 and 109 as shown in FIG. 17, it is possible to efficiently perform a computing operation by means of a simple circuit.

Thus, according to a fast Fourier transform processing device of this embodiment, when performing butterfly arithmetic by means of a floating-point method, it is possible to perform both of a computing process of radix 4 and a computing process of radix 2 at a high speed. That is to say, according to this embodiment, it is possible to provide at a low price a fast Fourier transform processing device of a block floating-point method capable of coping with both fast Fourier transform algorithms of radix 4 and 2.

Third Embodiment

Next, a third embodiment of the invention is described with reference to FIG. 6. This embodiment further improves the processing speed by connecting two fast Fourier transform processing devices of the first embodiment in parallel with each other.

Figure 6:
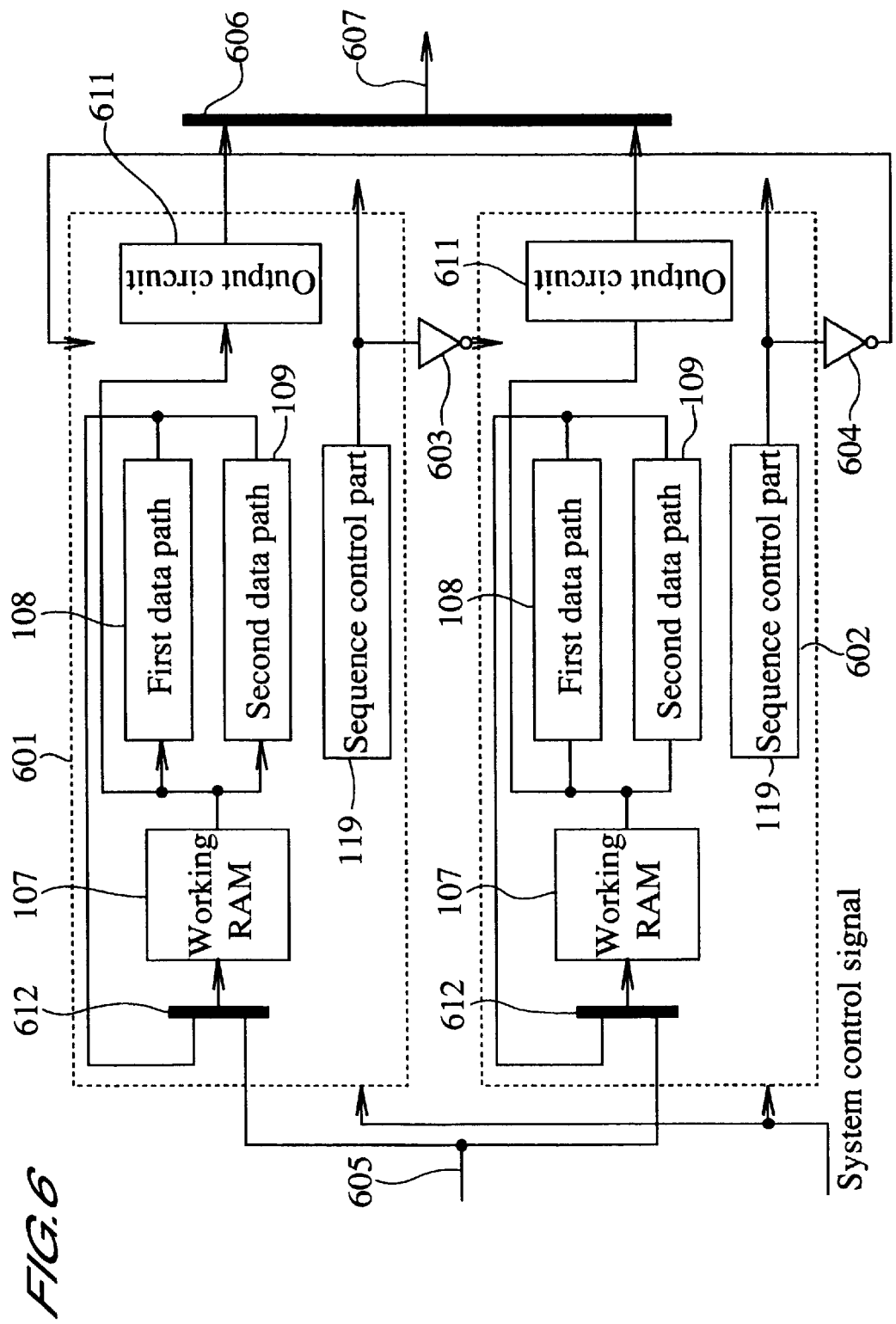
FIG. 6 is a block diagram roughly showing the composition of a fast Fourier transform processing system according to a third embodiment of the invention.

FIG. 6 is a block diagram conceptually showing a fast Fourier transform processing system according to this embodiment.

In FIG. 6, each of processors 601 and 602 is the fast Fourier transform processing device shown in the first embodiment. In the internal composition of such processors 601 and 602, components to which the same symbols as FIG. 1 are given represent the same components as those of the fast Fourier transform processing device of FIG. 1.

An output circuit 611 in each of the processors 601 and 602 is a circuit to which the selectors 111 and 112, the registers 113 and 114, and the output terminals 115 and 116 in FIG. 1 are collectively abbreviated. And the output circuits 611 are connected to an output selecting circuit 606. A status indicating signal outputted from the sequence control part 119 of the processor 601 is inputted into the sequence control part 119 of the processor 602 through a NOT buffer 603 as a status control signal. In the same way, a status indicating signal outputted from the sequence control part 119 of the processor 602 is inputted into the sequence control part 119 of the processor 601 through a NOT buffer 604 as a status control signal. A system control signal is inputted from the outside into the sequence control part 119 of each of the processors 601 and 602.

A selector 612 in each of the processors 601 and 602 is a circuit to which the selectors 105 and 106, and the input terminals 101 and 102 in FIG. 1 are collectively abbreviated.

A data input port 605 inputs data to be processed from the outside. A data output port 607 outputs the processed complex number data inputted from the output selecting circuit 606 to the outside.

Operation of the fast Fourier transform processing system shown in FIG. 6 is described in the following.

First, when a system control signal from the outside has selected the processor 601, N pieces (N=2048, for example) of data to be processed are inputted to the data input port 605. By this, these N pieces of data to be processed are inputted into the processor 601. Then, when a system control signal from the outside has selected the processor 602, for example, N pieces of data to be processed are inputted to the data input port 605. By this, these N pieces of data to be processed are inputted into the processor 602.

The two processors 601 and 602 perform the same computing process as the first embodiment independently of each other.

When each of the processors 601 and 602 has finished a computing process, the processed complex number data is outputted from the data output port 607 through the output selecting circuit 606.

In this case, while the processor 601, for example, is outputting complex number data, the sequence control part 119 of this processor 601 turns on a status indicating signal.

This signal is inputted through the NOT gate 603 into the sequence control part 119 of the processor 602 as a status control signal. Thus, the data output port 607 is occupied by the processor 601, and the processor 602 is prohibited from outputting processed complex number data. When the processor 601 has finished outputting the complex number data, the status indicating signal outputted from the sequence control part 119 of the processor 601 (namely, the status control signal inputted into the sequence control part 119 of the processor 602) is turned off, and the prohibition of the processor 602 from outputting the complex number data is cancelled. Accordingly, the processor 602, is prevented from outputting complex number data while the processor 601 is outputting processed complex number data.

In case of making the processor 602 occupy the data output port 607 also, the system operates in the same way.

Thus, according to a fast Fourier transform processing system of this embodiment, since data groups of two systems to be processed are processed at the same time by connecting two fast Fourier transform processing devices of the present invention (namely, the processors 601 and 602) in parallel with each other, it is possible to further improve the processing speed of the Fourier transform process.

Although two fast Fourier transform processing devices are connected in parallel with each other in this embodiment, it is a matter of course that three or more fast Fourier transform processing devices can be connected in parallel with one another. In such a case, it is possible to still further improve the processing speed.

Although the fast Fourier transform processing devices of the first embodiment are connected in the fast Fourier transform processing system of this embodiment, it is a matter of course that the fast Fourier transform processing devices of the second embodiment may be connected in parallel with one another.

Fourth Embodiment

Next, a fourth embodiment of the present invention is described with reference to FIGS. 7 to 10. This embodiment relates to a fast Fourier transform processing system capable of performing a fast Fourier transform process in which the number of sampling points is 2N (that is, 8192), by connecting two devices in parallel with each other, each of which is a fast Fourier transform processing device of the first embodiment and can process a maximum of N sampling points (N=4096 in this embodiment).

Figure 7:
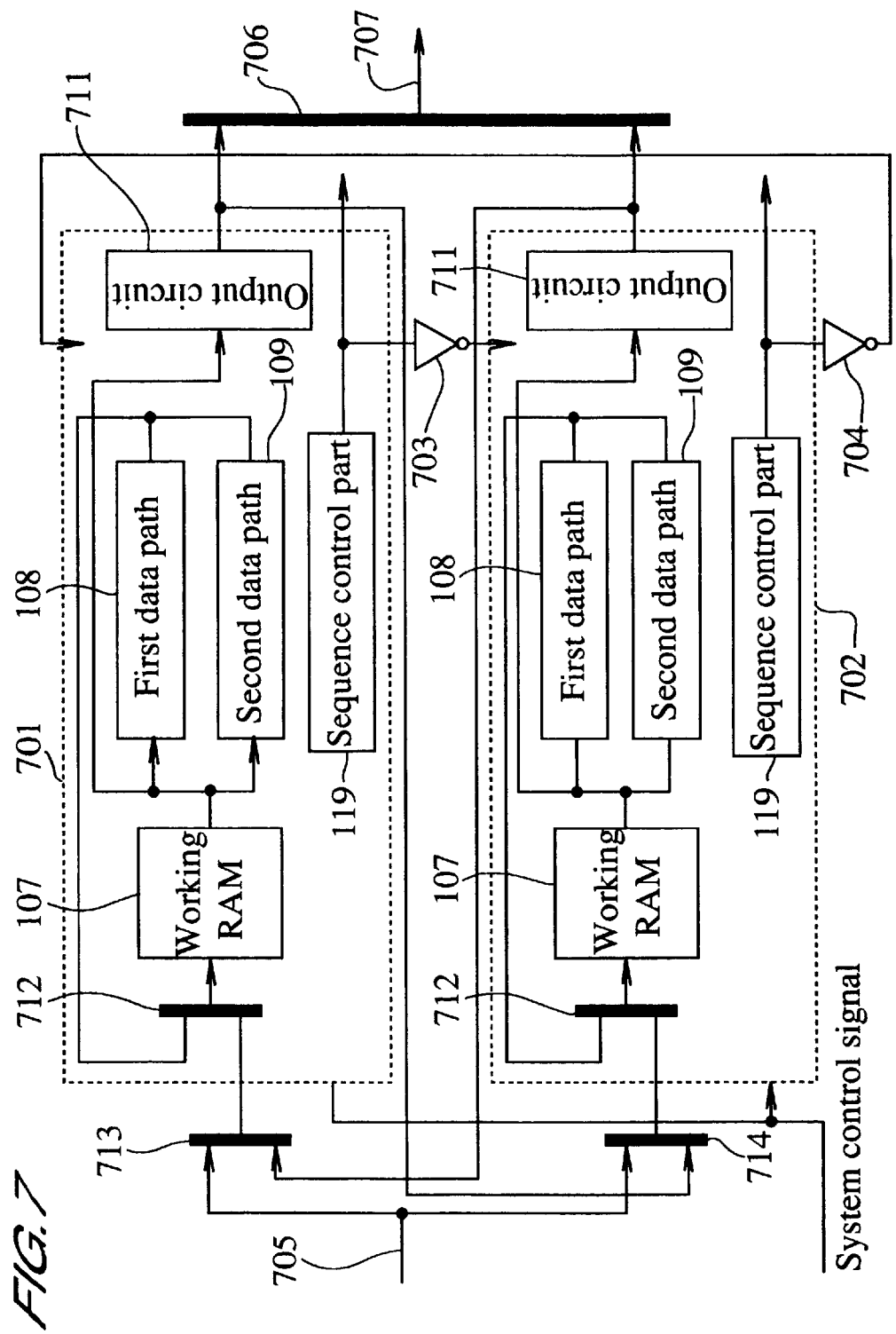
FIG. 7 is a block diagram roughly showing the composition of a fast Fourier transform processing system according to a fourth embodiment of the invention.

FIG. 7 is a block diagram conceptually showing a fast Fourier transform processing system according to this embodiment.

In FIG. 7, each of a master mode processor 701 and a slave mode processor 702 is composed of the fast Fourier transform processing device shown in the first embodiment. In an internal composition of such processors 701 and 702, components to which the same symbols as FIG. 1 are given represent the same components as those of the fast Fourier transform processing device shown in FIG. 1.

In each of the processors 701 and 702, an output circuit 711 is a circuit to which the selectors 111 and 112, the registers 113 and 114, and the output terminals 115 and 116 in FIG. 1 are abbreviated. And the output circuits 711 are connected, respectively, to input terminals of an output selecting circuit 706.

In each of the processors 701 and 702, a selector 712 is a circuit to which the selectors 105 and 106, and the input terminals 101 and 102 in FIG. 1 are abbreviated.

The selector 712 of the master mode processor 701 is connected to an output terminal of a master mode input selecting circuit 713. Complex number data inputted from the outside and complex number data outputted from the slave mode processor 702 are inputted through input terminals of the master mode input selecting circuit 713.

In the same way, the selector 712 of the slave mode processor 702 is connected to an output terminal of a slave mode input selecting circuit 714, and complex number data inputted from the outside and complex number data outputted from the master mode processor 701 are inputted through input terminals of the slave mode input selecting circuit 714.

A status indicating signal outputted from the sequence control part 119 of the master mode processor 701 is inputted into the sequence control part 119 of the slave mode processor 702 through a NOT buffer 703 as a status control signal. In the same way, a status indicating signal outputted from the sequence control part 119 of the slave mode processor 702 is inputted into the sequence control part 119 of the master mode processor 701 through a NOT buffer 704 as a status control signal. A system control signal is inputted into the sequence control part 119 of each of the processors 701 and 702 from the outside.

The data input port 705 has data to be processed inputted from the outside. The data output port 707 outputs processed complex number data inputted from the output selecting circuit 706 to the outside.

Figure 8:
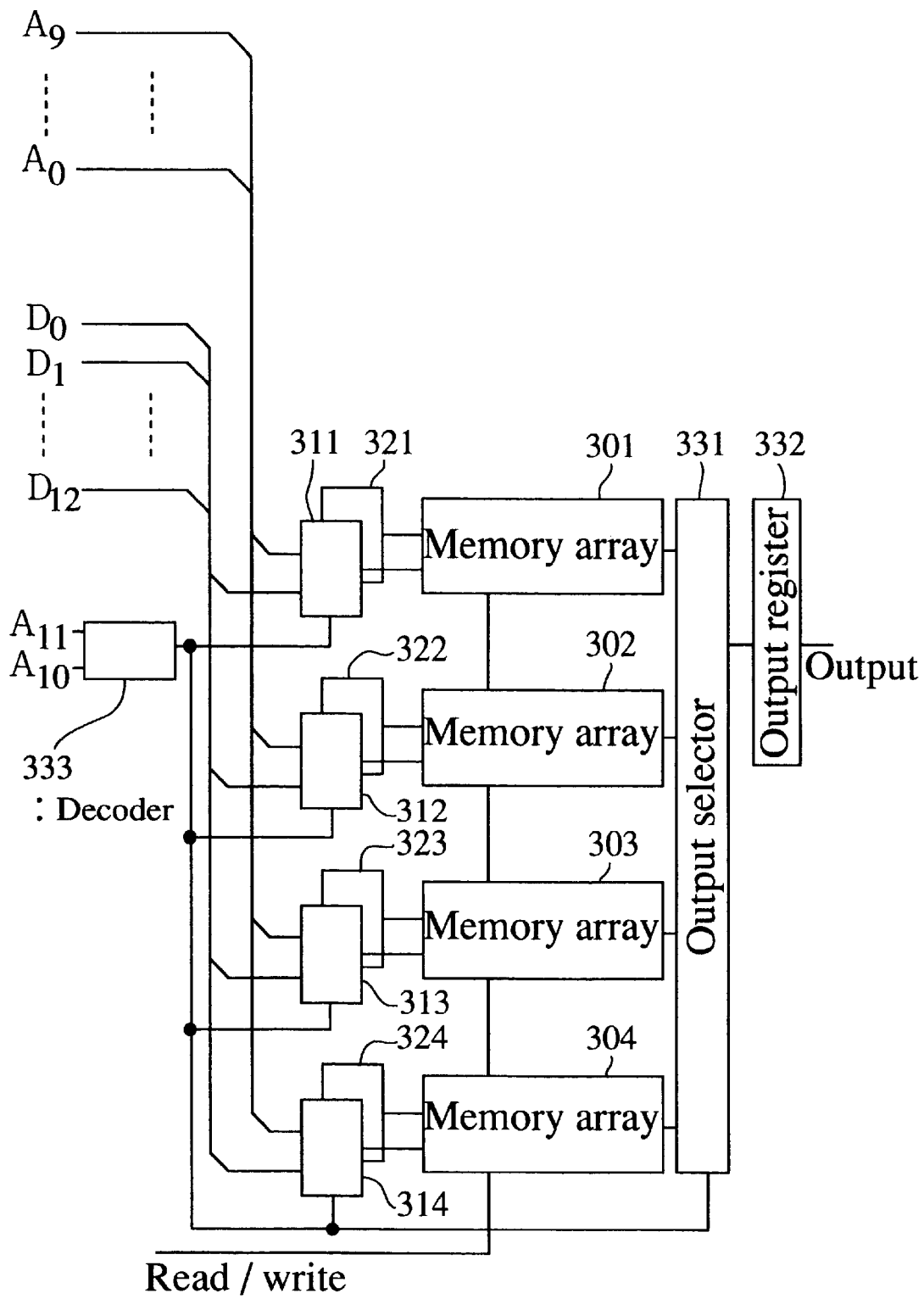
FIG. 8 is a block diagram roughly showing an internal structure of the working RAM shown in FIG. 7.

FIG. 8 is a block diagram showing an internal composition of the working RAM shown in FIG. 7. In FIG. 7, components to which the same symbols as FIG. 3 represent, respectively, the same components as FIG. 3. As apparently known from FIG. 8, this working RAM 107 is different from that of FIG. 3 in that this is provided with a decoder 333. This decoder 333 converts the upper two bits of address data inputted from the outside and outputs a signal for specifying one of four memory arrays 301 to 304.

Next, operation of the fast Fourier transform processing system shown in FIGS. 7 and 8 is described.

First, the first 1024 points out of data of 8192 points to be processed are inputted into the master mode processor 701 through the data input port 705 and the master mode input selecting circuit 713. As shown in FIG. 9(A), these data to be processed are stored at addresses 0 to 1023 of the working RAM 107 of the master mode processor 701. The next data of 1024 points to be processed are inputted into the slave mode processor 702 through the data input port 705 and the slave mode input selecting circuit 714, and are stored at addresses 0 to 1023 of the working RAM 107. In the same way after this, data to be processed are stored 1024 points by 1024 points alternately into the working RAMs 107 of the processors 701 and 702. By doing this, the data to be processed of 8192 points can be stored according to an address allocation as shown in FIG. 9(A). The address domains based on such an address allocation (namely, addresses 0 to 1023, addresses 1024 to 2047, addresses 2048 to 3071, and addresses 3072 to 4095 of the working RAM provided in each of the processors 701 and 702) correspond, respectively, to the memory arrays 301 to 304 shown in FIG. 8.

When storing complex number data into the processors 701 and 702 has been finished, then the system performs a fast Fourier transform process, using these complex number data.

In this embodiment, since the number of sampling points is 8192 (namely, the 6th power of 4×2), as described below, the system repeats a computing process of radix 4 at six times and then performs a computing process of radix 2 at one time.

The first computing process (of radix 4) is first described.

In this computing process, complex number data stored in the working RAM 107 of each of the processor 701 and 702 are respectively divided into four groups according to addresses where they are stored. In this case, as shown in FIG. 9(A), the system sets complex number data (whose sample numbers are 0 to 1023) stored at addresses 0 to 1023 of the working RAM 107 provided in the master mode processor 701 as group A1, complex number data (whose sample numbers are 2048 to 3071) stored at addresses 1024 to 2047 as group B1, complex number data (whose sample numbers are 4096 to 5119) stored at addresses 2048 to 3071 as group C1, and complex number data (whose sample numbers are 6144 to 7167) stored at addresses 3072 to 4095 as group D1. The system sets complex number data (whose sample numbers are 1024 to 2047) stored at addresses 0 to 1023 of the working RAM 107 provided in the slave mode processor 702 as group A2, complex number data (whose sample numbers are 3072 to 4095) stored at addresses 1024 to 2047 as group B2, complex number data (whose sample numbers are 5120 to 6143) stored at addresses 2048 to 3071 as group C2, and complex number data (whose sample numbers are 7168 to 8191) stored at addresses 3072 to 4095 as group D2.

Figure 10:
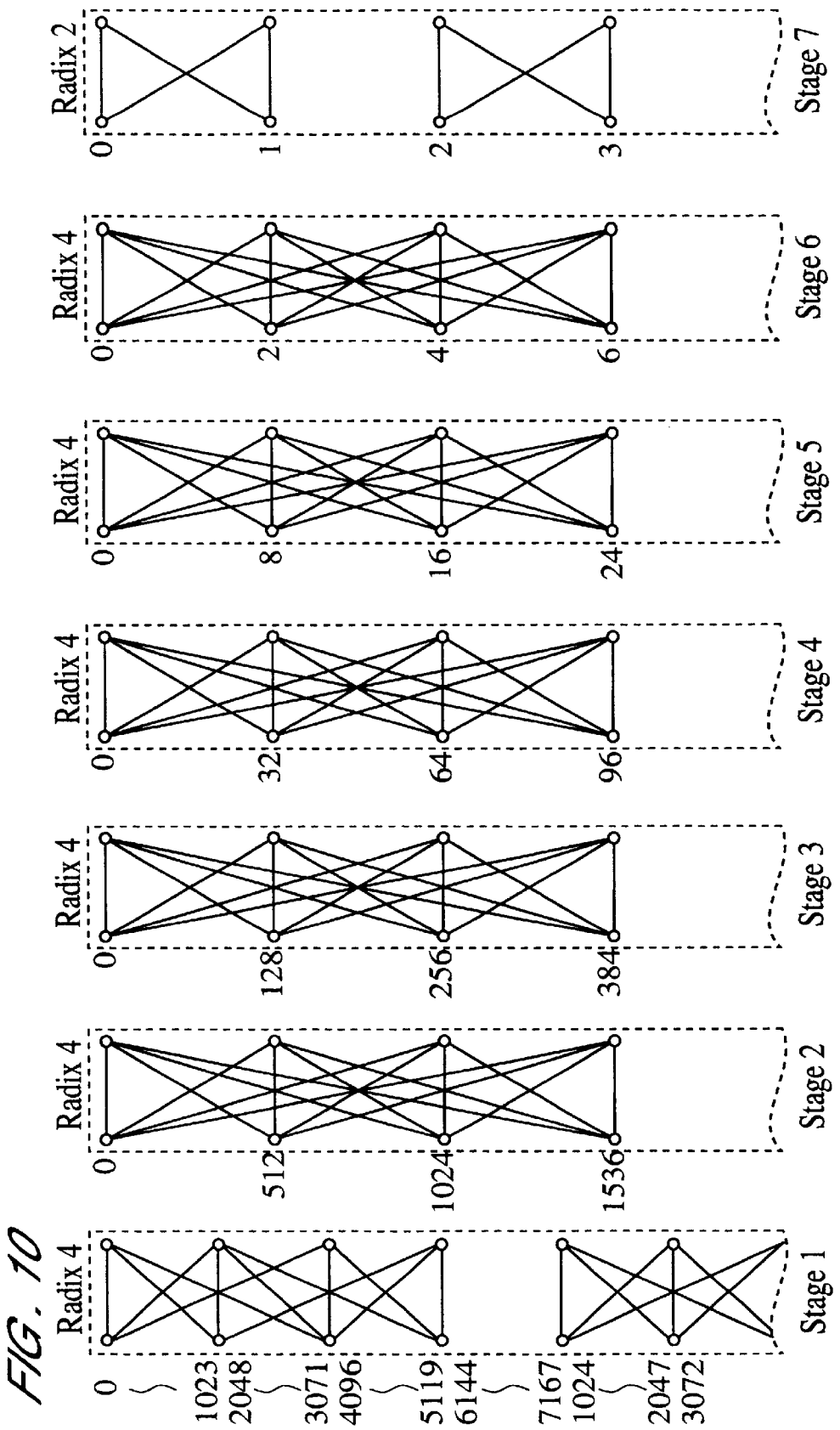

As shown in the first stage of FIG. 10, the first data path 108 and the second data path 109 of the master mode processor 701 first take in the respective first complex number data (namely, complex number data of addresses 0, 1024, 2048 and 3072) of the groups A1, B1, C1 and D1 from the working RAM 107, and in the same way as the first embodiment, perform a computing process using the expressions (1) to (4), and obtain the computation results ai, bi, ci and di. Following this, these computation results ai, bi, ci and di are outputted from the data paths 108 and 109, and are stored into the working RAMs 107. At this time, the computation result ai of the expression (1) is stored into an address belonging to group A (address 0 in this case), the computation result bi of the expression (3) is stored into an address belonging to group B (address 1024 in this case), the computation result ci of the expression (2) is stored into an address belonging to group C (address 2048 in this case), and the computation result di of the expression (4) is stored into an address belonging to group D (address 3072 in this case).

At the same time, the first data path 108 and the second data path 109 of the slave mode processor 702 take in the respective first complex number data (namely, complex number data of addresses 0, 1024, 2048 and 3072) of the groups A2, B2, C2 and D2 from the working RAM 107, perform a computing process using the expressions (1) to (4), and obtain the computation results ai, bi, ci and di. In the same way as the case of the master mode processor 701, these computation results are stored into the working RAM 107 in the slave mode processor 702.

Following this, in the same manner as above, the processors 701 and 702 perform a computing process using complex number data of addressees 1, 1025, 2049 and 3073, and in the same way after this, perform a computing process in relation to the complex number data of all addresses one after another.

When the first computing process has been finished in this way, the system replaces data with each other between the master mode processor 701 and the slave mode processor 702, using the input selecting circuits 713 and 714. That is to say, as shown in FIG. 9(A), the system replaces the complex number data stored at addresses 2048 to 3071 of the working RAM 107 provided in the master mode processor 701 (that is, the computation result ci of the master mode processor 701) and the complex number data stored at addresses 0 to 1023 of the working RAM 107 provided in the slave mode processor 702 (namely, the computation result ai of the slave mode processor 702) with each other, and furthermore replaces the complex number data stored at addresses 3072 to 4095 of the working RAM 107 provided in the master mode processor 701 (that is, the computation result di of the master mode processor 701) and the complex number data stored at addresses 1024 to 2047 of the working RAM 107 provided in the slave mode processor 702 (that is, the computation result bi of the slave mode processor 702) with each other. The replacement of data is performed by taking in complex number data outputted from the output terminals 115 and 116 of one of the processors 701 and 702 into the other of them through the input selecting circuits 713 and 714. In this way, an address allocation of complex number data as shown in FIG. 9(B) can be obtained.

Figure 9B:
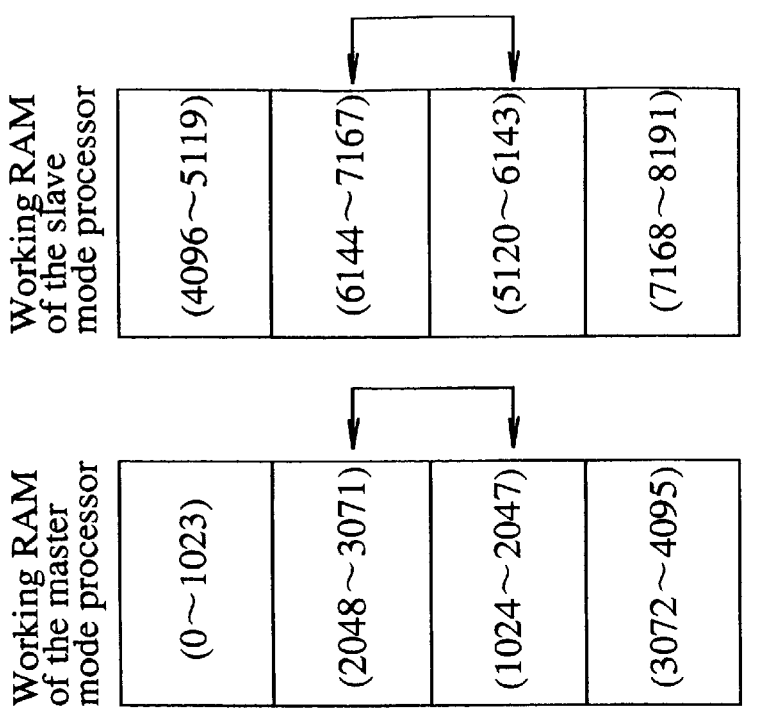
FIGS. 9 and 10 are conceptual diagrams showing operation of a fast Fourier transform processing device according to the fourth embodiment of the invention.
Figure 9A:
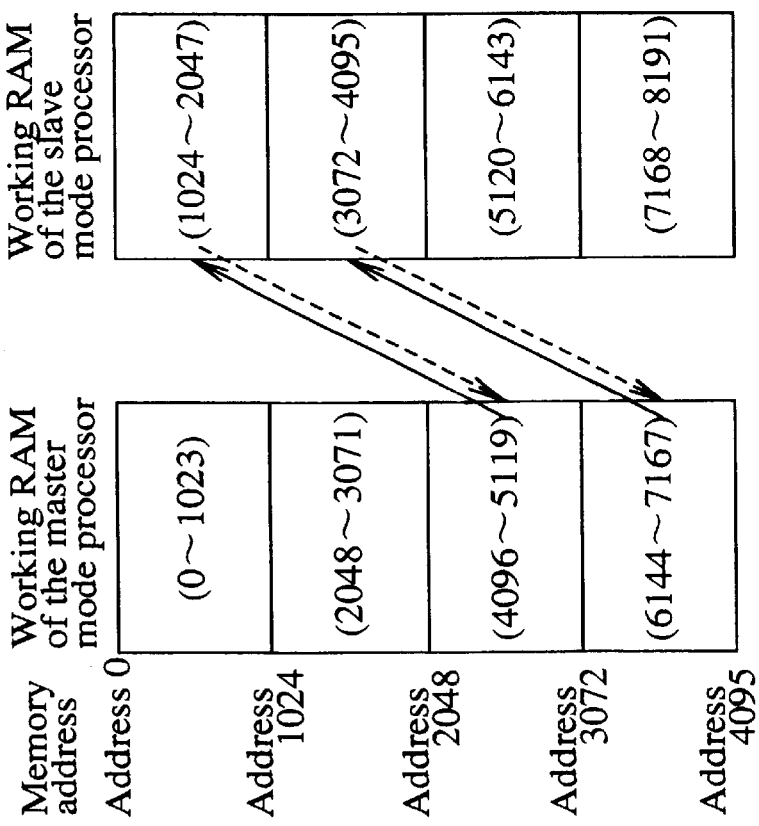

However, as a result, as shown in FIG. 9(B), complex number data stored into each of working RAM 107 provided in the processors 701 and 702 are not placed in small order. Namely, complex number data of sampling point numbers 2048 to 3071 are stored at addresses 1024 to 2047 of the working RAM 107 provided in the master mode processor 701, and complex number data of sampling point numbers 1024 to 2047 are stored at addresses 2048 to 3071 of the working RAM 107. Complex number data of sampling point numbers 6144 to 7167 are stored at addresses 1024 to 2047 of the working RAM 107 provided in the slave mode processor 702, and complex number data of sampling point numbers 5120 to 6143 are stored at addresses 2048 to 3071 of the working RAM 107. In this embodiment, in order to solve such a mismatch, the system replace complex number data stored in each of working RAM 107 provided in the processors 701 and 702 to place in small order. In this embodiment, the replacement is performed by exchanging of decode data in address decoder 333 (shown in FIG. 8). Namely, the system replaces with one another the upper two bits of the binary code of the memory address of each of addresses 1024 to 2047 and those bits of each of addresses 2048 to 3071 of the working RAM 107 provided in the master mode processor 701, and in the same way, replaces with one another the upper two bits of the binary code of the memory address of each of addresses 1024 to 2047 and those bits of each of addresses 2048 to 3071 of the working RAM 107 provided in the slave mode processor 702. By doing so, the system can substantially replace data without performing a data transfer. Therefore, the system can improve the processing speed. It is a matter of course that an ordinary data transfer may be performed instead of the process of exchanging decode data.

The system can perform the second and later computing processes in the processors 701 and 702 independently of each other by replacing data in such a way as described above.

In the second computing process, as shown in stage 2 of FIG. 10, the system divides the addresses of the data RAM 107 of each of the processors 701 and 702 into groups of addresses 0 to 511, addresses 512 to 1023, addresses 1024 to 1535 and addresses 1536 to 2047, and groups of addresses 2048 to 2559, addresses 2560 to 3071, addresses 3072 to 3583 and addresses 3584 to 4095 to perform computing processes.

Furthermore, in the third to seventh computing processes also, as shown in stages 3 to 7 of FIG. 10, the system performs the same computing processes (where the number of sampling points is different from the first embodiment) as the second to sixth computing processes of the first embodiment.

In the same way as the first embodiment, the system outputs the computation results to the outside.

In this way, a fast Fourier transform processing system according to this embodiment can perform a fast Fourier transform process in which the number of sampling points is 2N, by connecting two fast Fourier transform processing devices according to the present invention each of which has a maximum of N sampling points in parallel with each other. Therefore, it is possible to increase the maximum number of processable sampling points at a low price.

Since this system can be built by adding a small number of discrete components, the system can be made small in scale.

Although in this embodiment two fast Fourier transform processing devices are connected in parallel with each other, it is a matter of course that four or more fast Fourier transform processing devices also can be connected in parallel with one another. In such a case, it is possible to furthermore increase the maximum number of processable sampling points.

Fifth Embodiment

A fifth embodiment is described with reference to FIG. 11. This embodiment is equal to the fourth embodiment in that this embodiment relates to a fast Fourier transform processing system capable of performing a fast Fourier transform process in which the number of sampling points is 2N (that is, 8192 points) by connecting two fast Fourier transform processing devices each of which has a maximum of N processable sampling points (N=4096 in this embodiment) in parallel with each other, but this embodiment is different from the fourth embodiment in that it has the same block floating-point arithmetic function as the second embodiment.

Figure 11:
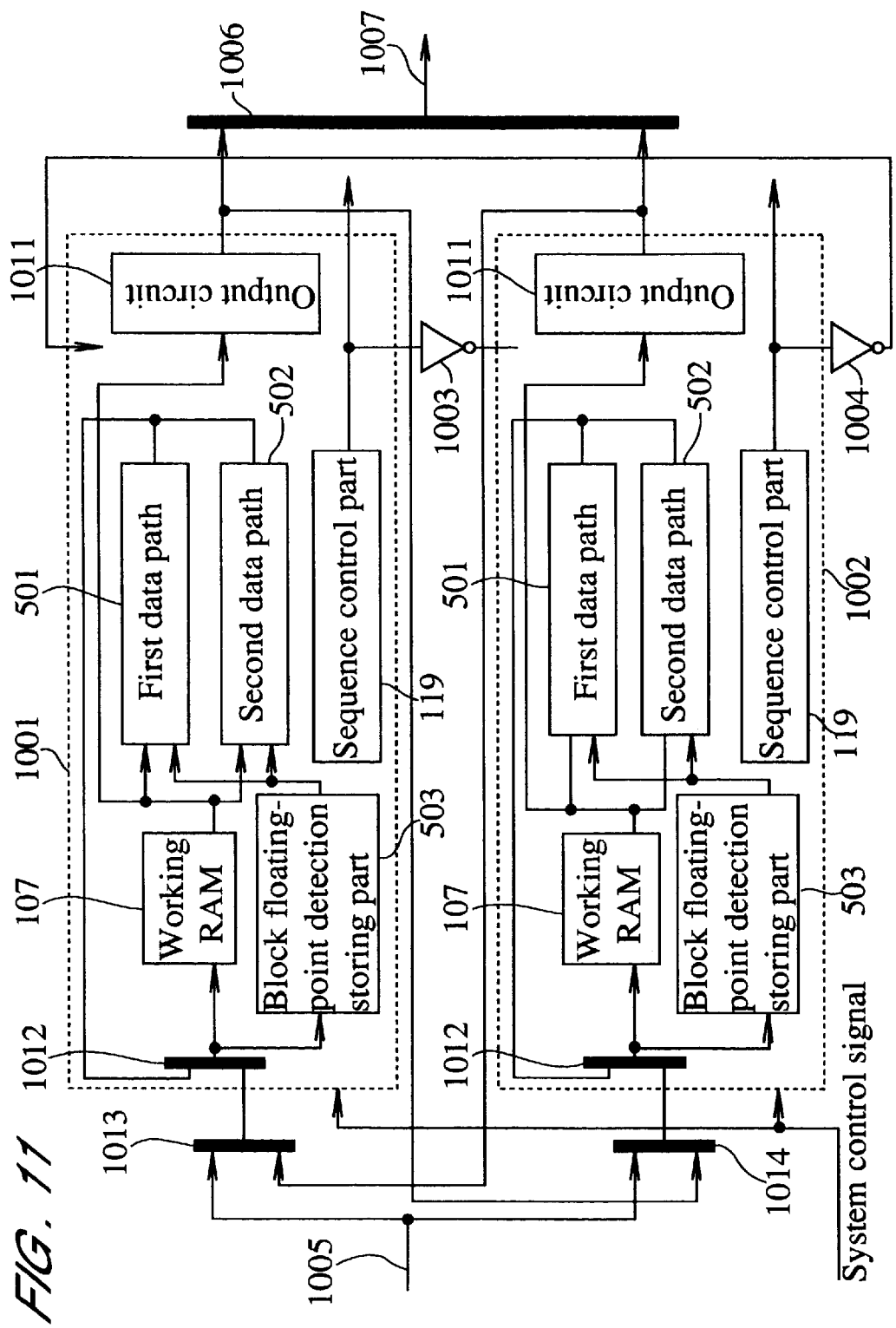
FIG. 11 is a block diagram roughly showing the composition of a fast Fourier transform processing system according to a fifth embodiment of the invention.

FIG. 11 is a block diagram conceptually showing a fast Fourier transform processing system according to this embodiment.

In FIG. 11, each of a master mode processor 1001 and the slave mode processor 1002 is composed of the fast Fourier transform processing device shown in the second embodiment. In an internal composition of such processors 1001 and 1002, components to which the same symbols as FIG. 5 are given represent the same components as those of the fast Fourier transform processing device shown in FIG. 5.

In each of the processors 1001 and 1002, an output circuit 1011 is a circuit to which the selectors 111 and 112, the registers 113 and 114, and the output terminals 115 and 116 of FIG. 5 are abbreviated. And the output circuits 1011 are connected, respectively, to input terminals of an output selecting circuit 1006.

In each of the processors 1001 and 1002, a selector 1012 is a circuit to which the selectors 105 and 106, and the input terminals 101 and 102 of FIG. 5 are abbreviated.

The selector 1012 of the master mode processor 1001 is connected to an output terminal of the master mode input selecting circuit 1013. Complex number data inputted from the outside and complex number data outputted from the slave mode processor 1002 are inputted through input terminals of the master mode input selecting circuit 1013.

In the same way, the selector 1012 of the slave mode processor 1002 is connected to an output terminal of the slave mode input selecting circuit 1014, and complex number data inputted from the outside and complex number data outputted from the master mode processor 1001 are inputted through input terminals of the slave mode input selecting circuit 1014.

A status indicating signal outputted from the sequence control part 119 of the processor 1001 is inputted into the sequence control part 119 of the processor 1002 through a NOT buffer 1003 as a status control signal. In the same way, a status indicating signal outputted from the sequence control part 119 of the processor 1002 is inputted into the sequence control part 119 of the processor 1001 through a NOT buffer 1004 as a status control signal. A system control signal is inputted from the outside into the sequence control part 119 of each of the processors 1001 and 1002.

The data input port 1005 inputs data to be processed from the outside. The data output port 1007 outputs processed complex number data inputted from the output selecting circuit 1006 to the outside.

Next, operation of the fast Fourier transform processing system shown in FIG. 11 is described.

First, the first data of 1024 points to be processed out of the data of 8192 points to be processed are inputted into the master mode processor 1001 through the data input port 1005 and the master mode input selecting circuit 1013. In the same way as the first embodiment, these complex number data are stored into the working RAM 107 of the master mode processor 1001. At this time, a block floating-point detection storing part 503 of the master mode processor 1001 has the complex number data inputted from the selector 1012 into it, and detects and stores a floating-point exponent in the same manner as the second embodiment. At the same time as this, a block floating-point detection storing part 503 of the slave mode processor 1002 also automatically operates and detects a floating-point exponent, but does not stores it into the inside.

Following this, the next data of 1024 points to be processed are inputted into the slave mode processor 1002 through the data input port 1005 and the slave mode input selecting circuit 1014, and are stored into the working RAM 107. At this time also, the block floating-point detection storing part 503 of the slave mode processor 1002 has the complex number data inputted into it, and detects and stores a floating-point exponent. In the same way as the above-mentioned case of the master mode processor 1001, the block floating-point detection storing part 503 of the master mode processor 1001 also detects a floating-point exponent, but does not store it into the inside.

In this way, in this embodiment the block floating-point detection storing parts 503 provided in the processors 1001 and 1002 are operated independently of each other, but they can eventually perform a conformable detection of a floating-point exponent.

After this, in the same way as the fourth embodiment, the remaining data to be processed also are stored into the working RAMs 107 of the processors 1001 and 1002 according to an address allocation as shown in FIG. 9.

When storing complex number data into the processors 1001 and 1002 has been finished, then the system performs a fast Fourier transform process, using these complex number data.

In this embodiment, the system repeats a computing process of radix 4 at six times, and then performs a computing process of radix 2 at one time. As described below, operation of the system for a computing process is the same as the fourth embodiment except the block floating-point arithmetic process.

The first computing process (of radix 4) is described.

In this computing process, the system divides complex number data stored in the working RAM 107 of each of the processors 1001 and 1002 into four groups according to stored addresses and handles these data. In this case, as shown in FIG. 9, the system sets complex number data (whose sampling point numbers are 0 to 1023) stored at addresses 0 to 1023 of the working RAM 107 provided in the master mode processor 1001 as group A1, complex number data (whose sampling point numbers are 2048 to 3071) stored at addresses 1024 to 2047 as group B1, complex number data (whose sampling point numbers are 4096 to 5119) stored at addresses 2048 to 3071 as group C1, and complex number data (whose sampling point numbers are 6114 to 7167) stored at addresses 3072 to 4095 as group D1. The system sets complex number data (whose sampling point numbers are 1024 to 2047) stored at addresses 0 to 1023 of the working RAM 107 provided in the slave mode processor 1002 as group A2, complex number data (whose sampling point numbers are 3072 to 4095) stored at addresses 1024 to 2047 as group B2, complex number data (whose sampling point numbers are 5120 to 6143) stored at addresses 2048 to 3071 as group C2, and complex number data (whose sampling point numbers are 7168 to 8191) stored at addresses 3072 to 4095 as group D2.

First, the first data path 501 and the second data path 502 of the master mode processor 1001 read the respective first complex number data of the groups A1, B1, C1 and D1 (namely, complex number data of addresses 0, 1024, 2048 and 3072), and twiddle factors stored in the sin/cos factor ROM 110, and simultaneously read the first block floating-point exponent detection value from the block floating-point detection storing part 503. Following this, the system performs a block floating-point computing process by means of this detection value and the above-mentioned expressions (1) to (4). After this, the computation results ai, bi, ci and di are stored into the working RAM 107. At this time, the computation result ai of the expression (1) is stored at an address belonging to the group A (address 0 in this case), the computation result bi of the expression (3) is stored at an address belonging to the group B (address 1024 in this case), the computation result ci of the expression (2) is stored at an address belonging to the group C (address 2048 in this case), and the computation result di of the expression (4) is stored at an address belonging to the group D (address 3072 in this case). At this time, the block floating-point detection storing part 503 in the master mode processor 1001 performs detection of floating-point exponents of only the computation results ai and bi, and does not perform detection of floating-point exponents of the computation results ci and di. These detection results are stored in the block floating-point detection storing part 503 as they are.

At the same time as this, the first data path 501 and the second data path 502 of the slave mode processor 1002 take in the respective first complex number data of the groups A2, B2, C2 and D2 (namely, complex number data of addresses 0, 1024, 2048 and 3072) from the working RAM 107, perform a block floating-point computing process by means of the expressions (1) to (4), and obtain the computation results ai, bi, ci and di. These computation results are stored into the working RAM 107 in the slave mode processor 1002 in the same way as the case of the master mode processor 1001. At this time, the block floating-point detection storing part 503 in the slave mode processor 1002 performs detection of floating-point exponents of only the computation results ci and di, and does not perform detection of floating-point exponents of the computation results ai and bi. These detection results are stored in the block floating-point detection storing part 503 as they are.

Following this, the system performs the same computing process, using complex number data of addresses 1, 1025, 2049 and 3073, and furthermore in the same manner after this the system performs computing processes one after another in relation to complex number of all addresses.

When the first computing process has been finished in this way, the system replaces data with each other between the master mode processor 1001 and the slave mode processor 1002, using the input selecting circuits 1013 and 1014. That is to say, the system replaces the complex number data stored at addresses 2048 to 3071 of the working RAM 107 provided in the master mode processor 1001 (namely, the computation result ci of the master mode processor 1001) and the complex number data stored at addresses 0 to 1023 of the working RAM 107 provided in the slave mode processor 1002 (namely, the computation result ai of the slave mode processor 1002) with each other, and further replaces the complex number data stored at addresses 3072 to 4095 of the working RAM 107 provided in the master mode processor 1001 (namely, the computation result di of the master mode processor 1001) and the complex number data stored at addresses 1024 to 2047 of the working RAM 107 provided in the slave mode processor 1002 (namely, the computation result bi of the slave mode processor 1002) with each other. At this time, in this embodiment the system performs detection of a block floating-point exponent of each complex number data to be replaced. Thus, a block floating-point exponent detection has been performed in relation to every computation result obtained by the first computing process.

After this, in the same way as the case of the fourth embodiment, the system replaces addresses 1024 to 2047 and addresses 2048 to 3071 of the working RAMs 107 in the processors 1001 and 1002 with each other, for example, by changing data to be decoded of the address decoder provided in each of the working RAMs.

When replacement of data has been finished, then the system performs the second computing process (of radix 4) in the processors 1001 and 1002 independently of each other.

The second computing process is the same as the first computing process in the second embodiment, and each of the processors 1001 and 1002 divides the addresses of the data RAM 107 into four parts according to an address allocation as shown in FIG. 9, and performs a block floating-point arithmetic process.

Furthermore, in the third to sixth and later computing processes also, the system performs the same computing processes as the second to sixth computing processes of the second embodiment.

In the same way as the second embodiment, the system outputs the computation results to the outside.

In this way, a fast Fourier transform processing system according to this embodiment can perform a fast Fourier transform process in which the number of sampling points is 2N, by means of a block floating-point method, by connecting two fast Fourier transform processing devices each of which is a fast Fourier transform processing device capable of performing a block floating-point arithmetic and has a maximum of N sampling points in parallel with each other.

In this embodiment also, it is a matter of course that four or more fast Fourier transform processing devices can be connected in parallel with one another.

Although in this embodiment the system uses a block floating-point method in all of the first to seventh computing processes, the system may use, for example, a fixed-point method in the first computing process and use a block floating-point method in the second and later computing processes. In this case, when first reading in the external data, the system stops a detection operation of the block floating-point detection storing part 503 provided in each of the processors 1001 and 1002 so as to make it perform no detection. In the first computing process, the system uses a fixed-point method in the same manner as the first embodiment, and then detects a floating-point exponent when replacing complex number data with each other between the processors 1001 and 1002 on and after storing the computation results. In the second and later computing processes, it can do that the system performs a computing process using a floating-point exponent as described in the second embodiment.

By such a method as this also, it is possible to obtain effects of a fast Fourier transform processing system according to this embodiment.

Sixth Embodiment

Next, a sixth embodiment of the invention is described with reference to FIG. 18. A fast Fourier transform processing device according to this embodiment is different from the above-mentioned first embodiment in that the device of this embodiment is furthermore provided with two data paths and that it is provided with a transposing RAM.

In this embodiment, a case where the number of sampling points is 2048 is described as an example.

Figure 18:
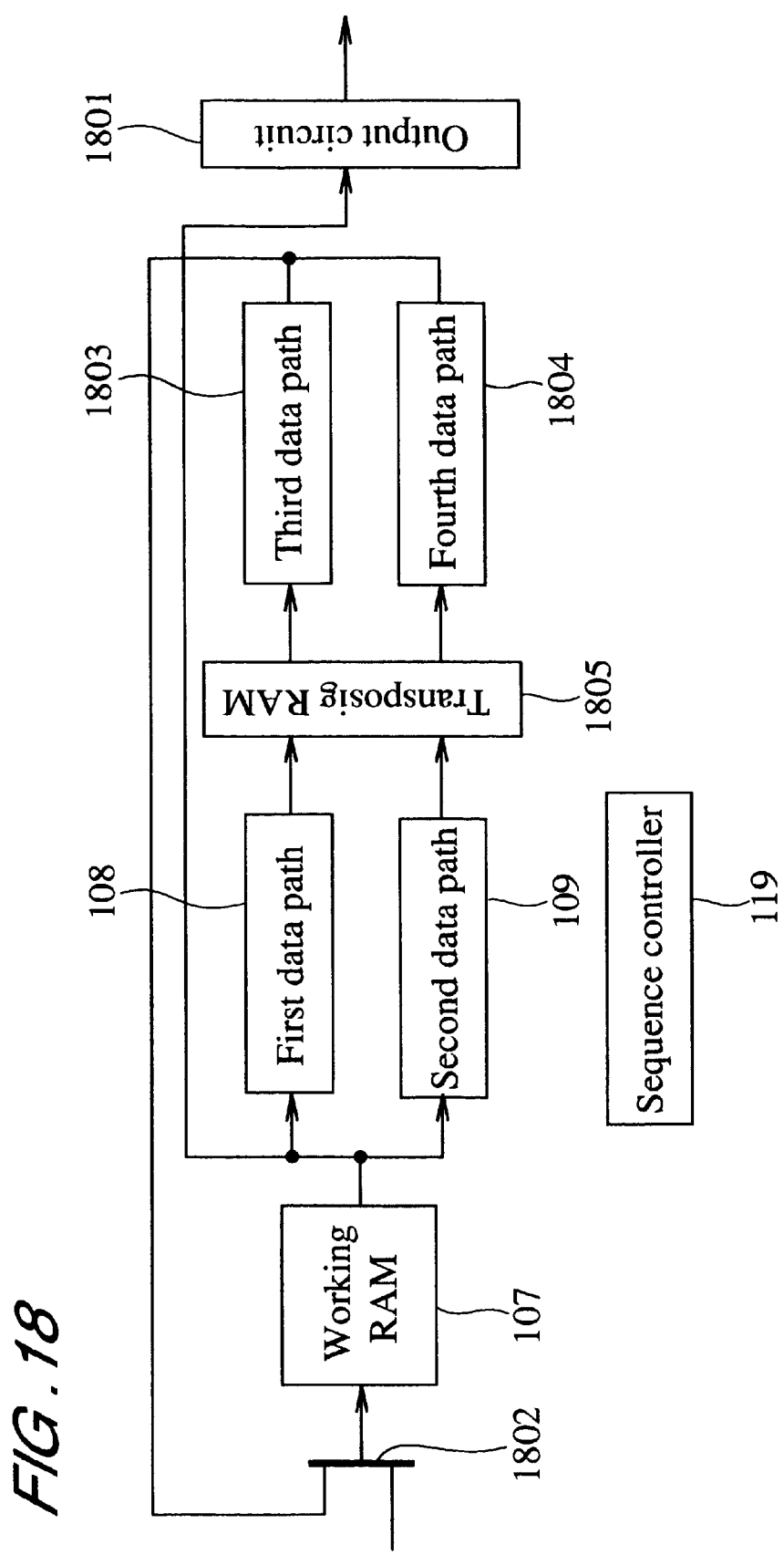
FIG. 18 is a block diagram roughly showing the composition of a fast Fourier transform processing device according to a sixth embodiment of the invention.

FIG. 18 is a block diagram roughly showing the composition of a fast Fourier transform processing device according to this embodiment.

In FIG. 18, components to which the same symbols as those of FIG. 1 are given represent the same components as those of FIG. 1.

An output circuit 1801 in FIG. 18 is a circuit to which the selectors 111 and 112, the registers 113 and 114, and the output terminals 115 and 116 in FIG. 1 are collectively abbreviated. The selector 1802 is a circuit to which the selectors 105 and 106, the registers 103 and 104, and the input ports 101 and 102 in FIG. 1 are collectively abbreviated.

A third data path 1803 can use the same internal structure as the first data path 108, namely, the structure shown in FIG. 2(A) or the structure shown in FIG. 12. In the same way, a fourth data path 1804 can use the same internal structure as the second data path 109, namely, the structure shown in FIG. 2(A) or the structure shown in FIG. 12.

A transposing RAM 1805 takes in one after another complex number data ai to di computed by the first data path 108 and the second data path 109 and temporarily stores them in it. And as described later, the transposing RAM 1805 transposes a matrix of 4 rows and 4 columns formed out of these complex number data and outputs the matrix column by column.

Following this, operation of the fast Fourier transform processing device shown in FIG. 18 is described with reference to FIG. 19.

In the same way as the above-mentioned first embodiment, first, data of 2048 sampling points to be processed are divided into the real number part and the imaginary number part and are stored one after another from the selector 1802 into the working RAM 107.

When the device has finished storing the data to be processed into the working RAM 107, then it performs a fast Fourier transform process using these data to be processed.

In a manner as described below, this embodiment performs the first computing process and the second computing process at the same time.

In these computing processes, the 2048 pieces of complex number data stored in the working RAM 107 are divided into four groups A, B, C and D similarly to the first embodiment, and then the groups A, B, C and D are further divided, respectively, into AG1 to AG4, BG1 to BG4, CG1 to CG4, and DG1 to DG4. That is to say, this embodiment is different from the above-mentioned embodiments in that the 2048 pieces of data stored in the working RAM 107 is first divided into 16 parts.

The first data path 108 and the second data path 109 read in the complex number data stored at addresses 0, 512, 1024 and 1536 in the working RAM 107 (namely, the first complex number data of each of the groups AG1, BG1, CG1 and DG1) and twiddle factors stored in the sin/cos factor ROM 110. The device computes the above-mentioned expressions (1) to (4) using data at address 0 as Ai, data at address 512 as Bi, data at address 1024 as Ci and data at address 1536 as Di.

When the computing operations are finished, the computation results a1, b1, c1 and d1 are outputted from the first data path 108 and the second data path 109. In this embodiment these computation results are stored in the transposing RAM 1805.

Following this, the first data path 108 and the second data path 109 read in the complex number data stored at addresses 128, 640, 1152 and 1644 in the working RAM 107 (namely, the first complex number data of each of the groups AG2, BG2, CG2 and DG2), respectively, as Ai, Bi, Ci and Di, and perform computing operations using the expressions (1) to (4), and then store the computation results a2, b2, c2 and d2 into the transposing RAM 1805. In the same manner, the data paths 108 and 109 compute one after another computing operations also for the first complex number data of each of the groups AG3, BG3, CG3 and DG3, and the first complex number data of each of the groups AG4, BG4, CG4 and DG4 using the expressions (1) to (4), and then store the computation results a3, b3, c3 and d3, and a4, b4, c4 and d4 into the transposing RAM 1805.

After this, the first data path 108 and the second data path 109 perform the same computing operations also for the second or later complex number data of the groups AG1 to AG4, BG1 to BG4, CG1 to CG4, and DG1 to DG4, and store one after another the computation results into the transposing RAM 1805.

As shown in FIG. 19, the transposing RAM 1805 arranges these computation results in a matrix of 4 rows and 4 columns, transposes the matrix (replaces the rows and the columns with each other), and outputs the transposed matrix column by column.

The third data path 1803 and the fourth data path 1804 read in complex number data inputted from the transposing RAM 1805. And they perform computing operations of the above-mentioned expressions (1) to (4) using the first row data as Ai, the second row data as Bi, the third row data as Ci and the fourth row data as Di. For example, in case of the first computation, they perform computing operations of the expressions (1) to (4) using a1 as Ai, a2 as Bi, a3 as Ci and a4 as Di. Complex number data ai, bi, ci and di obtained by these computing operations are stored into the working RAM 107. At this time, in the case of the first computation, the computation result ai of the expression (1) is stored at an address belonging to group AG1 (address 0 in this case), the computation result bi of the expression (3) is stored at an address belonging to group AG2 (address 128 in this case), the computation result ci of the expression (2) is stored at an address belonging to group AG3 (address 256 in this case), and the computation result di of the expression (4) is stored at an address belonging to group AG4 (address 384 in this case).

In the second computation of the third data path 1803 and the fourth data path 1804, computing operations of the expressions (1) to (4) are performed using b1 as Ai, b2 as Bi, b3 as Ci and b4 as Di, and the computation results are stored into the working RAM 107. At this time, the computation result ai of the expression (1) is stored at an address belonging to group BG1 (address 512 in this case), the computation result bi of the expression (3) is stored at an address belonging to group BG2 (address 640 in this case), the computation result ci of the expression (2) is stored at an address belonging to group BG3 (address 768 in this case), and the computation result di of the expression (4) is stored at an address belonging to group BG4 (address 896 in this case).

Furthermore, computing operations of the expressions (1) to (4) are performed one after another also complex number data c1 to c4 and d1 to d4 inputted from the transposing RAM 1805, and the computation results are stored, respectively, at the first addresses of the groups CG1 to CG4 and DG1 to DG4.

In the same way, the third data path 1803 and the fourth data path 1804 perform computing operations for all complex number data inputted from the transposing RAM 1805, and store one after another the computation results into the working RAM 107.

In such a way, this embodiment further divides each of groups A, B, C and D obtained by dividing the working RAM 107 into 4 parts to make groups AG1 to AG4, groups BG1 to BG4, groups CG1 to CG4 and groups DG1 to DG4, and makes the first data path 108 and the second data path 109 perform alternately with each other the computing operations using data to be processed of groups AG1, BG1, CG1 and DG1, the computing operations using data to be processed of groups AG2, BG2, CG2 and DG2, the computing operations using data to be processed of groups AG3, BG3, CG3 and DG3, and the computing operations using data to be processed of groups AG4, BG4, CG4 and DG4.

Thus, since the third data path 1803 and the fourth data path 1804 can perform computing operations using outputs of the transposing RAM 1805 as they are, they can realize a fast computing process.

When the first and second computing processes have been finished in this manner, then the third and fourth computing processes (of radix 4) are performed at the same time in the following manner.

In these computing processes, each of the groups AG1 to AG4, BG1 to BG4, CG1 to CG4 and DG1 to DG4 of the working RAM 107 are further divided into 16 parts. That is to say, in these computing processes the addresses of the data RAM 107 are divided into 256 parts. For example, groups AG1 to AG4, BG1 to BG4, CG1 to CG4 and DG1 to DG4 are obtained by further dividing each of groups A, B, C and D obtained by dividing a group AG1 into 4 parts into 4 parts. For example, as a result of further dividing group AG1 (addresses 0 to 128) in the above-mentioned first and second divisions into 16 parts, AG1 comes to have addresses 0 to 7, BG1 comes to have addresses 32 to 39, CG1 comes to have addresses 64 to 71, and DG1 comes to have addresses 96 to 103.

The first data path 108 and the second data path 109 read in complex number data stored at addresses 0, 32, 64 and 96 in the working RAM 107, and twiddle factors stored in the sin/cos factor ROM 110, and perform computing operations of the expressions (1) to (4) using data at address 0 as Ai, data at address 32 as Bi, data at address 64 as Ci and data at address 96 as Di. Complex number data obtained by these computing operations are stored into the transposing RAM 1805. In the same way as the first and second processes, the computing processes are then repeated by the first data path 108 and the second data path 109.

The transposing RAM 1805 also repeats operation of arranging the computation results in a matrix of 4 rows and 4 columns, transposing the matrix, and outputting the transposed matrix column by column in the same way as the first and second processes.

Moreover, in the same manner as the first and second processes the third data path 1803 and the fourth data path 1804 also perform computing operations of the expressions (1) to (4) using complex number data taken in from the transposing RAM 1805 and store the computation results ai, bi, ci and di at specified addresses in the working RAM 107. For example, in the case of the first computation, they store ai at address 0, bi at address 8, ci at address 16 and di at address 24.

When the third and fourth computing processes have been finished in this way, then the fifth computing process (of radix 4) and the sixth computing process (of radix 2) are performed at the same time in the following manner.

In these computing processes, each of the groups in the data RAM 107 divided in the third and fourth computing processes is divided into 4 groups. That is to say, in these computing processes, the addresses of the data RAM 107 are divided into 1024 parts in total. For example, as a result of further dividing group AG1 (addresses 0 to 7) in the above-mentioned third and fourth divisions into 4 parts, AG1 comes to have addresses 0 and 1, BG1 comes to have addresses 2 and 3, CG1 comes to have addresses 4 and 5, and DG1 comes to have addresses 6 and 7. The reason why these computing processes divide the group into 4 parts instead of 16 parts is that a computing process of radix 2 (namely, the sixth computing process) does not have to divide data to be processed in the working RAM into 4 parts.

Next, the first data path 108 and the second data path 109 read in complex number data stored at addresses 0, 2, 4 and 6 in the working RAM 107, and twiddle factors stored in the sin/cos factor ROM 110, and perform computing operations of the expressions (1) to (4) using data at address 0 as Ai, data at address 2 as Bi, data at address 4 as Ci and data at address 6 as Di. Complex number data obtained by these computing operations are stored into the transposing RAM 1805. In the same way as the first and second processes, the computing processes are then repeated by the first data path 108 and the second data path 109.

The transposing RAM 1805 also repeats operation of arranging the computation results in a matrix of 4 rows and 4 columns, transposing the matrix, and outputting the transposed matrix column by column in the same way as the first and second processes.

The third data path 1803 and the fourth data path 1804 perform a computing process of radix 2. That is to say, these data paths 1803 and 1804 perform computing operations of the above-mentioned expressions (5) to (8) using complex number data taken in from the transposing RAM 1805 and store the computation results ai, bi, ci and di at specified addresses in the working RAM 107. For example, in case of the first computation, they store ai at address 0, bi at address 1, ci at address 8 and di at address 9.

Similar computing operations are repeated in the following and the computation results are stored one after another into the working RAM 107.

When the fifth and sixth computing processes have been finished, finally the computation results are outputted to the outside in the same way as the first embodiment.

Thus, in this embodiment since it is not necessary to store once the computation results ai, bi, ci and di of the first data path 108 and the second data path 109 into the working RAM 107, and it is possible to transpose them by means of the transposing RAM 1805 and use them as data to be processed of the third data path 1803 and the fourth data path 1804 as they are, the processing speed can be greatly improved.

Although an example using data paths of two stages has been described above, it is preferable to use plural-stage data paths of 4 or more stages and provide a transposing RAM between every two stages. Such a case can more greatly improve the processing speed.

Seventh Embodiment

Next, a seventh embodiment of the invention is described with reference to FIG. 20. A fast Fourier transform processing device according to this embodiment is different from the above-mentioned sixth embodiment in that the device of this embodiment is provided with a block floating-point computing function.

As an example in this embodiment also, a case where the number of sampling points is 2048 is described.

Figure 20:
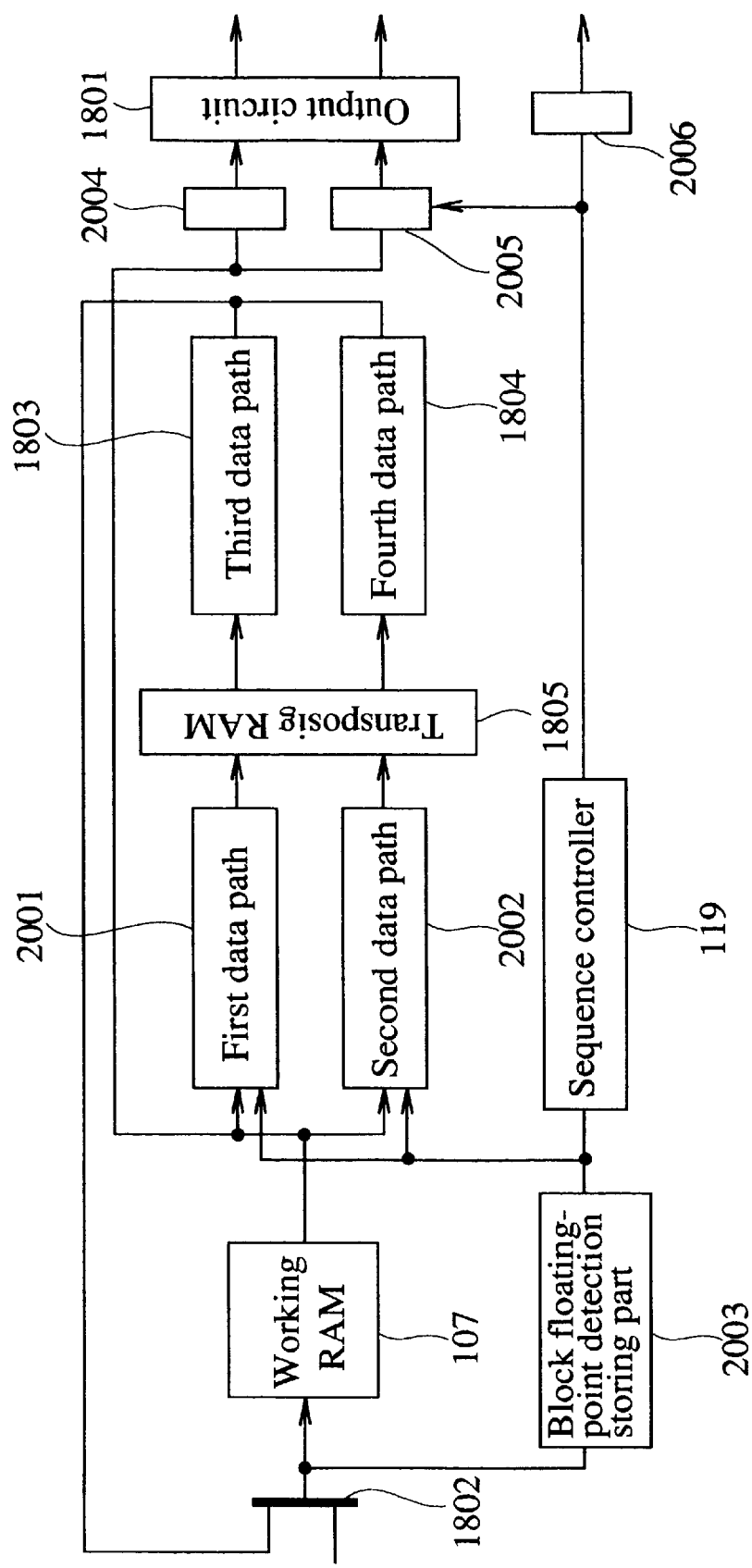
FIG. 20 is a block diagram roughly showing the composition of a fast Fourier transform processing device according to a seventh embodiment of the invention.

FIG. 20 is a block diagram roughly showing the composition of a fast Fourier transform processing device according to this embodiment.

In FIG. 20, components to which the same symbols as those of FIGS. 1 and 18 are given represent the same components as those of FIG. 1 and 18.

In FIG. 20, the first data path 2001 and the second data path 2002 are different from the data paths 108 and 109 shown in FIG. 18 in that each of the data paths 2001 and 2002 is provided with a shift function for performing a block floating-point computing operation. Description of a detailed composition of the shift function used in the block floating-point computing operation is omitted.

A block floating-point detection storing part 2003 takes in complex number data outputted from the selector 1802 and detects a block floating point and then temporarily stores this detected value. The detected value of a block floating point temporarily stored in this block floating-point detection storing part 2003 is transferred to the data paths 2001 and 2002 and the sequence controller 119.

Output bit shifters 2004 and 2005 take in complex number data from the working RAM 107 as well as a floating-point exponent from the sequence controller, and shift the complex number data on the basis of this floating-point exponent, and then output the result.

A register 2006 has the accumulation of floating-point exponent inputted from the sequence controller 119 and outputs it to the outside.

Following this, operation of the fast Fourier transform processing device shown in FIG. 20 is described.

In the same way as the above-mentioned sixth embodiment, first, data of 2048 sampling points to be processed are divided into the real number part and the imaginary number part and are stored one after another from the selector 1802 into the working RAM 107. At this time, the block floating-point detection storing part 2003 has these complex number data inputted from the selector 1802 one after another and detects their floating-point exponents in the same way as the second embodiment.

When the device has finished storing the data to be processed into the working RAM 107, then it performs a fast Fourier transform process using these data to be processed.

In a manner as described below, this embodiment performs the first computing process and the second computing process at the same time.

In these computing processes, the 2048 pieces of complex number data stored in the working RAM 107 are divided into groups AG1 to AG4, BG1 to BG4, CG1 to CG4, and DG1 to DG4 in the same way as the sixth embodiment.

The first data path 2001 and the second data path 2002 read in complex number data stored at addresses 0, 512, 1024 and 1536 in the working RAM 107 (namely, the first complex number data of each of the groups AG1, BG1, CG1 and DG1) and twiddle factors stored in the sin/cos factor ROM 110, and at the same time, read in a floating-point exponent common to the groups from the block floating-point detection part 2003. The data paths 2001 and 2002 perform block floating-point computing operations using this floating-point exponent and the above-mentioned expressions (1) to (4).

When the computation is finished, the computation results a1, b1, c1 and d1 are outputted from the first data path 2001 and the second data path 2002, and are stored into the transposing RAM 1805.

After this, the first data path 2001 and the second data path 2002 read out one after another other complex number data from the working RAM 107 in the same manner as the sixth embodiment. The computing operations are performed one after another by means of a block floating point method, and the results are stored one after another the computation results into the transposing RAM 1805.

At this time, the transposing RAM 1805 arranges these computation results in a matrix of 4 rows and 4 columns, transposes the matrix, and outputs the transposed matrix column by column.

The third data path 1803 and the fourth data path 1804 read in complex number data inputted from the transposing RAM 1805. The computing operations of the above-mentioned expressions (1) to (4) are performed by means of a fixed point method, using a1 as Ai, a2 as Bi, a3 as Ci and a4 as Di. The complex number data ai, bi, ci and di are stored into the working RAM 107 (addresses where these data are stored are the same as the sixth embodiment).

At this time, the block floating-point detection storing part 2003 has the computation results ai, bi, ci and di inputted in it, and detects and stores a floating-point exponent for each of the computation results.

Next, the third data path 1803 and the fourth data path 1804 perform the second computing process by means of a fixed point method, using b1 as Ai, b2 as Bi, b3 as Ci and b4 as Di, and store the computation results into the working RAM 107 (addresses where these data are stored are the same as the sixth embodiment).

At this time the block floating-point detection storing part 2003 has the computation results ai, bi, ci and di inputted in it, and detects a floating-point exponent for each of the computation results, and compares each of the detected values with a floating-point exponent stored in the block floating-point detection part 2003. When an already stored floating-point exponent is smaller than the detected value, the block floating-point detection part 2003 does not change the stored content, and when the current detected value is smaller than the already stored floating-point exponent, it changes the stored content into the current detected value.

In the same way, the third data path 1803 and the fourth data path 1804 perform computing operations for all complex number data inputted from the transposing RAM 1805, and store one after another the computation results into the working RAM 107, and the block floating-point detection storing part 2003 detects a floating-point exponent for each of the computation results one after another, and when the current detected value is smaller than the stored content, it rewrites the stored content.

This embodiment uses a floating-point exponent detected in such a way in the third computing process as described later.

When the first and second computing processes have been finished in this manner, then the third and fourth computing processes (of radix 4) are performed at the same time in the following manner.

In these computing processes, in the same way as the sixth embodiment, each of the groups AG1 to AG4, BG1 to BG4, CG1 to CG4 and DG1 to DG4 in the working RAM 107 are further divided into 16 parts.

The first data path 2001 and the second data path 2002 read in complex number data stored at addresses 0, 32, 64 and 96 in the working RAM 107, and twiddle factors stored in the sin/cos factor ROM 110, and read in floating-point exponents from the block floating-point detection part 2003, and then perform computing operations of the expressions (1) to (4) by means of a block floating point method. In the same way as the first computing process, the computing operations are repeated by the first data path 2001 and the second data path 2002 in the following.

The transposing RAM 1805 also repeats operation of arranging the computation results into a matrix of 4 rows and 4 columns, transposing the matrix, and outputting the transposed matrix column by column in the same way as the first and second processes.

Moreover, in the same manner as the first and second processes the third data path 1803 and the fourth data path 1804 also perform computing operations of the expressions (1) to (4) by means of a fixed point method, using complex number data taken in from the transposing RAM 1805 and store the computation results ai, bi, ci and di at specified addresses in the working RAM 107. At this time, in the same manner as the second computing process, the block floating-point detection storing part 2003 detects a floating-point exponent for each of the computation results ai, bi, ci and di one after another, and when the current detection values are smaller than the stored contents, it rewrites the stored contents one after another.

A floating-point exponent detected in this manner is used in the fifth computing process as described later.

When the third and fourth computing processes have been finished in this way, then the fifth computing process (of radix 4) and the sixth computing process (of radix 2) are performed at the same time in the following manner.

In these computing processes, in the same way as the sixth embodiment each of the groups in the data RAM 107 divided in the third and fourth computing processes is divided into 4 groups.

The first data path 2001 and the second data path 2002 read in complex number data stored at addresses 0, 2, 4 and 6 in the working RAM 107, and twiddle factors stored in the sin/cos factor ROM 110, and at the same time, read in floating-point exponents from the block floating-point detection storing part 2003, and then perform computing operations of the expressions (1) to (4) by means of a block floating point method. Following this, complex number data obtained by these computing operations are stored into the transposing RAM 1805. In the same way as the first and third processes, the computing processes are then repeated by the first data path 2001 and the second data path 2002.

The transposing RAM 1805 also repeats operation of arranging the computation results into a matrix of 4 rows and 4 columns, transposing the matrix, and outputting the transposed matrix column by column in the same way as the first and third processes.

The third data path 1803 and the fourth data path 1804 perform a computing process of radix 2. That is to say, these data paths 1803 and 1804 perform computing operations of the above-mentioned expressions (5) to (8) by means of a fixed point method, using complex number data taken in from the transposing RAM 1805 and store the computation results ai, bi, ci and di at specified addresses in the working RAM 107. At this time, the block floating-point detection storing part 2003 detects a floating-point exponent for each of the computation results ai, bi, ci and di one after another, and when the current detected values are smaller than the stored contents, it rewrites the stored contents one after another.

When the fifth and sixth computing processes have been finished, finally the computation results are outputted to the outside. At this time, the sequence controller 119 first has the accumulation of the floating-point exponents used in each stage for the respective samples inputted from the block floating-point detection storing part 2003 and sends them to the output bit shifters 2004 and 2005. The output bit shifters 2004 and 2005 shift the complex number data inputted from the working RAM 107 on the basis of accumulation of these floating-point exponents, and then send them to the output circuit 1801. By this, the shifted complex number data are outputted from the output circuit 1801 to the outside.

If necessary, it is possible also to output the complex number data and output the final floating-point exponents from the register 2006 to the outside, without shifting by the output bit shifters 2004 and 2005.

Thus, in this embodiment, since it is not necessary to store once the computation results ai, bi, ci and di of the first data path 2001 and the second data path 2002 into the working RAM 107, and it is possible to transpose them by means of the transposing RAM 1805 and use them as data to be processed of the third data path 1803 and the fourth data path 1804 as they are, the processing speed by a block floating point method can be greatly improved.

Although an example using data paths of two stages has been described above, it is preferable also to use plural-stage data paths of 4 or more stages and provide a transposing RAM between every two stages. Such a case can more greatly improve the processing speed.

Eighth Embodiment

Next, an eighth embodiment of the invention is described with reference to FIG. 21. A fast Fourier transform processing device according to this embodiment is different from the above-mentioned sixth embodiment in that the device of this embodiment is provided with a selector 2101.

As an example in this embodiment a case where the number of sampling points is 1024 is described.

Figure 21:
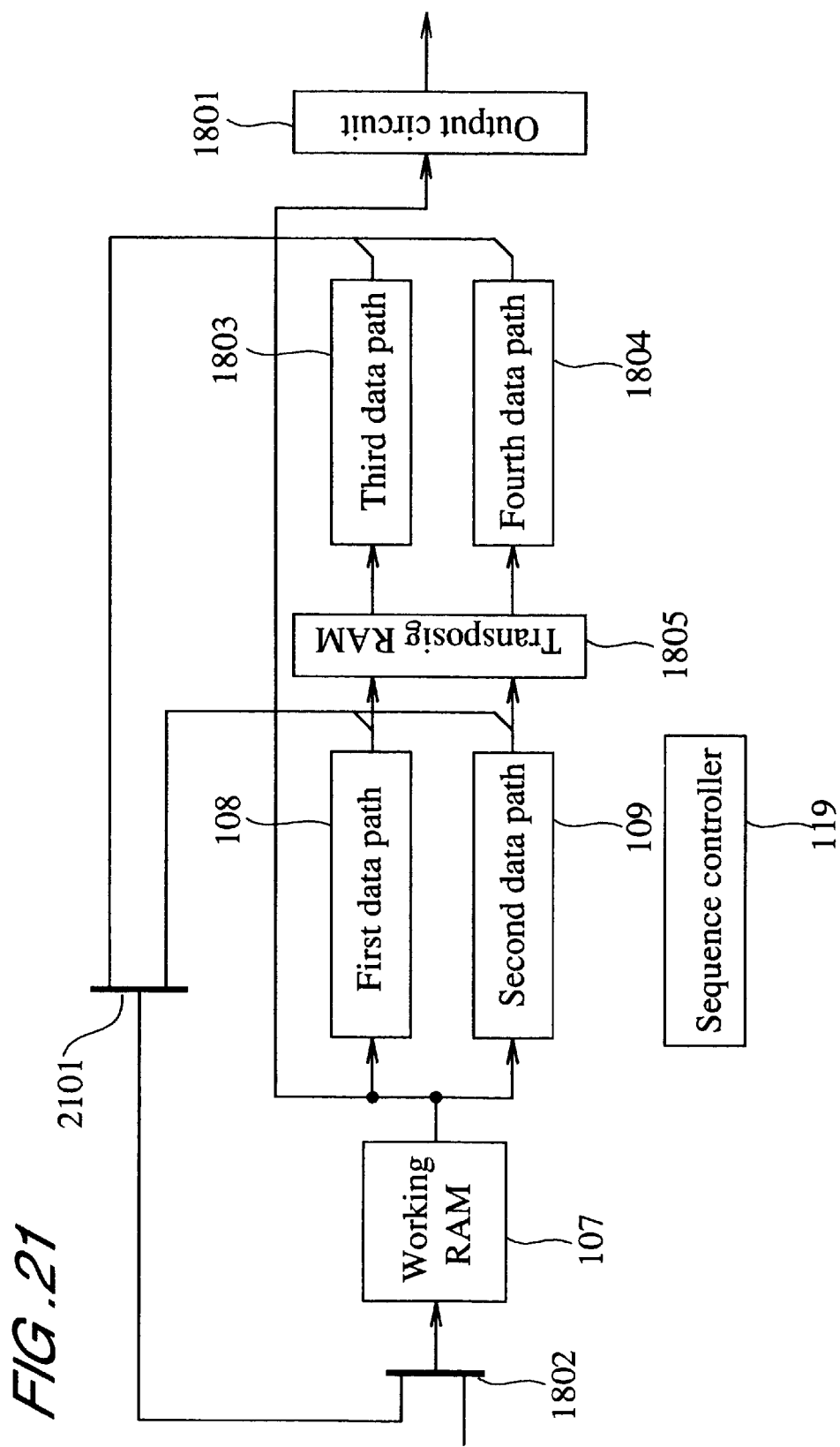
FIG. 21 Is a block diagram roughly showing the composition of a fast Fourier transform processing device according to an eighth embodiment of the invention.

FIG. 21 is a block diagram roughly showing the composition of a fast Fourier transform processing device according to this embodiment.

In FIG. 21, components to which the same symbols as those of FIGS. 18 are given represent the same components as those of FIG. 18.

In FIG. 21, the selector 2101 selects output of the first and second data paths 108 and 109 or output of the third and fourth data paths 1803 and 1804, and supplies it to one of the input terminals of the selector 1802. This selection is performed by the sequence controller 119.

Following this, operation of the fast Fourier transform processing device shown in FIG. 21 is described.

Since in this embodiment as described above, the number of sampling points is 1024 (the 5th power of 4), a computing process of radix 4 is performed at five times.

First, the sequence controller 119 sets up the selector 1802 so that data to be processed inputted from the outside may be supplied to the working RAM 107. In the same way as the above-mentioned first embodiment, the data to be processed are divided into the real number part and the imaginary number part, and then are stored one after another from the selector 1802 into the working RAM 107.

Next, the sequence controller 119 sets up the selectors 1802 and 2101 so that outputs of the third and fourth data paths 1803 and 1804 may be supplied to the working RAM 107.

In the same way as the sixth embodiment, the first and second computing processes are performed at the same time, and then the third and fourth computing processes are performed at the same time.

When the first to fourth computing processes have been finished, then the sequence controller 119 sets up the selectors 1802 and 2101 so that outputs of the first and second data paths 108 and 109 may be supplied to the working RAM 107.

The fifth computing process (of radix 4) is performed as follows.

In this computing process, first, each of the groups in the working RAM 107 divided into 256 parts in the above-mentioned third and fourth computing processes is further divided into 4 groups. That is, in this computing process, the addresses of the working RAM 107 are divided into 1024 parts in total.

Next, the first data path 108 and the second data path 109 read in complex number data at addresses 0, 1, 2 and 3 in the working RAM 107, and twiddle factors stored in the sin/cos factor ROM 110, and then perform computing operations of the expressions (1) to (4) using data at address 0 as Ai, data at address 1 as Bi, data at address 2 as Ci, and data at address 3 as Di.

Following this, the data paths 108 and 109 store the complex number data ai, bi, ci and di, respectively, at addresses 0, 1, 2 and 3 in the working RAM 107 through the selectors 1802 and 2101. After this, in the same way they perform computing operations using complex number data at addresses 4, 5, 6 and 7.

Following this, in the same way the computing operations are performed using complex number data at the respective addresses.

When the fifth computing process has been finished, finally the computation results are outputted to the outside in the same way as the above-mentioned embodiments.

Thus, since this embodiment is provided with a selector 2101, it is effective to a case where the number of computing processes is an odd number.

Although an example using data paths of two stages has been described above, it is preferable also to use plural-stage data paths of 4 or more stages and provide a transposing RAM between every two stages. Such a case can more greatly improve the processing speed.

Ninth Embodiment

Next, a ninth embodiment of the invention is described with reference to FIG. 22. This embodiment provides a fast Fourier transform processing device shown in the eighth embodiment with a block floating-point computing function.

As an example in this embodiment also, a case where the number of sampling points is 1024 is described.

Figure 22:
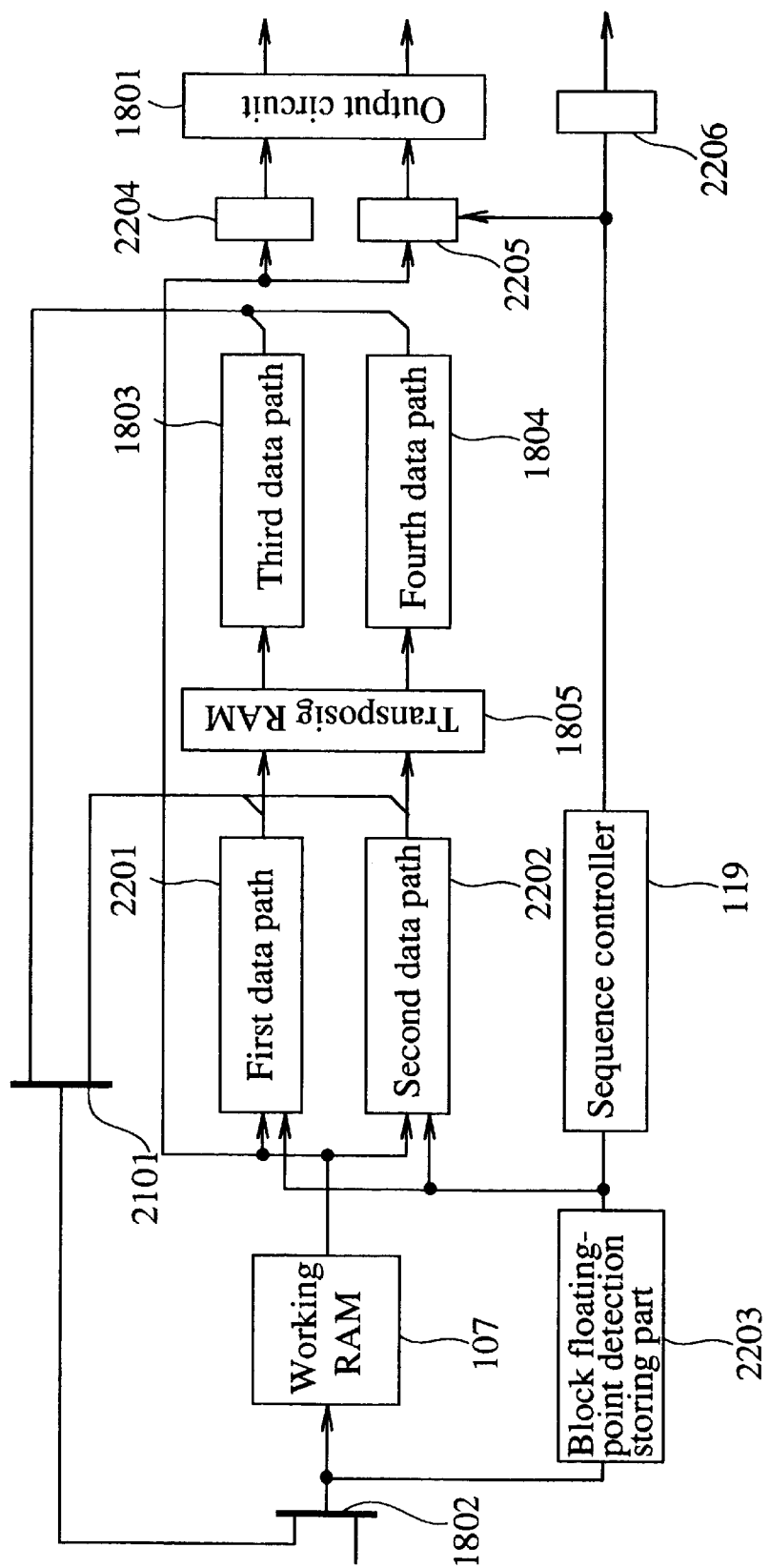
FIG. 22 is a block diagram roughly showing the composition of a fast Fourier transform processing device according to a ninth embodiment of the invention.

FIG. 22 is a block diagram roughly showing the composition of a fast Fourier transform processing device according to this embodiment.

In FIG. 22, components to which the same symbols as those of FIG. 21 are given represent the same components as those of FIG. 21.

In FIG. 22, the first data path 2201 and the second data path 2202 are different from the data paths 108 and 109 shown in FIG. 21 in that each of the data paths 2201 and 2202 has a shift function for performing a block floating-point computing operation. Description of a detailed composition of the shift function used in the block floating-point computing operation is omitted.

The block floating-point detection storing part 2203 takes in complex number data outputted from the selector 1802 and detects floating-point exponents and temporarily stores the detected values in it.

Output bit shifters 2204 and 2205 take in complex number data from the working RAM 107 as well as the accumulation of floating-point exponents from the sequence controller 119, and shift the complex number data on the basis of this floating-point exponent, and then output the result.

A register 2206 has the accumulation of floating-point exponents inputted from the sequence controller 119 and outputs it to the outside.

Following this, operation of the fast Fourier transform processing device shown in FIG. 22 is described.

First, the sequence controller 119 sets up the selector 1802 so that complex number data to be processed inputted from the outside may be supplied to the working RAM 107. In the same way as the above-mentioned eighth embodiment, data of 1024 points to be processed are divided into the real number part and the imaginary number part and are stored one after another from the selector 1802 into the working RAM 107. At this time, the block floating-point detection storing part 2203 has these complex number data inputted from the selector 1802 one after another and detects their floating-point exponents in the same way as the second embodiment.

Next, the sequence controller 119 sets up the selectors 1802 and 2101 so that outputs of the third and fourth data paths 1803 and 1804 may be supplied to the working RAM 107.

In the same way as the seventh embodiment, the first and second computing processes are performed at the same time, and then the third and fourth computing processes are performed at the same time. At this time the first data path 2201 and 2202 perform computing operations by means of a block floating point method using floating-point exponents taken in from the block floating-point detection storing part 2203, and the third data path 1803 and the fourth data path 1804 perform computing operations by means of a fixed point method.

When the first to fourth computing processes have been finished, then the sequence controller 119 sets up the selectors 1802 and 2101 so that outputs of the first and second data paths 2201 and 2202 may be supplied to the working RAM 107.

The fifth computing process (of radix 4) is performed as described in the following.

In this computing process, first, each of the groups in the working RAM 107 divided into 256 parts in the above-mentioned third and fourth computing processes is further divided into 4 groups. That is to say, in this computing process, the addresses of the working RAM 107 are divided into 1024 parts in total.

Next, the first data path 2201 and the second data path 2202 read in complex number data at addresses 0, 1, 2 and 3 of the working RAM 107, and twiddle factors stored in the sin/cos factor ROM 110, and read in twiddle factors stored in the sin/cos factor ROM 110 and floating-point exponents stored in the block floating-point detection storing part 2203, and then perform computing operations of the expressions (1) to (4) by means of a block floating point method using data at address 0 as Ai, data at 1 as Bi, data at address 2 as Ci, and data at address 3 as Di.

Following this, the first and second data paths 2201 and 2202 store the complex number data ai, bi, ci and di obtained by these computing operations at addresses 0, 1, 2 and 3 in the working RAM 107 through the selectors 1802 and 2101. At this time, the block floating-point detection storing part 2203 detects a floating-point exponent for each of the computation results ai, bi, ci and di one after another, and when the current detection values are smaller than the stored contents, it rewrites the stored contents one after another.

After this in the same way, the device performs computing operations using complex number data at addresses 4, 5, 6 and 7.

When the fifth computing process has been finished as described above, finally the computation results are outputted to the outside in the same way as the above-mentioned embodiments. At this time, the sequence controller 119 first has the accumulation of the floating-point exponents used in each stage for the respective samples inputted from the block floating-point detection storing part 2203 and sends them to the output bit shifters 2204 and 2205. The output bit shifters 2204 and 2205 shift the complex number data inputted from the working RAM 107 on the basis of these floating-point exponents, and then send them to the output circuit 1801. By this, the shifted complex number data are outputted from the output circuit 1801 to the outside.

If necessary, it is possible also to output the complex number data without shifting by the output bit shifters 2204 and 2205 and output the final floating-point exponents from the register 2206 to the outside.

Thus, since this embodiment is provided with a selector 2101, a high-speed computing process by means of a block floating point method can be realized in case that the number of computing processes is an odd number.

Although an example using data paths of two stages has been described above, it is preferable also to use plural-stage data paths of 4 or more stages and provide a transposing RAM between every two stages. Such a case can more greatly improve the processing speed.

Tenth Embodiment

Next, a tenth embodiment of the invention is described with reference to FIG. 23. A fast Fourier transform processing device according to this embodiment is different from the above-mentioned sixth embodiment in that the device of this embodiment is provided with a selector 2301.

As an example in this embodiment, a case where the number of sampling points is 1024 is described.

Figure 23:
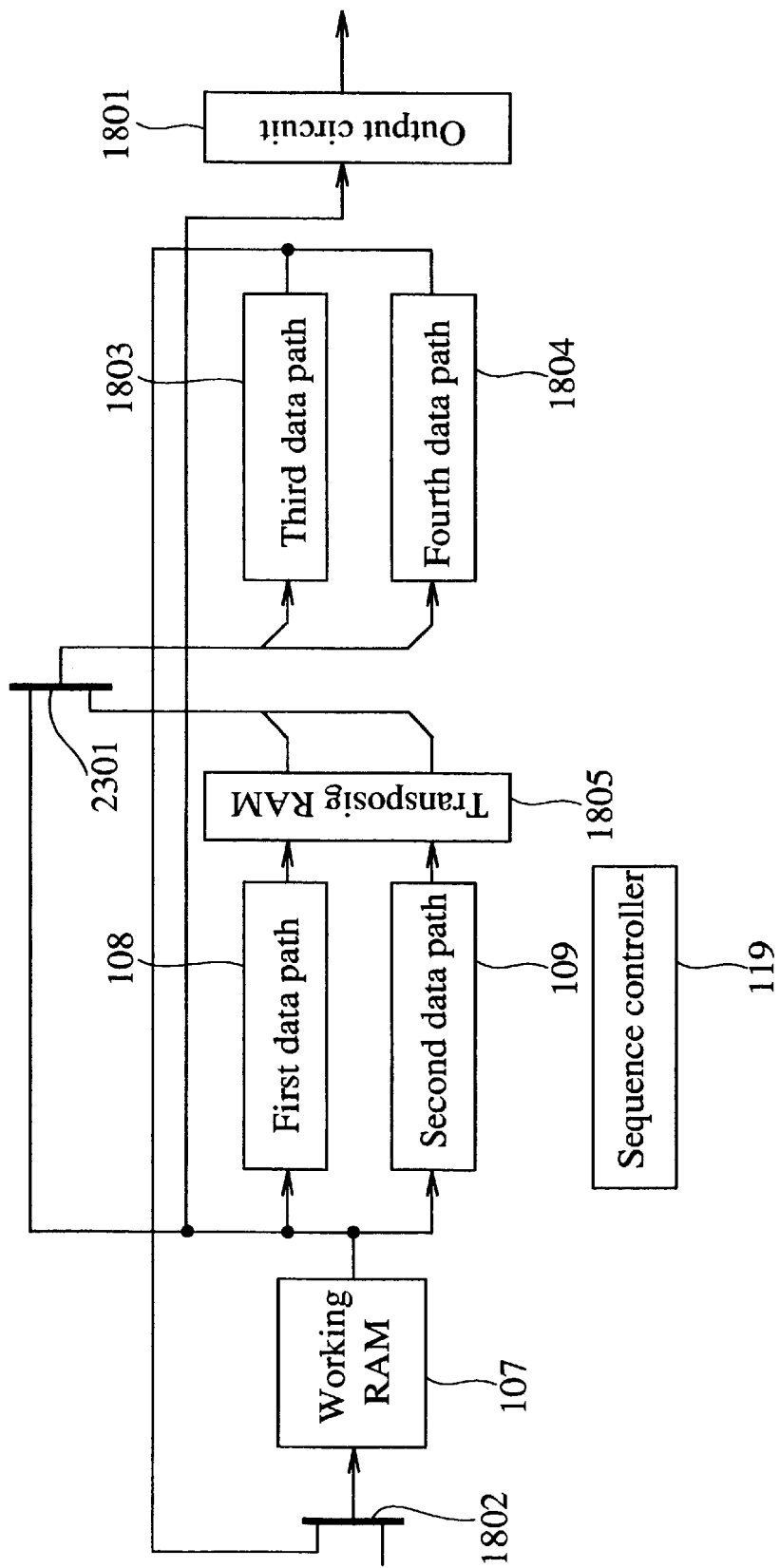
FIG. 23 is a block diagram roughly showing the composition of a fast Fourier transform processing device according to a tenth embodiment of the invention.

FIG. 23 is a block diagram roughly showing the composition of a fast Fourier transform processing device according to this embodiment.

In FIG. 23, components to which the same symbols as those of FIGS. 18 are given represent the same components as those of FIG. 18.

In FIG. 23, the selector 2301 selects one of the output of the working RAM 107 and the output of the transposing RAM 1805, and supplies it to the third data path 1803 and the second data path 1804. This selection is performed by the sequence controller 119.

Following this, operation of the fast Fourier transform processing device shown in FIG. 23 is described.

Since in this embodiment, as described above, the number of sampling points is 1024 (the 5th power of 4), a computing process of radix 4 is performed at five times.

First, data to be processed are divided into the real number part and the imaginary part, and then are stored one after another from the selector 1802 into the working RAM 107.

Next, the sequence controller 119 sets up the selectors 2301 so that output of the transposing RAM 1805 may be supplied to the third and fourth data paths 1803 and 1804.

In the same way as the above-mentioned sixth embodiment, the first and second computing processes are performed at the same time, and then the third and fourth computing processes are performed at the same time.

When the first to fourth computing processes have been finished, then the sequence controller 119 sets up the selector 2301 so that output of the working RAM 107 may be supplied to the third and fourth data paths 1803 and 1804.

The fifth computing process (of radix 4) is performed as described in the following.

In this computing process, first, each of the groups in the data RAM 107 divided into 256 parts in the above-mentioned third and fourth computing processes is further divided into 4 groups. That is to say, in this computing process, the addresses of the working RAM 107 are divided into 1024 parts in total.

Next, the third data path 1803 and the fourth data path 1804 read in complex number data at addresses 0, 1, 2 and 3 in the working RAM 107, and twiddle factors stored in the sin/cos factor ROM 110, and then perform computing operations of the expressions (1) to (4) using data at address 0 as Ai, data at 1 as Bi, data at address 2 as Ci, and data at address 3 as Di.

Following this, the third and fourth data paths 1803 and 1804 store the complex number data ai, bi, ci and di obtained by these computing operations, respectively, at addresses 0, 1, 2 and 3 in the working RAM 107. After this, in the same way, the third and fourth data paths 1803 and 1804 perform computing operations using complex number data at addresses 4, 5, 6 and 7.

Following this, in the same way, the computing operations are performed using complex number data at the respective addresses.

When the fifth computing process has been finished in the above-mentioned manner, finally the computation results are outputted to the outside in the same way as the above-mentioned embodiments.

Thus, since this embodiment is provided with a selector 2301, it is effective to a case where the number of computing processes is an odd number.

Although an example using data paths of two stages has been described above, it is preferable also to use plural-stage data paths of 4 or more stages and provide a transposing RAM between every two stages. Such a case can more greatly improve the processing speed.

Eleventh Embodiment

Next, an eleventh embodiment of the invention is described with reference to FIG. 24. This embodiment provides a fast Fourier transform processing device shown in the tenth embodiment with a block floating-point computing mechanism.

As an example in this embodiment, a case where the number of sampling points is 1024 is described.

Figure 24:
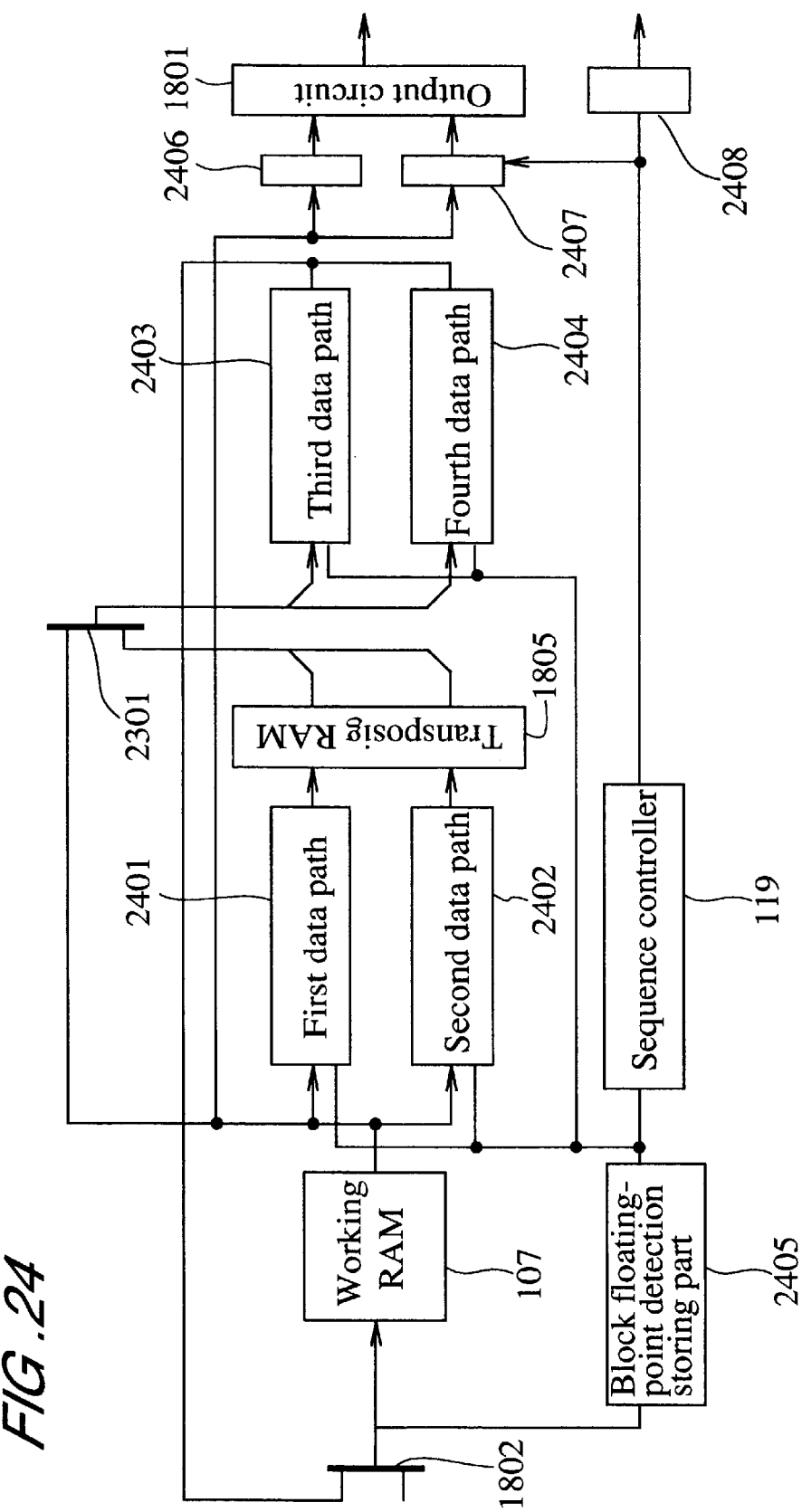
FIG. 24 is a block diagram roughly showing the composition of a fast Fourier transform processing device according to an eleventh embodiment of the invention.

FIG. 24 is a block diagram roughly showing the composition of a fast Fourier transform processing device according to this embodiment.

In FIG. 24, components to which the same symbols as those of FIGS. 23 are given represent the same components as those of FIG. 23.

In FIG. 24, the first data path 2401 and the second data path 2402 are different from the data paths 108 and 109 shown in FIG. 23 in that each of the data paths 2401 and 2402 has a shift function for performing a block floating-point computing operation. In this embodiment, each of the third data path 2403 and the fourth data path 2404 also has such a shift function. Description of a detailed composition of the shift function used in the block floating-point computing operation is omitted.

The block floating-point detection storing part 2405 takes in complex number data outputted from the selector 1802 and detects their floating-point exponents, and temporarily stores the detection values in it.

Output bit shifters 2406 and 2407 take in complex number data from the working RAM 107 as well as a floating-point exponent from the sequence controller 119, and shift the complex number data on the basis of this floating-point exponent, and then output the result.

A register 2408 has a floating-point exponent inputted from the sequence controller 119 and outputs it to the outside.

Following this, operation of the fast Fourier transform processing device shown in FIG. 24 is described.

In this embodiment, since the number of sampling points is 1024 (the 5th power of 4) as described above, a computing process of radix 4 is performed at five times.

First, data to be processed inputted from the outside are divided into the real number part and the imaginary number part, and stored one after another from the selector 1802 into the working RAM 107. At this time the block floating-point detection storing part 2405 has these complex number data inputted from the selector 1802 one after another and detects their floating-point exponents in the same way as the second embodiment.

Next, the sequence controller 119 sets up the selector 2301 so that output of the transposing RAM 1805 may be supplied to the third and fourth data paths 2403 and 2404.

In the same way as the above-mentioned sixth embodiment, the first and second computing processes are performed at the same time, and then the third and fourth computing processes are performed at the same time. At this time, the first data path 2401 and the second data path 2402 perform computing operations by means of a block floating point method using floating-point exponents taken in from the block floating-point detection storing part 2405. In the first to fourth computing processes, the third data path 2403 and the fourth data path 2404 perform computing operations by means of a fixed point method instead of a floating point method.

When the first to fourth computing processes have been finished, then the sequence controller 119 sets up the selector 2301 so that output of the working RAM 107 may be supplied to the third and fourth data paths 2403 and 2404.

The fifth computing process (of radix 4) is performed as described in the following.

In this computing process, first, each of the groups in the working RAM 107 divided into 256 parts in the above-mentioned third and fourth computing processes is further divided into 4 groups. That is, in this computing process, the addresses of the working RAM 107 are divided into 1024 parts in total.

Next, the third data path 2403 and the fourth data path 2404 read in complex number data at addresses 0, 1, 2 and 3 in the working RAM 107, twiddle factors stored in the sin/cos factor ROM 110, and floating-point exponents stored in the block floating-point detection storing part 2405, and then perform computing operations of the expressions (1) to (4) using data at address 0 as Ai, data at 1 as Bi, data at address 2 as Ci, and data at address 3 as Di.

Following this, the third and fourth data paths 2403 and 2404 store the complex number data ai, bi, ci and di obtained by these computing operations at addresses 0, 1, 2 and 3 in the working RAM 107. At this time, the block floating-point detection storing part 2405 detects floating-point exponents one after another, and when the current detected values are smaller than the stored contents, it rewrites the stored contents one after another.

After this in the same way, the third and fourth data paths 2403 and 2404 perform computing operations using complex number data at addresses 4, 5, 6 and 7.

In the same way after this also, the device performs the computing operations using complex number data at the respective addresses.

When the fifth computing process has been finished as described above, finally the computation results are outputted to the outside in the same way as the above-mentioned embodiments. At this time, the sequence controller 119 first has the accumulation of the floating-point exponents used in the first, the third and the fifth stages for the respective samples inputted from the block floating-point detection storing part 2405 and sends them to the output bit shifters 2406 and 2407. The output bit shifters 2406 and 2407 shift the complex number data inputted from the working RAM 107 on the basis of these floating-point exponents, and then send them to the output circuit 1801. By this, the shifted complex number data are outputted from the output circuit 1801 to the outside.

If necessary, it is possible also to output the complex number data without shifting by the output bit shifters 2406 and 2407 and output the final floating-point exponents from the register 2408 to the outside.

Thus, since this embodiment is provided with a selector 2301, it is effective to a case where the number of computing processes is an odd number.

Since not only the first data path 2401 and the second data path 2402 but also the third data path 2403 and the fourth data path 2404 can perform a block floating-point computing operation, the fifth computing process also can be performed by means of a block floating point method and the computation results can be improved in accuracy.

Although an example using data paths of two stages has been described above, it is preferable also to use plural-stage data paths of 4 or more stages and provide a transposing RAM between every two stages. Such a case can more greatly improve the processing speed.

Twelfth Embodiment

Next, a twelfth embodiment of the invention is described with reference to FIGS. 25 and 26.

In this embodiment a case where a fast Fourier transform process is performed on 8192 sampling points is described as an example.

Figure 25:
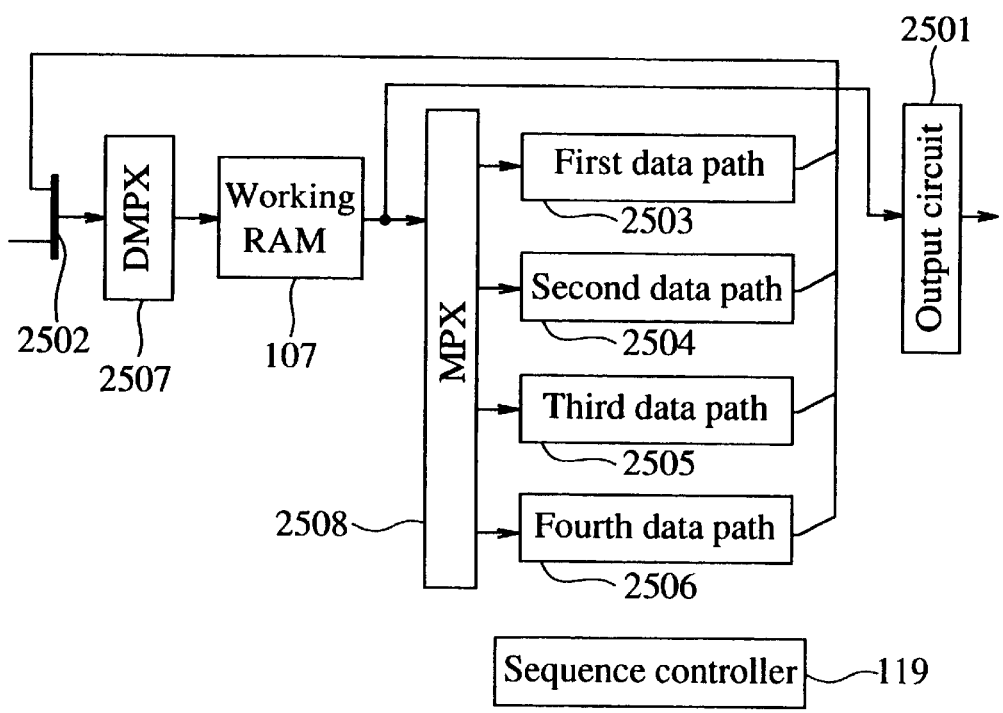
FIG. 25 is a block diagram roughly showing the composition of a fast Fourier transform processing device according to a twelfth embodiment of the invention.

FIG. 25 is a block diagram roughly showing the composition of a fast Fourier transform processing device according to this embodiment.

In FIG. 25, components to which the same symbols as FIG. 1 are given represent the same as those of FIG. 1.

In FIG. 25, an output circuit 2501 is a circuit which the selectors 111 and 112, the registers 113 and 114, and the output terminals 115 and 116 in FIG. 1 are collectively abbreviated to. A selector 2502 is a circuit which the selectors 105 and 106, the registers 103 and 104, and the input ports 101 and 102 in FIG. 1 are collectively abbreviated to.

The first data path 2503 and the third data path 2505 having the same internal structure as the first data path 108 in the first embodiment, namely, a data path shown in FIG. 2(A) or FIG. 12 can be used as these data paths 2503 and 2505.

In the same way, the second data path 2504 and the fourth data path 2506 having the same internal structure as the second data path 109 in the first embodiment, namely, a data path shown in FIG. 2(A) or FIG. 12 can be used as these data paths 2504 and 2506.

A demultiplexer 2507 selects an address at which complex number data inputted from the selector 2502 is stored in the working RAM 107, as described later. This address selection is performed by control of the sequence controller 119.

A multiplexer 2508 selects a data path which is to be a destination when complex number data is transferred from the working RAM 107 to one of the data paths 2503 to 2506, as described later. This destination selection also is performed by control of the sequence controller 119.

Figure 26:
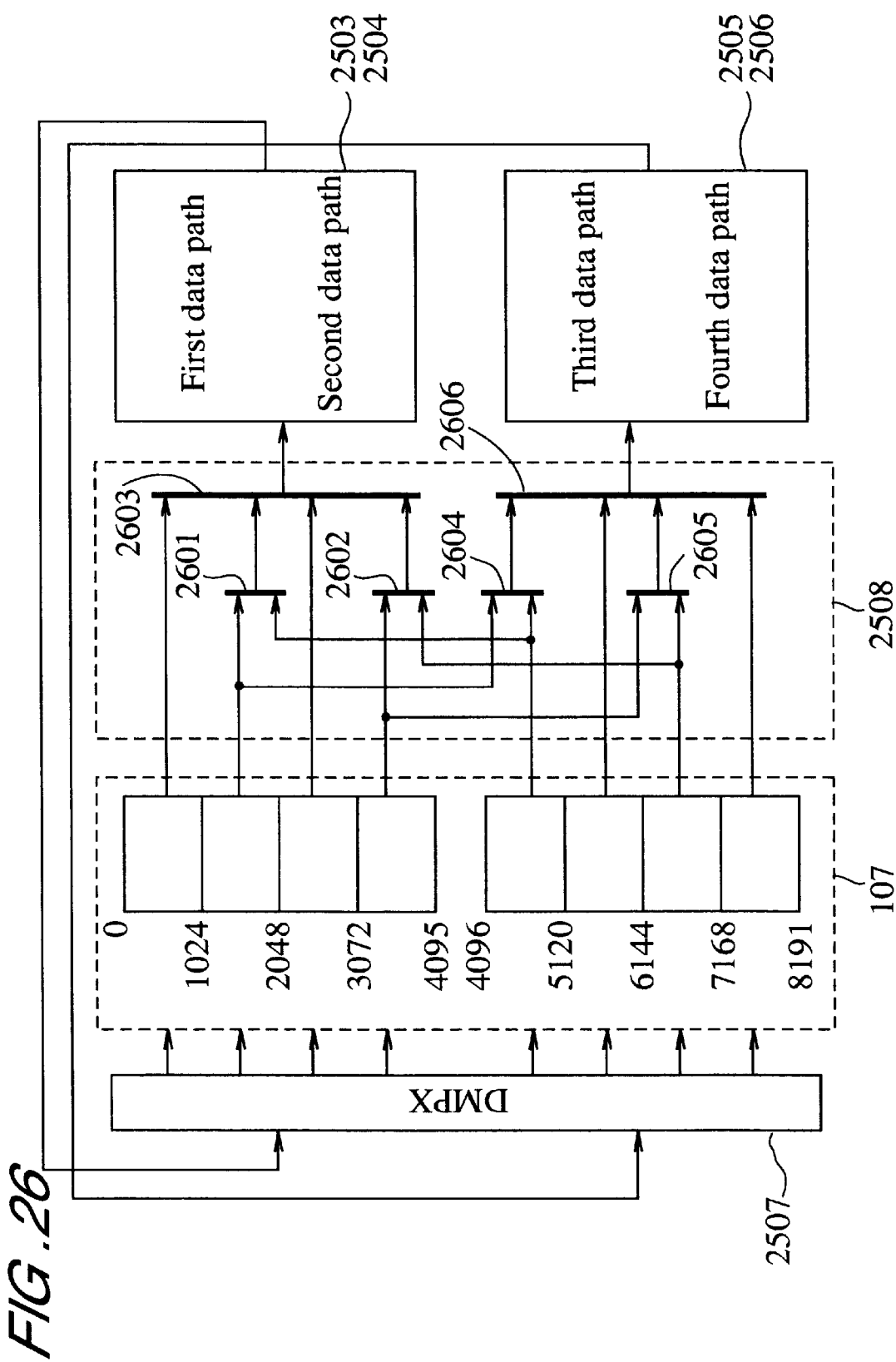
FIG. 26 is a conceptual diagram showing operation of a multiplexer shown in FIG. 25.

FIG. 26 is a conceptual figure for explaining operation of the multiplexer 2508. In FIG. 26, the selector 2502 is omitted for simplification.

As shown in FIG. 26, in the multiplexer 2508 a selector 2601 selects complex number data at addresses 1024 to 2047 or complex number data at addresses 4096 to 5119 in the working RAM 107 and outputs them to a selector 2603.

A selector 2602 selects complex number data at addresses 3072 to 4095 or complex number data at addresses 6144 to 7167 in the working RAM 107 and outputs them to a selector 2603.

The selector 2604 selects complex number data at addresses 1024 to 2047 or complex number data at addresses 4096 to 5119 in the working RAM 107 and outputs them to a selector 2606.

The selector 2605 selects complex number data at addresses 3072 to 4095 or complex number data at addresses 6144 to 7167 in the working RAM 107 and outputs them to a selector 2606.

The selector 2603 selects complex number data at addresses 0 to 1023, complex number data at addresses 2048 to 3071 in the working RAM 107, complex number data inputted from the selector 2601, or complex number data inputted from the selector 2602, and outputs them to the first and second data paths 2503 and 2504.

The selector 2606 selects complex number data at addresses 5120 to 6143, complex number data at addresses 7168 to 8191 in the working RAM 107, complex number data inputted from the selector 2604, or complex number data inputted from the selector 2605, and outputs them to the third and fourth data paths 2505 and 2506.

Next, operation of the fast Fourier transform processing device shown in FIGS. 25 and 26 is described.

First, data of 8192 sampling points to be processed are stored one after another into the working RAM 107 through the selector 2502 and the demultiplexer 2507.

When storing the complex number data into the working RAM 107 has been finished, then a fast Fourier transform process is performed using these complex number data.

In this embodiment, since the number of sampling points is 8192 (=the 6th power of 4×2), a computing process of radix 4 is repeated at six times and then a computing process of radix 2 is performed.

The first computing process (of radix 4) is described first.

The sequence controller 119 first sets up the selectors 2601, 2602, 2604 and 2605 so that the selector 2601 selects addresses 4096 to 5119, the selector 2602 selects addresses 6144 to 7167, the selector 2604 selects addresses 1024 to 2047, and the selector 2605 selects addresses 3072 to 4095. The first data path 2503 and the second data path 2504 read out data to be processed at address 0 as Ai, data to be processed at address 2048 as Bi, data to be processed at address 4096 as Ci, and data to be processed at address 6144 as Di from the working RAM 107, and perform computing operations of the expressions (1) to (4). Concurrently with this, the third data path 2505 and the fourth data path 2506 read out data to be processed at address 1024 as Ai, data to be processed at address 3072 as Bi, data to be processed at address 5120 as Ci, and data to be processed at address 7168 as Di from the working RAM 107, and perform computing operations of the expressions (1) to (4).

Following this, complex number data ai, bi, ci and di which are the computation results of the first data path 2503 and the second data path 2504 are inputted through the selector 2502 into the demultiplexer 2507, and are written into the working RAM 107. In this embodiment, hereupon, the computation result ai is written at address 0, the computation result bi is written at address 2048, the computation result ci is written at address 4096, and the computation result di is written at address 6144.

At the same time as this, complex number data ai, bi, ci and di which are the computation results of the third data path 2505 and the fourth data path 2506 are written at addresses 1024, 3072, 5120 and 7168 in the working RAM 107 through the selector 2502 and the demultiplexer 2507.

Next, the first data path 2503 and the second data path 2504 perform computing operations of the expressions (1) to (4) using data at address 1 as Ai, data at address 2049 as Bi, data at address 4097 as Ci, and data at address 6145 as Di, and concurrently with this the third data path 2505 and the fourth data path 2506 perform computing operations of the expressions (1) to (4) using data at address 1025 as Ai, data at address 3073 as Bi, data at address 5121 as Ci, and data at address 7169 as Di. The computation results of the first data path 2503 and the second data path 2504 are stored at addresses 1, 2049, 4097 and 6145, and the computation results of the third data path 2505 and the fourth data path 2506 are stored at addresses 1025, 3073, 5121 and 7169.

In the same way after this, the data paths 2503 to 2506 perform one after another the computing operations in relation to data to be processed at all the other addresses, and write the computation results into the working RAM 107.

When the first computing process has been finished in this way, then the second computing process is performed.

In the second computing process, the first data path 2503 and the second data path 2504 read data to be processed and write their computation results only at addresses 0 to 4095 in the working RAM 107. In the same way, the third data path 2505 and the fourth data path 2506 read data to be processed and write their computation results only at addresses 4096 to 8191 in the working RAM 107.

The sequence controller 119 first sets up the selectors 2601, 2602, 2604 and 2605 so that the selector 2601 selects addresses 1024 to 2047, the selector 2602 selects addresses 3072 to 4095, the selector 2604 selects addresses 4096 to 5119 and the selector 2605 selects addresses 6144 to 7167. The first data path 2503 and the second data path 2504 read out data to be processed at address 0 as Ai, data to be processed at address 5121 as Bi, data to be processed at address 1024 as Ci, and data to be processed at address 1536 as Di from the working RAM 107, and perform computing operations of the expressions (1) to (4). In the same way, the third data path 2505 and the fourth data path 2506 read out data to be processed at address 4096 as Ai, data to be processed at address 4608 as Bi, data to be processed at address 5120 as Ci, and data to be processed at address 5632 as Di from the working RAM 107, and perform computing operations of the expressions (1) to (4).

Following this, complex number data ai, bi, ci and di which are the computation results of the first data path 2503 and the second data path 2504 are written at addresses 0, 512, 1024 and 1536 in the working RAM 107 through the selector 2502 and the demultiplexer 2507. In the same way, complex number data ai, bi, ci and di which are the computation results of the third data path 2505 and the second data path 2506 are written at addresses 4096, 4608, 5120 and 5632 in the working RAM 107 through the selector 2502 and the demultiplexer 2507.

In the same way after this, the data paths 2503 to 2506 perform one after another the computing operations in relation to data to be processed at all the other addresses, and write the computation results into the working RAM 107.

In the same way as the second computing process after this, the device performs the third to sixth computing processes (of radix 4) and then performs the seventh computing process (of radix 2).

Thus, since a fast Fourier transform processing device according to this embodiment can perform two-route computing processes in concurrence with each other by means of four data paths, it can more greatly improve the processing speed. The device furthermore greatly improves the processing speed also by making unnecessary data transfer after the first computing process by using the demultiplexer 2507 and the multiplexer 2508.

Thirteenth Embodiment

Next, a thirteenth embodiment of the invention is described with reference to FIG. 27.

This embodiment provides a fast Fourier transform processing device shown in the above-mentioned twelfth embodiment with a block floating-point computing function.

Figure 27:
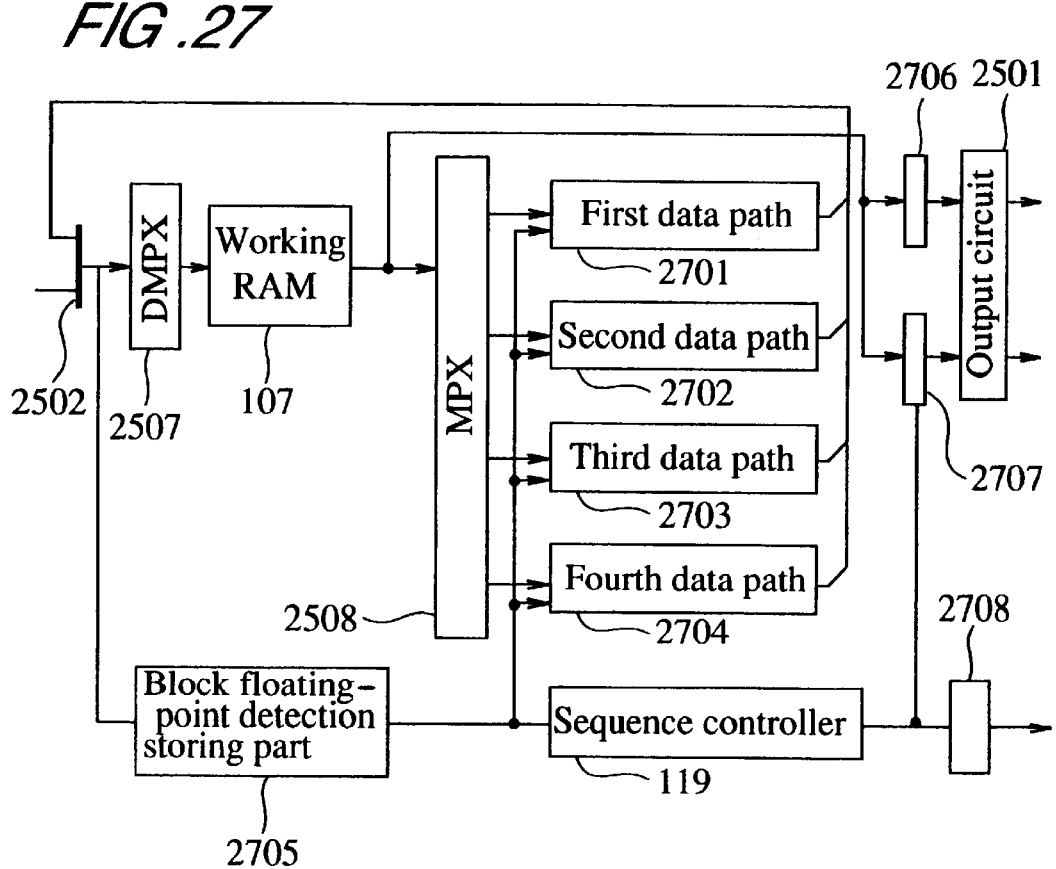
FIG. 27 is a block diagram roughly showing the composition of a fast Fourier transform processing device according to a thirteenth embodiment of the invention.

FIG. 27 is a block diagram roughly showing the composition of a fast Fourier transform processing device according to this embodiment.

In FIG. 27, components to which the same symbols as those of FIGS. 25 are given represent the same components as those of FIG. 25.

In FIG. 27, the data paths 2701 to 2704 are different from the data paths 2503 to 2506 shown in FIG. 25 in that each of the data paths 2701 to 2704 has a shift function for performing a block floating-point computing operation. Description of a detailed composition of such a shift function is omitted.

The block floating-point detection storing part 2705 takes in complex number data outputted by the data paths 2701 to 2704 and detects their floating-point exponents, and temporarily stores the detected values in it. The detected values temporarily stored in this block floating-point detection storing part 2705 are transferred to the data paths 2701 to 2704 and the sequence controller 119.

Output bit shifters 2706 and 2707 take in complex number data from the working RAM 107 as well as a floating-point exponent from the sequence controller 119. And they shift the complex number data on the basis of this floating-point exponent, and then output the result.

A register 2708 has the accumulation of floating-point exponents used in each stage inputted from the sequence controller 119 and outputs it to the outside.

Next, operation of the fast Fourier transform processing device shown in FIG. 27 is described. In this embodiment also, since the number of sampling points is 8192 (the 6th power of 4×2) in the same way as the above-mentioned twelfth embodiment, a computing process of radix 4 is performed at six times and then a computing process of radix 2 is performed.

First, data of 8192 sampling points to be processed are stored one after another into the working RAM 107 through the selector 2502 and the demultiplexer 2507. At this time the block floating-point detection storing part 2705 has these data to be processed inputted one after another and detects their floating-point exponents in the same manner as the second embodiment.

Following this, the first computing process (of radix 4) is started.

Operation of the selectors 2601 to 2606 in this computing process is the same as the twelfth embodiment. That is, in the first computation in this computing process, the first data path 2701 and the second data path 2702 read out data to be processed at address 0 as Ai, data to be processed at address 2048 as Bi, data to be processed at address 4096 as Ci, and data to be processed at address 6144 as Di from the working RAM 107, and the third data path 2703 and the fourth data path 2704 read out data to be processed at address 1024 as Ai, data to be processed at address 3072 as Bi, data to be processed at address 5120 as Ci, and data to be processed at address 7168 as Di from the working RAM 107. These data paths 2701 to 2704 perform computing operations of the expressions (1) to (4). At this time the data paths 2701 to 2704 perform floating-point computing operations in the same way as the second embodiment.

Following this, complex number data a1, b1, c1 and d1 which are the computation results of the first data path 2701 and the second data path 2702 are inputted through the selector 2502 into the demultiplexer 2507, and are written at addresses 0, 2048, 4096 and 6144 in the working RAM 107. In the same way, complex number data a1, b1, c1 and d1 which are the computation results of the third data path 2703 and the fourth data path 2704 are written at addresses 1024, 3072, 5120 and 7168 in the working RAM 107.

After this, in the same way as the twelfth embodiment, the data paths 2701 to 2704 perform the following computing operations and write the computation results into the working RAM 107. At this time, the block floating-point detection storing part 2705 has these computation results inputted one after another and detects their floating-point exponents in the same way as the second embodiment.

When the first computing process has been finished in this way, then the second computing process is performed.

In the same way as the twelfth embodiment, in the second computing process the first data path 2701 and the second data path 2702 read data to be processed and write their computation results only at addresses 0 to 4095 in the working RAM 107. In the same way, the third data path 2703 and the fourth data path 2704 read data to be processed and write their computation results only at addresses 4096 to 8191 in the working RAM 107. In these computing processes the data paths 2701 to 2704 perform floating-point computing operations in the same way as the above-mentioned second embodiment. Moreover, when storing the computation results into the working RAM 107, the block floating-point detection storing part 2705 has these computation results inputted one after another, and detects their floating-point exponents in the same way as the second embodiment.

In the same way as the second computing process after this, the device performs the third to sixth computing processes (of radix 4) and then performs the seventh computing process (of radix 2).

Thus, a fast Fourier transform processing device according to this embodiment can perform the same fast Fourier transform process as the above-mentioned twelfth embodiment by means of a block floating point method.

As described in detail above, according to the invention, it is possible to perform the fast Fourier transform process at a high speed, and is possible to cope with both fast Fourier transform algorithms of radix 4 and 2.

It is possible to increase the maximum value of the number of processable sampling points by building a system using a small number of discrete components.

What is claimed is:

1. A fast Fourier transform processing system, comprising:

a working memory that stores input complex number data in which a number of sampling points is 2N ($N=4^n \times 2$ or $4^n$, wherein n is a natural number); and computing means that performs the following:

executing a series of computing processes including:

dividing complex number data stored in said working memory into respective groups A1, B1, C1, D1, A2, B2, C2 and D2 according to computation series and sampling point numbers, performing the following computing operations for every i (i=1 to 2N), $$a1i=\{(A1i+C1i)+(B1i+D1i)\} \times W1i1 \quad (1)$$

$$c1i=\{(A1i+C1i)-(B1i+D1i)\} \times W1i3 \quad (2)$$

$$b1i=\{(A1i-C1i)-j(B1i-D1i)\} \times W1i2 \quad (3)$$

$$d1i=\{(A1i-C1i)+j(B1i-D1i)\} \times W1i4 \quad (4)$$

$$a2i=\{(A2i+C2i)+(B2i+D2i)\} \times W2i1 \quad (5)$$

$$c2i=\{(A2i+C2i)-(B2i+D2i)\} \times W2i3 \quad (6)$$

$$b2i=\{(A2i-C2i)-j(B2i-D2i)\} \times W2i2 \quad (7)$$

$$d2i=\{(A2i-C2i)+j(B2i-D2i)\} \times W2i4 \quad (8),$$

using the ith complex number data A1i, B1i, C1i, D1i, A2i, B2i, C2i and D2i belonging to the groups A1, B1, C1, D1, A2, B2, C2 and D2 and twiddle factors W1i1, W1i2, W1i3, W1i4, W2i1, W2i2, W2i3 and W2i4, and storing the results a1i, b1i, c1i, d1i, a2i, b2i, c2i and d2i as complex number data A1i, B1i, C1i, D1i, A2i, B2i, C2i and D2i into said working memory;

dividing the complex number data stored in said memory into 4 groups according to computation series and sampling point numbers, and repeating (n−1) times a series of computing processes including:

further dividing each of the groups of complex number data stored in said working memory into respective groups A, B, C and D according to computation series and sampling point numbers, performing the following computing operations for to every i (i=1 to 2N):

$$ai=\{(Ai+Ci)+(Bi+Di)\} \times Wi1 \quad (9)$$

$$ci=\{(Ai+Ci)-(Bi+Di)\} \times Wi3 \quad (10)$$

$$bi=\{(Ai-Ci)-j(Bi-Di)\} \times Wi2 \quad (11)$$

$$di=\{(Ai-Ci)+j(Bi-Di)\} \times Wi4 \quad (12),$$

using the ith complex number data Ai, Bi, Ci and Di belonging to the groups A, B, C and D and the twiddle factors Wi1, Wi2, Wi3 and Wi4, and storing the results ai, bi, ci and di as complex number data Ai, Bi, Ci and Di into said working memory, and when $N=4^n \times 2$ executing the following computing operations for every i:

$$ai=(Ai+Bi) \quad (13)$$

$$bi=(Ai-Bi) \quad (14)$$

$$ci=(Ci+Di) \quad (15)$$

$$di=(Ci-Di) \quad (16),$$

using the complex number data Ai, Bi, Ci and Di obtained by the additional computing operations, and storing the results a1i, b1i, c1i, a2i, b2i, c2i and d2i into said working memory.

2. A fast Fourier transform processing device as defined in claim 1, wherein said computing means includes:

a first data path that performs the computing operations (1), (2), (9), (10), (13) and (14), a second data path that performs the computing operations (3), (4), (11), (12), (15) and (16), a third data path that performs the computing operations (5), (6), (9), (10), (13) and (14), and a fourth data path that performs the computing operations (7), (8), (11), (12), (15) and (16).

3. A fast Fourier transform processing device as defined in claim 2, wherein said first data path includes:

a first adder that adds together said complex number data Ai and Ci;

a first bypass that passes said complex number data Ai and Ci by said first adder without adding Ai and Ci to each other;

a second adder that adds together said complex number data Bi and Di;

a second bypass that passes said complex number data Bi and Di by said second adder without adding Bi and Di to each other;

a third adder that adds together an output of said first adder or an output of said first bypass with an output of said second adder or an output of said second bypass;

a first subtracter that subtracts one from another an output of said first adder or an output of said first bypass and an output of said second adder or an output of said second bypass;

a first multiplier that multiplies an output of said third adder by said twiddle factor Wi1 or "1" and outputs the computation result ai; and a second multiplier that multiplies an output of said first subtracter by said twiddle factor Wi3 or "1" and outputs the computation result ci.

4. A fast Fourier transform processing device as defined in claim 2, wherein at least one of said second data path and said fourth data path includes:

a second subtracter that subtracts, one from another, said complex number Ai and said complex number Ci;

a third bypass that passes said complex number data Ai and Ci by said second subtracter without subtracting Ci from Ai;

a complex subtracter that subtracts, one from another, said complex number data Bi and Di, and multiplies the subtraction result by j, a fourth bypass that passes said complex number data Bi and Di by said complex subtracter without complex-subtracting Di from Bi;

a fourth adder that adds together an output of said second subtracter or an output of said third bypass and an output of said complex subtracter or an output of said fourth bypass;

a third subtracter that subtracts, one from another, an output of said second subtracter or an output of said third bypass and an output of said complex subtracter or an output of said fourth bypass;

a third multiplier that multiplies an output of said fourth adder by said twiddle factor Wi2 or "1" and outputs the computation result bi; and a fourth multiplier that multiplies an output of said second subtracter by said twiddle factor Wi4 or "1" and outputs the computation result di.

5. A fast Fourier transform processing device as defined in claim 1, further comprising a block floating-point detection storing means for making said computing means perform a fast Fourier transform computing operation using a block floating point computing method.

6. A fast Fourier transform processing method, said method implemented by a fast Fourier transform processing device, comprising:

a first process including inputting and storing complex number data as one group, wherein a number of sampling points is 2N ($N=4^n \times 2$ or $4^n$, where n is a natural number); and a second process including:
performing a first series of computing processes including:
dividing each group of the stored complex number data into respective groups A1, B1, C1, D1, A2, B2, C2 and D2 according to computation series and sampling point numbers,
performing the following first computing operations for every i (i=1 to 2N):

$$a1i=\{(A1i+C1i)+(B1i+D1i)\} \times W1i1 \quad (1)$$

$$c1i=\{(A1i+C1i)-(B1i+D1i)\} \times W1i3 \quad (2)$$

$$b1i=\{(A1i-C1i)-j(B1i-D1i)\} \times W1i2 \quad (3)$$

$$d1i=\{(A1i-C1i)+j(B1i-D1i)\} \times W1i4 \quad (4)$$

$$a2i=\{(A2i+C2i)+(B2i+D2i)\} \times W2i1 \quad (5)$$

$$c2i=\{(A2i+C2i)-(B2i+D2i)\} \times W2i3 \quad (6)$$

$$b2i=\{(A2i-C2i)-j(B2i-D2i)\} \times W2i2 \quad (7)$$

$$d2i=\{(A2i-C2i)+j(B2i-D2i)\} \times W2i4 \quad (8),$$

using the ith complex number data A1i, B1i, C1i, D1i, A2i, B2i, C2i and D2i belonging to groups A1, B1, C1, D1, A2, B2, C2 and D2 and twiddle factors W1i1, W1i2, W1i3, W1i4, W2i1, W2i2, W2i3 and W2i4 and substituting the results a1i, b1i, c1i, d1i, a2i, b2i, c2i and d2i of the first computing operations for A1i, B1i, C1i, D1i, A2i, B2i, C2i and D2i, and dividing complex number data stored in said working memory into groups according to computation series and sampling point numbers, and repeating (n−1) times a series of computing processes including:

further dividing each of the groups into the groups A1, B1, C1, D1, A2, B2, C2 and D2 according to their computation series and sampling point numbers, and performing the further computing operations for every i:

$$ai=\{(Ai+Ci)+(Bi+Di)\} \times Wi1 \quad (9)$$

$$ci=\{(Ai+Ci)-(Bi+Di)\} \times Wi3 \quad (10)$$

$$bi=\{(Ai-Ci)-j(Bi-Di)\} \times Wi2 \quad (11)$$

$$di=\{(Ai-Ci)+j(Bi-Di)\} \times Wi4 \quad (12),$$

using the ith complex number data Ai, Bi, Ci and Di belonging to A, B, C and D and twiddle factors Wi1, Wi2, Wi3 and Wi4, and substituting the results ai, bi, ci and di of the further computing operations for the Ai, Bi, Ci and Di, and when, $N=4^n \times 2$, performing at one time the computing operations for every i:

$$ai=(Ai+Bi) \quad (13)$$

$$bi=(Ai-Bi) \quad (14)$$

$$ci=(Ci+Di) \quad (15)$$

$$di=(Ci-Di) \quad (16),$$

using the complex number data Ai, Bi, Ci and Di obtained by those computing operations, and substituting the results a1i, b1i, c1i, a2i, b2i, c2i and d2i of the computing operations for A1i, B1i, C1i, D1i, A2i, B2i, C2i and D2i.

7. A fast Fourier transform processing method as defined in claim 6, wherein said second process is a process of performing a fast Fourier transform computing operation using a block floating point computing method.

8. A fast Fourier transform processing method, said method implemented by a fast Fourier transform processing device, comprising:

a first computing processing of storing 2N sampling points ($N=4^n \times 2$ or $4^n$, wherein n is a natural number) in one group in a working memory in each of a first fast Fourier transform processing device and a second fast Fourier transform processing device according to the sampling point numbers; and a second computing process which repeats at (n−1) times a series of steps including:

dividing each group of complex number data stored in said working memories of said first and second fast Fourier transform processing device into groups A, B, C and D according to computation series and sampling numbers, performing the following computations for every i (i=1 to 2N):

$$ai=\{(Ai+Ci)+(Bi+Di)\} \times Wi1 \quad (1)$$

$$ci=\{(Ai+Ci)-(Bi+Di)\} \times Wi3 \quad (2)$$

$$bi=\{(Ai-Ci)-j(Bi-Di)\} \times Wi2 \quad (3)$$

$$di=\{(Ai-Ci)+j(Bi-Di)\} \times Wi4 \quad (4),$$

using the ith complex number data Ai, Bi, Ci and Di belonging to groups A, B, C, and D, and twiddle factors Wi1, Wi2, Wi3, and Wi4 for every i, storing computation results ai, bi, ci and di into said working memories as Ai, Bi, Ci and Di, replacing the complex number data belonging to the groups C and D of said first fast Fourier transform process ing device and the complex number data belonging to the groups A and B of said second fast Fourier transform processing device with one another, and replacing the complex number data belonging to the group B and the complex number data belonging to the group C with one another for each of said first fast Fourier transform processing device and said second fast Fourier transform processing device;

a third computing process which repeats n times a series of steps including:

dividing each group of complex number data stored in said first and second fast Fourier transform processing devices into 4 groups A, B, C and D according to computation series and sampling point numbers, performing the computations (1)~(4) using the i-th complex number data Ai, Bi, Ci and Di belonging to the groups A, B, C and D and twiddle factors Wi1, Wi2, Wi3 and Wi4 for every i, and substituting ai, bi, ci and di for Ai, Bi, Ci and Di, and when said number of sampling points is $4^n \times 2$, further performing at one time the following computations:

$$ai = Ai + Bi \tag{5}$$

$$bi = Ai - Bi \tag{6}$$

$$ci = Ci + Di \tag{7}$$

$$di = Ci - Di \tag{8},$$

using the complex number data Ai, Bi, Ci and Di for every i, and storing the computation results ai, bi, ci and di in a working RAM, respectively, as Ai, Bi, Ci and Di.

9. A fast Fourier transform processing method as defined in claim 8, wherein each of said second computing process and said third computing process is a process of performing a fast Fourier transform computation by means of a block floating-point arithmetic method.

10. A fast Fourier transform processing method as defined in claim 8, wherein said third computing process is a process of performing a fast Fourier transform computation by means of a block floating-point arithmetic method.

* * * * *